US012456162B2

(12) United States Patent
Zhou et al.

(10) Patent No.: US 12,456,162 B2
(45) Date of Patent: Oct. 28, 2025

(54) SYSTEM FOR AND METHOD OF REAL-TIME NONRIGID MOSAICKING OF LAPAROSCOPY IMAGES

(71) Applicant: The Brigham and Women's Hospital, Inc., Boston, MA (US)

(72) Inventors: Haoyin Zhou, Boston, MA (US); Jayender Jagadeesan, Boston, MA (US)

(73) Assignee: The Brigham and Women's Hospital, Inc., Boston, MA (US)

(*) Notice: Subject to any disclaimer, the term of this patent is extended or adjusted under 35 U.S.C. 154(b) by 273 days.

(21) Appl. No.: 18/281,050

(22) PCT Filed: Mar. 10, 2022

(86) PCT No.: PCT/US2022/019753
§ 371 (c)(1),
(2) Date: Sep. 8, 2023

(87) PCT Pub. No.: WO2022/192540
PCT Pub. Date: Sep. 15, 2022

(65) Prior Publication Data
US 2024/0153031 A1    May 9, 2024

Related U.S. Application Data

(60) Provisional application No. 63/159,393, filed on Mar. 10, 2021.

(51) Int. Cl.
G06K 9/00 (2022.01)
A61B 1/00 (2006.01)
(Continued)

(52) U.S. Cl.
CPC ........ G06T 3/4038 (2013.01); A61B 1/00009 (2013.01); A61B 1/3132 (2013.01);
(Continued)

(58) Field of Classification Search
CPC ......... G06T 3/4038; G06T 3/18; G06T 7/248; G06T 7/33; G06T 2200/32;
(Continued)

(56) References Cited

U.S. PATENT DOCUMENTS 10,198,872 B2 *  2/2019  Lurie ................. G06T 19/20
2008/0050043 A1   2/2008  Hermosillo et al.
(Continued)

FOREIGN PATENT DOCUMENTS

WO    2020131880 A1    6/2020

OTHER PUBLICATIONS

Turan, Mehmet; Pilavci, Yusuf Yigit; Ganiyusufoglu, Ipek; Araujo, Helder; Konukoglu, Ender; Sitti, Metin, "Sparse-then-Dense Alignment based 3D Map Reconstruction Method for Endoscopic Capsule Robots", ARXIV ID: 1708.09740, Aug. 29, 2017, Digital Object Identifier: 10.1007/s00138-017-0905-8 (Year: 2017).*
(Continued)

Primary Examiner — Atiba O Fitzpatrick
(74) Attorney, Agent, or Firm — QUARLES & BRADY LLP

(57) ABSTRACT

A method for nonrigid mosaicking of images, including: obtaining, using a processor, a plurality of images including a first image and a second image of a sample, the first image and the second image containing information from partially overlapping portions of the sample; identifying, using the processor, at least one feature match between the first image and the second image; estimating, using the processor, a deformation between the first image and the second image based on identifying the at least one feature match; and combining, using the processor, the first image and the second image based on estimating the deformation between the first image and the second image.

18 Claims, 38 Drawing Sheets

(51) Int. Cl.

| | |
|---|---|
| *A61B 1/313* | (2006.01) |
| *G06T 3/18* | (2024.01) |
| *G06T 3/4038* | (2024.01) |
| *G06T 7/246* | (2017.01) |
| *G06T 7/33* | (2017.01) |

(52) U.S. Cl.
CPC ............... *G06T 3/18* (2024.01); *G06T 7/248* (2017.01); *G06T 7/33* (2017.01); *G06T 2200/32* (2013.01); *G06T 2207/10021* (2013.01); *G06T 2207/10068* (2013.01); *G06T 2207/20072* (2013.01); *G06T 2207/20221* (2013.01); *G06T 2207/30004* (2013.01); *G06T 2207/30244* (2013.01)

(58) Field of Classification Search
CPC . G06T 2207/10021; G06T 2207/10068; G06T 2207/20072; G06T 2207/20221; G06T 2207/30004; G06T 2207/30244; G06T 7/579; G06T 7/593; G06T 2207/20212; A61B 1/00009; A61B 1/3132; A61B 1/000094; A61B 90/361; A61B 2090/364; H04N 2013/0081; H04N 2013/0088; H04N 13/239; G06V 10/16
See application file for complete search history.

(56) References Cited

U.S. PATENT DOCUMENTS

| | | | |
|---|---|---|---|
| 2010/0195914 A1 | 8/2010 | Isard et al. | |
| 2014/0160264 A1* | 6/2014 | Taylor | A61F 9/008 348/79 |
| 2015/0221116 A1* | 8/2015 | Wu | G06T 5/80 382/128 |
| 2017/0070724 A9 | 3/2017 | Engedal | |
| 2017/0084036 A1* | 3/2017 | Pheiffer | G06T 7/35 |
| 2017/0294020 A1 | 10/2017 | Crivella et al. | |
| 2018/0189966 A1* | 7/2018 | Kamen | A61B 5/0084 |
| 2019/0287229 A1* | 9/2019 | Wang | G06T 7/0014 |
| 2020/0013143 A1* | 1/2020 | Wilson | G06T 3/18 |
| 2021/0012490 A1* | 1/2021 | Sabczynski | G06T 7/0012 |
| 2022/0079424 A1* | 3/2022 | Street | A61B 1/00098 |
| 2023/0000565 A1* | 1/2023 | Pickett | A61B 90/37 |
| 2023/0123664 A1* | 4/2023 | Liu | G06T 7/11 382/284 |
| 2023/0263367 A1* | 8/2023 | Zingaretti | A61B 1/000096 600/114 |
| 2023/0267679 A1* | 8/2023 | Liu | G06T 19/00 345/419 |

OTHER PUBLICATIONS

Turan, Mehmet, et al. "A non-rigid map fusion-based direct SLAM method for endoscopic capsule robots." International Journal of Intelligent Robotics and Applications 1.4 (2017): 399-409. (Year: 2017).*

Turan, M., Pilavci, Y.Y., Ganiyusufoglu, I. et al. Sparse-then-dense alignment-based 3D map reconstruction method for endoscopic capsule robots. Machine Vision and Applications 29, 345â359 (2018). https://doi.org/10.1007/s00138-017-0905-8 (Year: 2018).*

T. Bergen and T. Wittenberg, "Stitching and Surface Reconstruction From Endoscopic Image Sequences: A Review of Applications and Methods," in IEEE Journal of Biomedical and Health Informatics, vol. 20, No. 1, pp. 304-321, Jan. 2016, doi: 10.1109/JBHI.2014.2384134. (Year: 2016).*

Chen L, Tang W, John NW. Real-time geometry-aware augmented reality in minimally invasive surgery. Healthc Technol Lett. Oct. 27, 2017;4(5):163-167. doi: 10.1049/htl.2017.0068. PMID: 29184658; PMCID: PMC5683199. (Year: 2017).*

J. Song, J. Wang, L. Zhao, S. Huang and G. Dissanayake, "Dynamic Reconstruction of Deformable Soft-Tissue With Stereo Scope in Minimal Invasive Surgery," in IEEE Robotics and Automation Letters, vol. 3, No. 1, pp. 155-162, Jan. 2018, doi: 10.1109/LRA.2017.2735487. (Year: 2018).*

Arun, Ks, et al., "Least-squares fitting of two 3-D point sets" IEEE Transactions on Pattern Analysis and Machine Intelligence (1987); 698-700.

Bano, S., "Deep Placental Vessel Segmentation for Fetoscopic Mosaicking" MICCAI Springer (2020) pp. 763-773.

Bano, S., et al., "Deep Learning Based Fetoscopic Mosaicking for Field-of-View Expansion" International Journal of Computer Assisted Radiology and Surgery (2020) vol. 15, No. 11, pp. 1807-1816.

Bartoli, A., et al., "Shapefrom-template," IEEE TPAMI (2015) vol. 37, No. 10, pp. 2099-2118.

Bay, H., et al., "Surf: Speeded up robust features" ECCV (2006); 404-417.

Bergen, T., et al., "Stitching and Surface Reconstruction From Endoscopic Image Sequences a Review of Applications and Methods" IEEE Journal of Biomedical and Health Informatics (2016) vol. 20, No. 1, pp. 304-321.

Bogo, F., et al., "Detailed full-body reconstructions of moving people from monocular rgb-d sequences," in CVPR (2015) pp. 2300-2308.

Brown, M., et al., "Automatic panoramic image stitching using invariant features" International Journal of Computer Vision. (2007) 74(1); 59-73.

Bozic, A., et al., "Deepdeform: Learning non-rigid rgb-d reconstruction with semi-supervised data," CVPR (2020); 7002-7012.

Cadena, C., et al., "Past, present, and future of simultaneous localization and mapping: Toward the robust-perception age" IEEE Transactions on robotics (2016); 1309-32.

Chen, Y.S., et al., "Natural Image Stitching with the Global Similarity Prior" ECCV Springer (2016), pp. 186-201.

Chhatkuli, A., et al., "A stable analytical framework for isometric shape-from-template by surface integration," IEEE TPAMI (2016) vol. 39, No. 5, pp. 833-850.

Chhatkuli, A., et al., "Inextensible nonrigid shape-from-motion by second-order cone programming," CVPR (2016) pp. 1719-1727.

Collins, T., et al., "Robust, Real-time, Dense and Deformable 3D Organ Tracking in Laparoscopic Videos" MICCAI (2016); 404-412.

Curless, B., et al., "A Volumetric Method for Building Complex Models From Range Images" Annua Conference on Computer Graphics and Interactive Techniques (1996), pp. 303-312.

Dou, M., et al., "Fusion4d: Real-time performance capture of challenging scenes," ACM Transactions on Graphics (2016) vol. 35, No. 4, pp. 1-13.

Engel, J., et al., "Lsd-slam: Large-scale direct monocular slam," ECCV. Springer (2014), pp. 834-849.

Erden, M.S., et al., "Understanding Soft-Tissue Behavior for Application to Microlaparoscopic Surface Scan" IEEE Transactions on Biomedical Engineering (2012) vol. 60, No. 4, pp. 1059-1068.

Fan, X., et al., "Stereoscopic Image Stitching via Disparity Constrained Warping and Blending" IEEE Transactions on Multimedia (2019) vol. 22, No. 3, pp. 655-665.

Fischler, M.A., et al., "Random Sample consensus: A Paradigm for Model Fitting with Application to Image Analysis and Automated Cartography" Communications of the ACM (1981) vol. 24, No. 6, pp. 381-395.

Gao, W., et al., "Surfelwarp: Efficient non-volumetric single view dynamic reconstruction," arXiv preprint arXiv (2019) 1904.13073; pp. 1-11.

Gaisser, F., et al., "Stable Image Registration for In-Vivo Fetoscopic Panorama Reconstruction" Journal of Imaging (2018) vol. 4, No. 1, 24; pp. 1-13.

Gong, L., et al., "Robust Mosaicing of Endomicroscopic videos via context weighted Correlation Ratio" IEEE Transactions on Biomedical Engineering (2020), pp. 579-591.

Hughes, M., et al., "High Speed, Line-scanning, Fiber Bundle Fluorescence Confocal Endomicroscopy for Improved Mosaicking" Biomedical Optics Express (2015) vol. 6, No. 4, pp. 1241-1252.

(56) References Cited

OTHER PUBLICATIONS

Iakovidis, D.K., et al., "Efficient Homography-based Video Visualization for Wireless Capsule Endoscopy" IEEE International Conference on BioInformatics and BioEngineering (2013), pp. 1-4.
Innmann, M., et al., "Volumedeform: Real-time volumetric non-rigid reconstruction," ECCV. Springer (2016), pp. 362-379.
International Searching Authority, International Search Report and Written Opinion issued for PCT/US2022/019753 dated Jun. 2, 2022.
International Searching Authority, International Preliminary Report on Patentability issued for PCT/US2022/019753 dated Sep. 12, 2023.
Izadi, S., et al., "Kinectfusion: real-time 3d reconstruction and interaction using a moving depth camera," Proceedings of the 24th annual ACM symposium on User interface software and technology (2011), pp. 559-568.
Karargyris, A., et al., "Three-Dimensional Reconstruction of the digestive Wall in Capsule Endoscopy Videos Using Elastic Video Interpolation" IEEE Transactions on Medical Imaging (2010) vol. 30, No. 4, pp. 957-971.
Kavan, L., et al., "Geometric Skinning with Approximate Dual Quarternion Blending" ACM Transactions on Graphics (2008) vol. 27, No. 4, pp. 1-23.
Kose, K., et al., "Automated Video-Mosaicking Approach for Confocal Microscopic imaging in vivo: An Appraoch to Address Challenges in Imaging Living Tissue and extend Field of View" Scientific Reports (2017) vol. 7, No. 1, pp. 1-11.
Kummerle, R., et al., "g2o: A general framework for graph optimization" ICRA (2011); 3607-3613.
Lacher, RM, et al., "Nonrigid reconstruction of 3D breast surfaces with a low-cost RGB-D camera for surgical planning and aesthetic evaluation" Medical Image Analysis (2019) 53; 11-25.
Lamarca, J., et al., "Defslam: Tracking and mapping of deforming scenes from monocular sequences" IEEE Transactions on Robotics (2020); 1-13.
Lee, J.H., et al., "Texturefusion: High-quality texture acquisition for real-time rgb-d scanning," CVPR (2020), pp. 1272-1280.
Lee, K.Y., et al., "Warping Residual Based Image Stitching for Large Parallax" CVPR (2020), pp. 8198-8206.
Li, S., et al., "Dual-Feature Warping-Based Motion Model Estimation" ICCV (2015), pp. 4283-4291.
Li, N., et al., "Quasi-Homography Warps in Image Stitching" IEEE Transactions on Multimedia (2017) vol. 20, No. 6, pp. 1-9.
Li, Y., et al., "Super: A surgical perception framework for endoscopic tissue manipulation with surgical robotics," IEEE Robotics and Automation Letters (2020) vol. 5, No. 2, pp. 2294-2301.
Lin, C., et al., "Adaptive as-natural-as-possible image stiching" CVPR (2015), pp. 1155-1163.
Loewke, K.E., et al., "In vivo micro-image Mosaicing" IEEE Transactions on Biomedical Engineering (2010) vol. 58, No. 1, pp. 159-171.
Lowe, D.G., "Object Recognition from Local Scale-Invariant Features" ICCV (1999) vol. 2, pp. 1150-1157.
Mahmoud, N., et al., "SLAM based quasi dense reconstruction for minimally invasive surgery scenes" arXiv preprint arXiv:(2017) 1705.09107; pp. 1-5.
Mahmoud, N., et al., "Live tracking and dense reconstruction for handheld monocular endoscopy" IEEE transactions on medical imaging. (2018) 13;38(1): 79-89.
Maier-Hein, et al., "Optical techniques for 3D surface reconstruction in computer-assisted laparoscopic surgery" Medical image analysis (2013) 17(8), 974-996.
Mehta, D., et al., "Vnect: Real-time 3d human pose estimation with a single rgb camera," ACM Transactions on Graphics (2017) vol. 36, No. 4, pp. 1-14.
Miroslava, S., et al., "Variational Level Set Evolution for Non-rigid 3D Reconstruction from a Single Depth Camera" IEEE TPAMI (2020); 1-13.
Modrzejewski, R., et al., "Soft-body Registration of Pre-operative 3D Models to Intra-operative RGBD Partial Body Scans" MICCAI (2018), 39-46.
Mountney, P., et al., "Dynamic View Expansion for Minimally Invasive Surgery Using Simultaneous Localization and Mapping" International Conference of the IEEE Engineering in Medicine and Biology Society (2009) pp. 1184-1187.
Mountney, P., et al., "Motion compensated SLAM for image guided surgery" MICCAI (2010), 496-504; 496C504.
Mur-Artal, R., et al., "Orb-slam: a versatile and accurate monocular SLAM system," IEEE Transactions on Robotics (2015) vol. 31, No. 5, pp. 1147-1163.
Mur-Artal, R., et al., "ORB-SLAM2: An Open-source SLAM System for Monocular, Stereo, and RGB-D Cameras" IEEE Transactions on Robotics (2017), 1255-1262.
Newcombe, R.A., et al., "Dtam: Dense tracking and mapping in real-time," ICCV. IEEE (2011), pp. 2320-2327.
Newcombe, R.A., et al., "Dynamicfusion: Reconstruction and tracking of non-rigid scenes in real-time" CVPR (2015), 343-352.
Osher, S., et al., "Level set methods and dynamic implicit surfaces" Springer Science and Business Media (2006) vol. 153. [BOOK].
Parashar, S., et al., "Isometric non-rigid shape from motion with riemannian geometry solved in linear time," IEEE TPAMI(2017) vol. 40, No. 10, pp. 2442-2454.
Parashar, S., et al., "Local deformable 3d reconstruction with cartan's connections," IEEE TPAMI (2019); pp. 1-21.
Perperidis, A., et al., "Image Computing for Fibre-Bundle Endomicroscopy: A Review" Medical Image Analysis (2020) vol. 62; 101620; pp. 1-38.
Petit, A., et al., "Real-time Tracking of 3D Elastic Objects with an RGB-D Sensor" IROS (2015), Hal Open Science, pp. 1-9.
Poggi, M., et al., "Guided Stereo Matching" CVPR (2019), pp. 979-988.
Pons-Moll, G., et al, "Clothcap: Seamless 4d clothing capture and retargeting," ACM Transactions on Graphics (2017) vol. 36, No. 4, pp. 1-15.
Richa, R., et al., "Hybrid Tracking and Mosaicking for Information Augmentation in Retinal Surgery" MICCAI Springer (2012), pp. 397-404.
Rosa, B., et al., "Building Large Mosaics of Confocal Endomicroscopic Images Using Visual Servoing" IEEE Transactions on Biomedical Engineering (2012) vol. 60, No. 4, pp. 1041-1049.
Roth, J., et al., "Adaptive 3d face reconstruction from unconstrained photo collections," in CVPR (2016), pp. 4197-4206.
Rublee, E., et al., "Orb: An efficient alternative to sift or surf," in ICCV. IEEE (2011), pp. 2564-2571.
Schonberger, J.L., et al., "Comparative Evaluation of Hand-Crafted and Learned Local Features" CVPR (2017), pp. 1482-1491.
Schoob, A., et al., "Stereo Vision-based Tracking of Soft Tissue Motion with Application to Online Ablation Control" Laser Microsurgery (2017) Medical Image Analysis, 80-95.
Slavcheva, M., et al., "Killingfusion: Nonrigid 3d reconstruction without correspondences," CVPR (2017), pp. 1386-1395.
Slavcheva, M., et al., "Sobolevfusion: 3d reconstruction of scenes undergoing free non-rigid motion," CVPR (2018); pp. 2646-2655.
Song, J., et al. "Mis-slam: Real-time large-scale dense deformable slam system in minimal invasive surgery based on heterogeneous computing." IEEE Robotics and Automation Letters 3.4 (2018); 4068-4075.
Soper, T.D., et al., "Surface Mosaics of the Bladder Reconstructed from Endoscopic Video for Automated Surveillance" IEEE Transactions on Biomedical Engineering (2012) vol. 59, No. 6, pp. 1670-1680.
Sorkine, O., et al., "As-Rigid-As-Possible Surface Modeling" Symposium on Geometry processing (2007); 4; 109-116.
Sun, S.L., et al., "Multi-Laser Optimal Information Fusion Kalman Filter" Automatica (2004) vol. 40, No. 6, pp. 1017-1023.
Szeliski, R., et al., "Creating Full View Panoramic Image Mosaics and Environment Maps" Proceedings on Computer Graphics and Interactive Techniques (1997), pp. 251-258.
Totz, J., et al., "Dense surface reconstruction for enhanced navigation in MIS" In MICCAI (2011); 89-96.

(56) References Cited

OTHER PUBLICATIONS

Vercauteren, T., et al., "Robust Mosaicing With Correction of Motion Distortions and Tissue Deformations for in Vivo Fibered Microscopy" Medical Image Analysis (2006) vol. 10, No. 5, pp. 673-692.

Whelan, T., et al., "Elasticfusion: Real-time dense slam and light source estimation," The International Journal of Robotics Research (2016) vol. 35, No. 14, pp. 1697-1716.

Zaragoza, J., et al., "As-Projective-As-Possible Image Stitching with Moving DLT" CVPR (2013), pp. 2339-2346.

Zhang, F., et al., "Parallax-tolerant Image Stiching" CVPR (2014), pp. 3262-3269.

Zhang, C., et al., "Detailed, accurate, human shape estimation from clothed 3d scan sequences," CVPR (2017), pp. 4191-4200.

Zhang, H., et al., "Interactionfusion: realtime reconstruction of hand poses and deformable objects in hand-object interactions," ACM Transactions on Graphics (2019) vol. 38, No. 4, pp. 1-11.

Zhou, H., et al., "Real-time dense reconstruction of tissue surface from stereo optical video" IEEE transactions on medical imaging, 39.2 (2019): 400-412.

Zhou, H., et al., "Smooth Deformation Field-based Mismatch Removal in Realtime" arXiv preprint arXiv: (2020) 2007.08553; pp. 1-12.

Zollhofer, M., et al., "Real-time non-rigid reconstruction using an rgb-d camera," ACM Transactions on Graphics (2014) vol. 33, No. 4, pp. 1-12.

\* cited by examiner (b)

Pseudo-Code of R1P-RNSC

Input: $N$ coordinates of matches $x_1,...,x_N$ and $y_1,...y_N$
Intialization:
label $_j$ = False, d $_j$, = 1e+8 for $i$ = 1,2,...$N$
punish = 1e+8
while k < 500 do
  k = k+1 if k > punish then break; equivalent to Eq. (41)
  randomly select o ∈(1,$N$)
  compute $X$ and $Y$ by eq. (35) and (36)
  $R = I_{2x2}$, $\mu = 1$
  for iter = 1:3 do
    compute $d_j$ and $w_j$ by eq. (37) and (38)
    compute of $X'$ and $Y'$ by multiplying $w_j$ to related columns of $X$ and $Y$ respectively
    compute $R$ and $\mu$ from $X'$ and $Y'$ by Eq. (33) and (34)
  end for
  if d < $H$ then
    label $_j$ = True
  end if
  $T_0 = \Sigma$(label $_j$)
  if $T_0 < T_{min}$ then continue;
  compute $\gamma$ and punish by Eq. (40) and Eq. (41)
  compute t by Eq. (39)
  compute dual quaternion $q_j$ from $R$, $t$ for match $i$, if label = True and d $_i$ < d'$_i$
  d'$_i$ = min(d $_i$,d'$_i$) if label$_i$ = True
end while
Output: label$_j$, $\mu_j$ and $q_j$ for i = 1,2,...$N$

FIG. 11A

Pseudo-Code of EMDQ

Input: $N$ coordinates of matches $x_1,...,x_N$ and $y_1,...,y_N$
$\mu_j$ and $q_j$ from R1P-RNSC
Intialization:
set $w_j^i$, distance by Eq. (53),
set $\sigma^2 = N^2$,
set inliers ratio $\gamma$ from the R1P-RNSC result, $\gamma \in [0.05, 0.95]$
set $p\,(\text{inlier}|i)$ by Eq.(59)
while $k < 20$ do
  *E-step:*
  compute $w_j^i$ by Eq. (52)
  compute $f$ by Eq. (46)
  compute $p\,(i|\text{inlier})$ by Eq. (49)
  compute $p\,(\text{inlier}|i)$ by Eq. (51)
  *M-step:*
  compute $\sigma^2$ by Eq. (54)
  compute the inliers ratio $\gamma$ by Eq. (58), $\gamma \in [0.05, 0.95]$
  compute $q_j$ by Eq. (56)
  if Eq. (57) is True then
    break;
  end if
  $k = k + 1$
end while
get label$_j$ by Eq. (58)
Output: label$_j$, $\mu_j$ and $q_j$ for $i = 1,2,...N$

FIG. 11B

SYSTEM FOR AND METHOD OF REAL-TIME NONRIGID MOSAICKING OF LAPAROSCOPY IMAGES

CROSS-REFERENCE TO RELATED APPLICATIONS

The present application is a 371 application of PCT/US2022/09753 filed Mar. 10, 2022, which is based on, and claims priority from U.S. patent application Ser. No. 63/159,393, filed on Mar. 10, 2021, the entire disclosure of which is incorporated herein by reference.

STATEMENT REGARDING FEDERALLY SPONSORED RESEARCH

This invention was made with government support under ECCS-1505569 awarded by the National Science Foundation, and under NIH/EB024242 awarded by the National Institutes of Health. The government has certain rights in the invention.

BACKGROUND

Minimally invasive surgeries (MIS) are beneficial for patients due to less trauma, lower blood loss, and faster recovery. MIS usually uses the laparoscope as an intraoperative imaging modality to provide surgical guidance. However, due to the limited field of view (FOV) and complex 6-DoF (degrees of freedom) motion of the laparoscope, it is difficult for surgeons to relate between the laparoscopic images and the in vivo anatomical structures. For example, for hernia repairs, it is imperative for general surgeons to scan the entire region to identify the size of the mesh that needs to be placed. A small FOV provided by the laparoscope makes it challenging to identify the correct size of the mesh. For lung segmentectomy surgery, the surgeon needs to identify different segments of the lung to isolate the segment with the tumor. A larger FOV obtained by image mosaicking technologies would help plan the sublobar resection to ensure complete tumor removal while preserving as much uninvolved lung parenchyma as possible.

SUMMARY

Accordingly, new systems, methods, and media for non-rigid mosaicking of images are desirable.

In one embodiment, a method for nonrigid mosaicking of images, including: obtaining, using a processor, a plurality of images including a first image and a second image of a sample, the first image and the second image containing information from partially overlapping portions of the sample; identifying, using the processor, at least one feature match between the first image and the second image; estimating, using the processor, a deformation between the first image and the second image based on identifying the at least one feature match; and combining, using the processor, the first image and the second image based on estimating the deformation between the first image and the second image.

In some embodiments of the method, estimating a deformation between the first image and the second image may further include estimating a deformation of the sample between the first image and the second image. In other embodiments of the method, estimating a deformation between the first image and the second image may further include generating a deformation field including an array of deformation nodes; adjusting, using an expectation maximization and dual quaternion (EMDQ) procedure, the array of deformation nodes based on a first position of the at least one feature match in the first image and a second position of the at least one feature match in the second image; and warping a position of each of a plurality of pixels of the second image based on the adjusted array of deformation nodes.

In certain embodiments of the method, mosaicking the first image and the second image may further include joining the warped second image to the first image to produce a mosaic image. In particular embodiments of the method, each of the array of deformation nodes may include an associated warp function, and warping a position of each of a plurality of pixels of the second image based on the adjusted array of deformation nodes may further include warping the position of each of the plurality of pixels of the second image based on a distance of each of the plurality of pixels from an adjacent deformation node of the array of deformation nodes.

In some embodiments of the method, the plurality of images may include a sequence of images, and the method may further include obtaining a third image of the plurality of images; estimating a tracking deformation field for the third image compared to a previous image of the plurality of images; identifying a key frame from the plurality of images; estimating a loop deformation field for the third image compared to the first key frame; determining a tracking uncertainty based on a difference between the tracking deformation field and the loop deformation field; and generating a third deformation field for the third image based on determining the tracking uncertainty. In various embodiments of the method, generating a third deformation field for the third image may further include obtaining a tracking warp function for the tracking deformation field and a loop warp function for the loop deformation field; and merging the tracking warp function with the loop warp function based on the tracking uncertainty to generate a third warp function for the third deformation field.

In particular embodiments of the method, adjusting the array of deformation nodes may further include smoothing the array of deformation nodes by adjusting a first node of the array of nodes based on an amount of adjustment of a second node of the array of nodes, where the second node may be adjacent to the first node.

In certain embodiments of the method, identifying at least one feature match between the first image and the second image may further include determining a plurality of potential feature matches between the first image and the second image; identifying a subset of the plurality of potential feature matches between the first image and the second image that are based on rigid transformations; and iteratively re-weighting each potential feature match of the subset of the plurality of potential feature matches to generate a plurality of feature matches. In some embodiments of the method, identifying at least one feature match between the first image and the second image may further include identifying at least one feature mismatch from the plurality of feature matches. In various embodiments of the method, identifying at least one feature mismatch from the plurality of feature matches may further include generating a smooth deformation field including an array of deformation nodes; calculating, using an expectation maximization and dual quaternion (EMDQ) procedure, a displacement of the array of deformation nodes for each of the plurality of feature matches; identifying a particular feature match of the plurality of feature matches as being a mismatch based on the particular feature match being inconsistent with the deformation field; and removing the particular feature match from the plurality of feature matches.

In some embodiments of the method, obtaining a plurality of images of a sample may further include obtaining a plurality of pairs of stereo images of a sample using a camera, where each of the pairs of stereo images may be directed at a different angle towards a same portion of the sample; and determining, for each of the plurality of pairs of stereo images, a three-dimensional set of points on the sample. In various embodiments of the method, identifying at least one feature match between the first image and the second image may further include identifying at least one feature match between the first image and the second image including a first set of three-dimensional coordinates on the first image and a second set of three-dimensional coordinates on the second image, where the first set of three-dimensional coordinates and the second set of three-dimensional coordinates may correspond to a same feature in the sample.

In particular embodiments of the method, estimating a deformation between the first image and the second image may further include estimating a deformation of the sample and a movement of the camera between the first image and the second image based on identifying the at least one feature match. In some embodiments of the method, estimating a deformation between the first image and the second image may further include generating a deformation field including an array of deformation nodes; adjusting, using an expectation maximization and dual quaternion (EMDQ) procedure, the array of deformation nodes based on the first set of three-dimensional coordinates and the second set of three-dimensional coordinates; and updating an estimate of the movement of the camera based on the adjusted array of deformation nodes.

In particular embodiments of the method, identifying at least one feature match between the first image and the second image may further include determining a plurality of potential feature matches between the first image and the second image; and removing, using the EMDQ procedure, at least one feature mismatch from the plurality of potential feature matches. In certain embodiments of the method, estimating a deformation between the first image and the second image may further include estimating a deformation between the first image and the second image by correcting tracking errors, where correcting tracking errors may be based on performing graph optimization based on the at least one feature mismatch.

In some embodiments of the method, performing graph optimization may further include performing graph optimization based on costs generated using an as-rigid-as-possible (ARAP) procedure. In various embodiments of the method, each of the plurality of images including the first image and the second image may include a multi-color image, and where combining the first image and the second image may further include combining the first image and the second image to generate a mosaic image; and performing multi-band blending on the mosaic image. In various embodiments of the method, obtaining a plurality of images may further include obtaining the plurality of images from a laparoscope.

In another embodiment, a system for nonrigid mosaicking of images, including: a processor coupled to a memory, the processor being configured to: obtain a plurality of images including a first image and a second image of a sample, the first image and the second image containing information from partially overlapping portions of the sample; identify at least one feature match between the first image and the second image; estimate a deformation between the first image and the second image based on identifying the at least one feature match; and combine the first image and the second image based on estimating the deformation between the first image and the second image.

In some embodiments of the system the processor, when estimating a deformation between the first image and the second image, may be further configured to estimate a deformation of the sample between the first image and the second image. In various embodiments of the system, the processor, when estimating a deformation between the first image and the second image, may be further configured to: generate a deformation field including an array of deformation nodes; adjust, using an expectation maximization and dual quaternion (EMDQ) procedure, the array of deformation nodes based on a first position of the at least one feature match in the first image and a second position of the at least one feature match in the second image; and warp a position of each of a plurality of pixels of the second image based on the adjusted array of deformation nodes.

In particular embodiments of the system the processor, when mosaicking the first image and the second image, may be further configured to: join the warped second image to the first image to produce a mosaic image. In certain embodiments of the system each of the array of deformation nodes may include an associated warp function, and the processor, when warping a position of each of a plurality of pixels of the second image based on the adjusted array of deformation nodes, may be further configured to: warp the position of each of the plurality of pixels of the second image based on a distance of each of the plurality of pixels from an adjacent deformation node of the array of deformation nodes.

In some embodiments of the system the plurality of images may include a sequence of images, and the processor may be further configured to: obtain a third image of the plurality of images; estimate a tracking deformation field for the third image compared to a previous image of the plurality of images; identify a key frame from the plurality of images; estimate a loop deformation field for the third image compared to the first key frame; determine a tracking uncertainty based on a difference between the tracking deformation field and the loop deformation field; and generate a third deformation field for the third image based on determining the tracking uncertainty.

In various embodiments of the system the processor, when generating a third deformation field for the third image, may be further configured to: obtain a tracking warp function for the tracking deformation field and a loop warp function for the loop deformation field; and merge the tracking warp function with the loop warp function based on the tracking uncertainty to generate a third warp function for the third deformation field. In some embodiments of the system the processor, when adjusting the array of deformation nodes, may be further configured to: smooth the array of deformation nodes by adjusting a first node of the array of nodes based on an amount of adjustment of a second node of the array of nodes, where the second node may be adjacent to the first node.

In some embodiments of the system the processor, when identifying at least one feature match between the first image and the second image, may be further configured to: determine a plurality of potential feature matches between the first image and the second image; identify a subset of the plurality of potential feature matches between the first image and the second image that are based on rigid transformations; and iteratively re-weight each potential feature match of the subset of the plurality of potential feature matches to generate a plurality of feature matches. In some embodiments of the system the processor, when identifying at least one feature match between the first image and the second image, may be further configured to: identify at least one feature mismatch from the plurality of feature matches.

In particular embodiments of the system the processor, when identifying at least one feature mismatch from the plurality of feature matches, may be further configured to: generate a smooth deformation field including an array of deformation nodes; calculate, using an expectation maximization and dual quaternion (EMDQ) procedure, a displacement of the array of deformation nodes for each of the plurality of feature matches; identify a particular feature match of the plurality of feature matches as being a mismatch based on the particular feature match being inconsistent with the deformation field; and remove the particular feature match from the plurality of feature matches.

In various embodiments of the system the processor, when obtaining a plurality of images of a sample, may be further configured to: obtain a plurality of pairs of stereo images of a sample using a camera, where each of the pairs of stereo images may be directed at a different angle towards a same portion of the sample; and determine, for each of the plurality of pairs of stereo images, a three-dimensional set of points on the sample. In particular embodiments of the system, the processor, when identifying at least one feature match between the first image and the second image, may be further configured to: identify at least one feature match between the first image and the second image including a first set of three-dimensional coordinates on the first image and a second set of three-dimensional coordinates on the second image, where the first set of three-dimensional coordinates and the second set of three-dimensional coordinates may correspond to a same feature in the sample.

In some embodiments of the system the processor, when estimating a deformation between the first image and the second image, may be further configured to: estimate a deformation of the sample and a movement of the camera between the first image and the second image based on identifying the at least one feature match. In certain embodiments of the system the processor, when estimating a deformation between the first image and the second image, may be further configured to: generate a deformation field including an array of deformation nodes; adjust, using an expectation maximization and dual quaternion (EMDQ) procedure, the array of deformation nodes based on the first set of three-dimensional coordinates and the second set of three-dimensional coordinates; and update an estimate of the movement of the camera based on the adjusted array of deformation nodes. In various embodiments of the system the processor, when identifying at least one feature match between the first image and the second image, may be further configured to: determine a plurality of potential feature matches between the first image and the second image; and remove, using the EMDQ procedure, at least one feature mismatch from the plurality of potential feature matches.

In some embodiments of the system the processor, when estimating a deformation between the first image and the second image, may be further configured to: estimate a deformation between the first image and the second image by correcting tracking errors, where correcting tracking errors may be based on performing graph optimization based on the at least one feature mismatch. In certain embodiments of the system the processor, when performing graph optimization, is further configured to: perform graph optimization based on costs generated using an as-rigid-as-possible (ARAP) procedure.

In particular embodiments of the system, each of the plurality of images may include the first image and the second image including a multi-color image, and the processor, when combining the first image and the second image, may be further configured to: combine the first image and the second image to generate a mosaic image; and perform multi-band blending on the mosaic image.

BRIEF DESCRIPTION OF THE DRAWINGS

The patent or patent application file contains at least one drawing in color. Copies of this patent or patent application publication with color drawings will be provided by the Office upon request and payment of the necessary fee.

Various objects, features, and advantages of the disclosed subject matter can be more fully appreciated with reference to the following detailed description of the disclosed subject matter when considered in connection with the following drawings, in which like reference numerals identify like elements.

FIG. 10 (right) shows a side view of the related 3D template model generated by a stereo matching method, which were rendered by VTK. Note that the 3D model is not needed for 2D mosaicking. The elapsed time between the two sample images was less than one second, which suggests the deformation is large and fast.

FIG. 11A shows a pseudo-code listing of R1P-RNSC.

FIG. 11B shows a pseudo-code listing of EMDQ.

DETAILED DESCRIPTION

Figure 1:
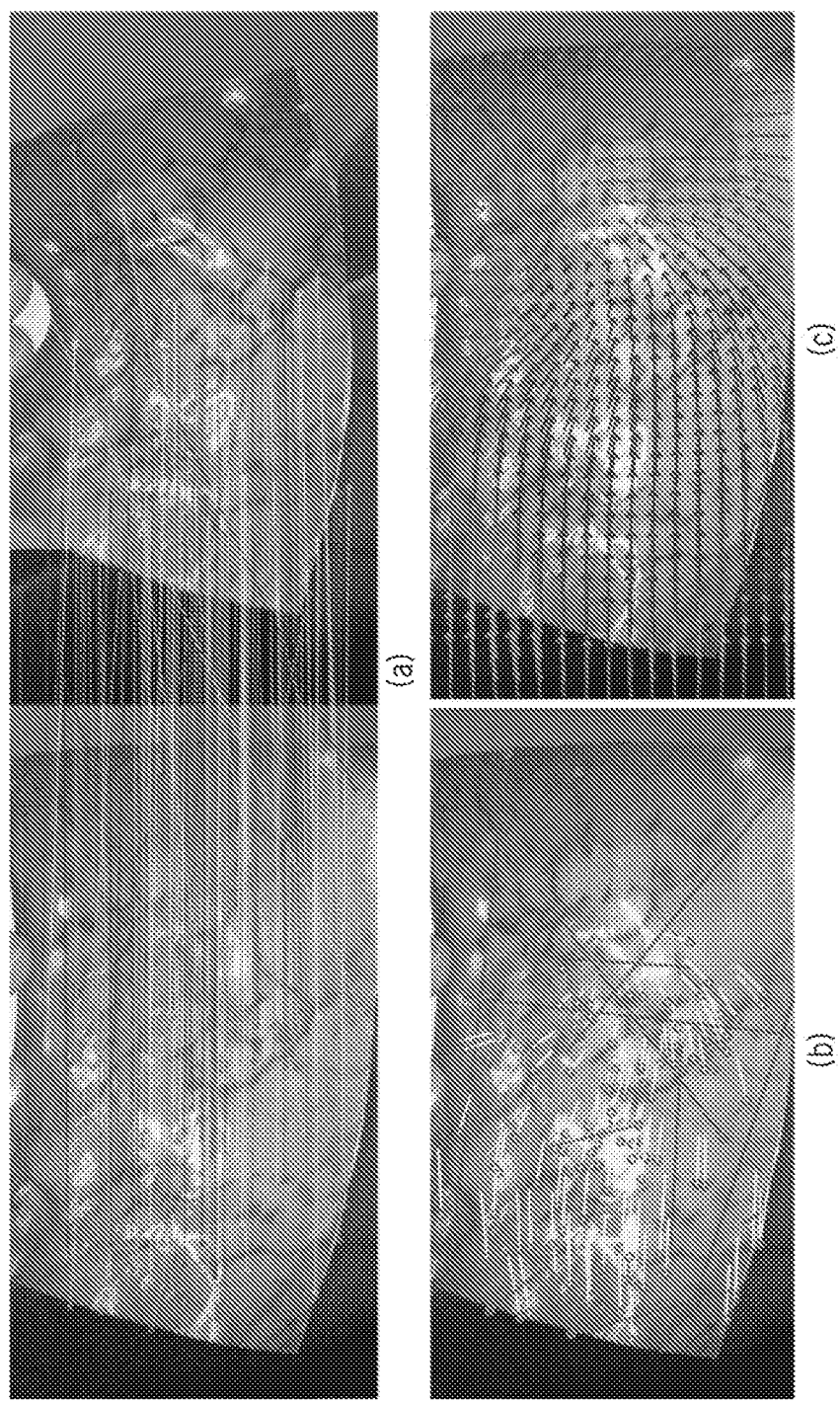
FIG. 1 shows an example of EMDQ with a deformable phantom with lung surface texture. (Panel a) Input SURF matches between two images. (Panel b) The mismatches removal result of EMDQ (yellow: inliers, red: outliers). (Panel c) Smooth and dense deformation field generated by EMDQ in real-time. The color suggests the uncertainties (blue to red: low to high). In this example, the right side of the images has no feaure inliers hence the uncertainty is high. We use a 30 pixels step for clear visualization, but the deformation field and uncertainty can be obtained for every pixel.
Figure 2:
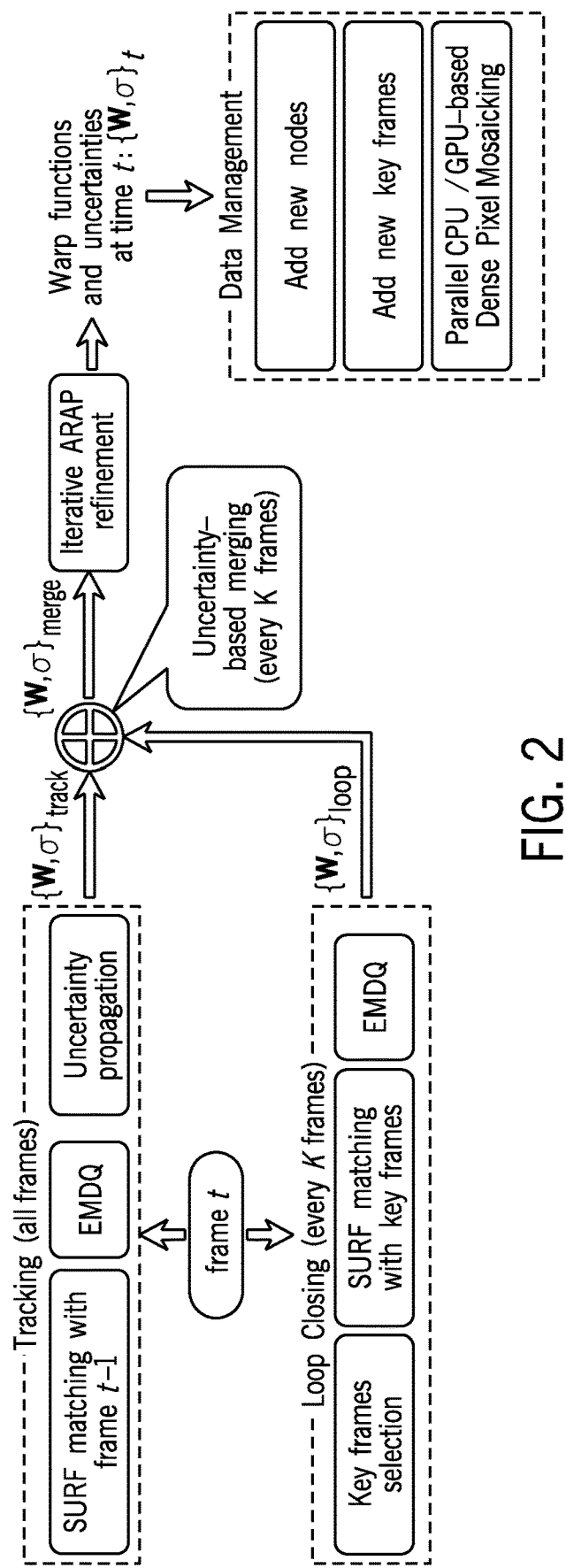
FIG. 2 shows design of a 2D non-rigid SLAM system. W and a suggest the warp functions and uncertainties of the deformation nodes respectively.

In accordance with some embodiments of the disclosed subject matter, mechanisms (which can include systems, methods, and media) for nonrigid mosaicking of images are provided.

The ability to extend the field of view of laparoscopy images can help the surgeons to obtain a better understanding of the anatomical context. However, due to tissue deformation, complex camera motion and significant three-dimensional (3D) anatomical surface, image pixels may have non-rigid deformation and traditional mosaicking methods cannot work robustly for laparoscopy images in real-time. To solve this problem, a novel two-dimensional (2D) non-rigid simultaneous localization and mapping (SLAM) system is disclosed herein, which is able to compensate for the deformation of pixels and perform image mosaicking in real-time. The key algorithm of this 2D non-rigid SLAM system is the expectation maximization and dual quaternion (EMDQ) algorithm, which can generate smooth and dense deformation field from sparse and noisy image feature matches in real-time. An uncertainty-based loop closing method has been disclosed to reduce the accumulative errors. To achieve real-time performance, both CPU and GPU parallel computation technologies are used for dense mosaicking of all pixels. Experimental results on in vivo and synthetic data demonstrate the feasibility and accuracy of our non-rigid mosaicking method.

Image mosaicking technologies have their roots in the computer vision field. Most early image mosaicking methods align the images according to the homography-based transformation, which uses a 3×3 matrix to convert the two-dimensional (2D) pixel coordinates from one image to another. For example, some have used RANSAC and SIFT matches to compute the homography matrix between images, and this work has also been used to mosaic laryngoscopic images. Others have proposed to estimates the homography using deep learning. Homography assumes that the camera motion mainly comprises of rotational motion and/or the environment is planar, which makes it impracticle to handle image parallax caused by translational camera motion in the three-dimensional (3D) environment. To solve this problem, many image mosaicking works have been proposed to integrate local warp functions. For example, some have proposed a parallax-tolerant image stitching method that first obtains homography-based alignment and then performs content preserving warping for refinement. Others have developed a local warping method using multiple homographies and warping residuals. One group has proposed to use grid mesh to guide the local warp models. Some have proposed to use stereo videos for refining the warps. Although these works have shown promising results, they are mostly designed for static environments and are difficult to handle the deforming in vivo environments. In addition, the heavy computational burden to compute the local warps made them too slow for real-time surgical navigation.

Image mosaicking methods have found many clinical applications, such as microscopic and fetoscopic images mosaicking. For microscopic images, the main difficulty is to handle the tissue deformation. For example, a recent work has proposed to mosaic laser endomicroscopic images by first estimating the initial rigid transformation from feature matches, and then estimating the local non-rigid warps using an intensity-based similarity metric. Some have proposed to compensate for the motion distortion of fibered microscopy images by modeling the relationship between motion and motion distortions. These methods are sufficient for mosaicking the microscopic images because the objects at the microscopic scale are almost planar, but are difficult to handle laparoscopy images due to the complex 6-DoF camera motion and significant 3D shapes of the tissues. For fetoscopic images, most existing methods consider the tissues as rigid, and the deformation problem has not been not fully addressed.

In the present disclosure, we describe a novel 2D non-rigid simultaneous localization and mapping (SLAM) method for laparoscopy images mosaicking in real-time. The concept of non-rigid SLAM is an emerging topic in the computer vision field. Unlike the traditional rigid SLAM methods that estimate the 6-DoF rigid motion of the camera, non-rigid SLAM estimates the deformation and motion of the environment with respect to the camera, which usually has high degrees of freedom. Our 2D non-rigid SLAM method considers the 2D image mosaic as the environment map, which is similar to the 3D point cloud built by traditional 3D SLAM methods. Some have proposed the MISSLAM method to compensate for tissue deformation and track the camera motion in real-time. However, most existing non-rigid SLAM methods were designed for 3D reconstruction and used the iterative-closet-points (ICP) algorithm for non-rigid alignment, which cannot align 2D images for mosaicking. To solve this problem, it might be possible to use the feature matches to build non-rigid correspondences between images. However, mismatches are unavoidable and the non-rigid deformation makes it difficult to remove the mismatches. In addition, dense image mosaicking requires the ability to track every pixel, but feature matches are sparse. To overcome these difficulties, we have employed a procedure called expectation maximization and dual quaternion (EMDQ), which can generate dense and smooth deformation fields from the sparse and noisy feature matches in real-time. Using EMDQ as the key algorithm to track the deformation of image pixels, we also disclose an uncertainty-based loop closing method to reduce the accumulative errors to produce a non-rigid SLAM method for image mosaicking.

The disclosure includes a brief introduction of our EMDQ algorithm; a description of the design of the 2D non-rigid SLAM system, including tracking, loop closing, uncertainty management, smoothing and dense mosaicking; and evaluation results on in vivo data.

The field of view of the laparoscope is small and the ability to generate a larger field of view from input laparoscopic videos can provide better guidance for diagnosis and surgical planning, which is clinically useful for several surgical procedures including those on the bladder, retina, and colon. This problem has been studied for decades, and the methods can be roughly classified into 3D and 2D. The 3D mosaicking methods are mostly based on structure from motion (SfM) or simultaneous localization and mapping (SLAM). SfM methods require batch processing, thus making it difficult for real-time applications. The SLAM methods, which originated from the robotics navigation field, have been introduced for surgical navigation to extend the field of view of the laparoscope in real-time. For example, our previous work generated dense 3D model of the tissue surface from stereo laparoscopy videos by using SLAM. One group has proposed a monocular dense reconstruction method for tissue surfaces. Another group has proposed to use EKF-SLAM to build a dense 3D textured model of the MIS environment. However, because most SLAM systems are designed for static environment, they cannot handle the deformation of soft tissues. To solve this problem, some have proposed to learn a periodic organ motion model for deformation compensation, which cannot handle more general tissue deformation. A recent work was able to track the camera motion in deforming environments, but did not perform mosaicking. The 3D mosaic can provide richer information to the surgeons than 2D, but often requires additional camera calibration steps in the clinical workflow. Further for stereo laparoscopes, which are not the standard of care imaging modality, the calibration must be highly precise for the stereo matching algorithms. For some clinical applications, 3D mosaicking is less demanding and 2D mosaicking of the laparoscopic images is sufficient for the clinicians to better understand the in vivo environment. For example, one group has proposed to quantify the behavior of soft tissues by mosaicking the microlaparoscopic images.

For both 3D and 2D mosaicking, the majority of methods are designed for rigid environments. For 2D cases, the pixel deformation problem is even more serious, because the translational motion of the camera on 3D structures can also contribute to the non-rigid motion of the pixels. An intuitive example is that when the camera scans the tissue surface, distant areas will have slower motion than closer areas in the image, which is also referred to as parallax and has attracted much attention in the computer vision field. For example, some have proposed an as-projective-as-possible warp that allows local non-projective deviations. In the medical field, others have described algorithms to compensate for pixel deformation that have been reported for the mosaicking of microscopy images. However, since the tissue surface at the microscopic scale is nearly planar, these methods are designed for planar objects with small deformation, which cannot be applied to the laparoscopy images robustly.

Non-rigid image mosaicking is closely related to a new concept called non-rigid SLAM, which was developed in recent years with the purpose of simultaneously estimating the deformation and performing mosaicking in real-time. Most non-rigid SLAM methods were designed for 3D reconstruction, which converted the deformation estimation problem to an optimization problem that minimized a cost function including ICP, smoothing, and other terms, and ran on powerful GPUs to achieve real-time. However, since ICP cannot be applied to RGB images directly without proper segmentation or edge detection, existing non-rigid SLAM methods cannot be used for 2D image mosaicking. Thus, the present disclosure provides a non-rigid SLAM system that is based primarily on feature matches for non-rigid image mosaicking. In addition, these procedures can work in real-time on both CPUs and GPUs.

First, we briefly describe the EMDQ algorithm, which is our recent work and an important algorithm in the 2D non-rigid SLAM system disclosed herein. Generally speaking, the EMDQ algorithm is used as a black box in the disclosed non-rigid SLAM system. The input of EMDQ is the coordinates of image feature matches and the output is the dense deformation field between images.

The basic idea of the disclosed 2D non-rigid SLAM system is to estimate the deformation of image pixels from feature matching results, and then perform mosaicking accordingly. The EMDQ algorithm can remove mismatches from noisy feature matches, and generate smooth and dense deformation field by interpolating among the feature matches in real-time. The deformation field is represented using dual quaternion (DQ), which is a useful mathematical tool to generate smooth interpolation among multiple rigid transformations. As an example, FIG. 1 shows the motion of pixels from one frame to another that can be obtained by the deformation field generated by EMDQ, which is essential for our non-rigid SLAM system. However, due to the fact that the deformation field is generated by interpolating among sparse feature inliers, two problems need to be further addressed: (1) the feature inliers may not distribute at all areas on the image, hence the deformation field at areas that are distant from feature inliers may be inaccurate, which is often referred to as uncertainty in the registration problem, (2) accumulative errors may exist if the deformation field is tracked from pairs of adjacent video frames. Our 2D non-rigid SLAM includes multiple algorithms and data management methods to address the above problems.

Image Feature Matching Method Selection

Although EMDQ can generate the deformation field from the results of any image feature matching methods, such as ORB and SURF, it is important to select an appropriate feature matching method for the accuracy, speed and robustness of the non-rigid SLAM system. Since EMDQ generates the deformation field by interpolating among the feature matches, the accuracy is higher if all pixels have close feature inliers. Due to this reason, ORB is not appropriate since the ORB feature points mainly distribute at the rich texture areas, which makes it difficult to track low texture areas accurately. Although there exist improved ORB methods that are able to detect feature points uniformly on the images and have been widely used in rigid SLAM systems, in practice we found that its percentage of inliers is significantly lower than that of the standard ORB. This is acceptable for rigid SLAM because the rigid motion model can be estimated with a few matches. However for non-rigid SLAM, it may result in low robustness because some image areas may not have feature inliers.

Compared with ORB, SURF is more accurate but much slower, which makes it unpopular for the rigid SLAM systems. A major computational burden of SURF is to build the image pyramid for handling the change of image scale. However, the change of image scale in the laparoscopic image mosaicking task is usually small. In addition, our non-rigid SLAM system tracks the deformation from pairs of adjacent video frames, which have small change of image scale as long as the camera motion is not too fast. Hence, to achieve faster computational speed, we propose to reduce the number of SURF octave layers to one, which avoids the use of image pyramid and significantly reduces the computational burden. In practice we found that SURF with one octave layer works very well. However, given the development of learning-based features, we are not implying that SURF is the best choice but it is easy to replace SURF with other features since EMDQ only needs the coordinates of feature matches as the input.

2D Non-Rigid SLAM System Design

The prerequisite of dense and nonrigid image mosaicking is to recover the deformation of all image pixels. Without loss of generality, this 2D non-rigid SLAM system considers the video frame at time t=0 as the reference frame, and estimate the deformation field of frames at t=1,2, ... T with respect to frame 0 for mosaicking. Inspired by DynamicFusion, we use sparse control points, or deformation nodes, to represent the deformation field to reduce the computational burden. The nodes are assigned with warp functions and motion of other image pixels are obtained by interpolating among the warp functions of the neighboring deformation nodes. Specifically, the warp function of a node i= 1,2, ... , N is represented by a scale factor and a dual quaternion, which is $$x_{i,t}=W_{i,t}(x_{i,0})=s_{i,t}q_{i,t}(x_{i,0})=s_{i,t}(R_{i,t}x_{i,0}+t_{i,t}) \quad (1)$$

where $x_{i,t} \in \mathbb{R}^2$ and $x_{i,0} \in \mathbb{R}^2$ are image coordinates of node i at time t and 0 respectively (in pixels). $W_{i,t}(\cdot)$ represent the warp function of node i at time t, and $s_{i,t} \in \mathbb{R}$ and $q_{i,t} \in \mathbb{R}^4$ are the related scale factor and dual quaternion respectively. $q_{i,t}(\cdot)$ is the dual quaternion-based transform. $R_{i,t} \in SO(2)$ and $t_{i,t} \in \mathbb{R}^2$ are the related rotation matrix and translational vector respectively, which are not explicitly used in our method.

(1)

Similarly, we denote the warp function on a pixel p at time t as $W_{p,t}=s_{p,t}q_{p,t}$. In our system, we use the linear combination of the neighboring nodes to obtain $W_{p,t}$, that is $$s_{p,t}=\Sigma_i^N(w_i^p s_{i,t})/\Sigma_i^N w_i^p, \quad (2)$$

and $$q_{p,t}=\Sigma_i^N(w_i^p q_{i,t})/\Sigma_i^N w_i^p, \quad (3)$$

where $w_i^p$ is the weight between node i and pixel p, which is determined by the distance between node i and pixel p at time 0, that is $$w_i^p=\exp(-\alpha\|x_{i,0}-x_{p,0}\|^2) \quad (4)$$

where $\alpha \in \mathbb{R}$ is a coefficient.

Figure 3:
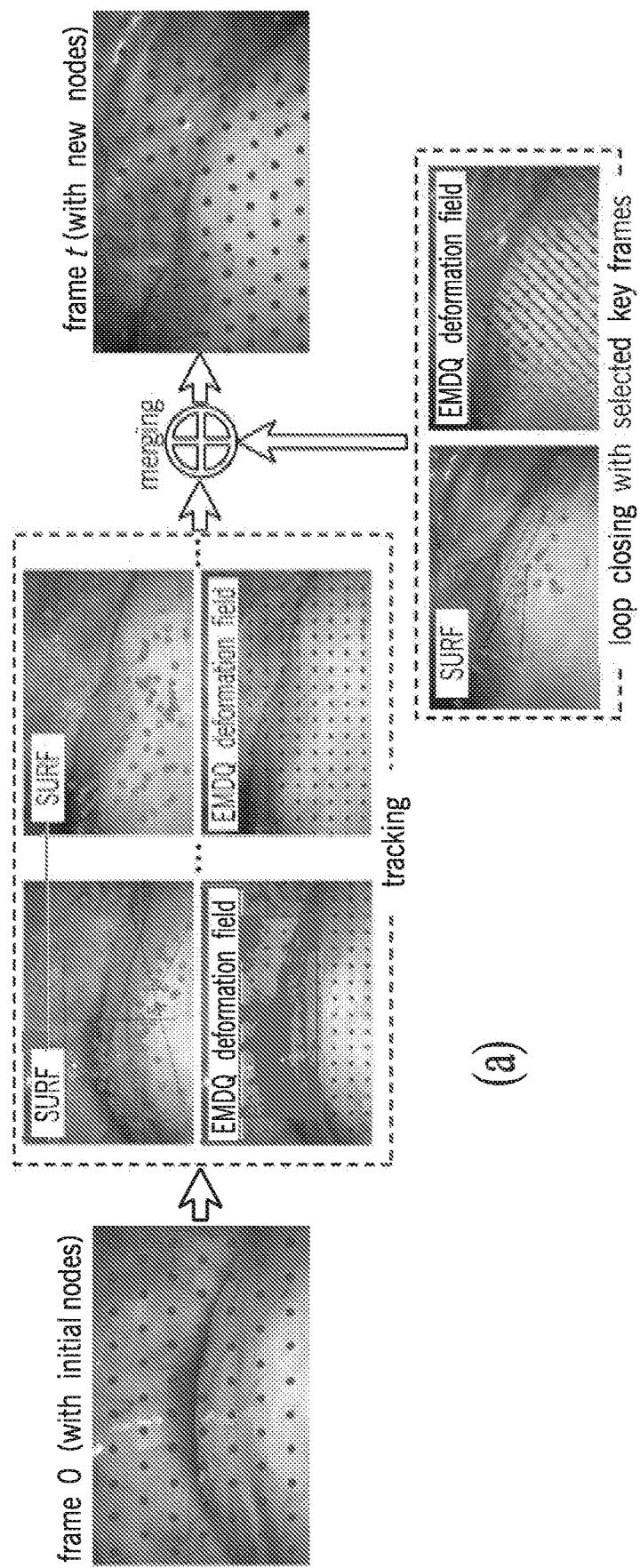
FIG. 3 shows an example of particular steps of our 2D non-rigid SLAM system with a laparoscopic video captured during a lung surgery, which has large deformation due to heartbeat. (Panel a). In both tracking and loop closing, the deformation field are generated by using EMDQ from sparse SURF matches, and the nodes are moved accordingly. The tracking module uses adjacent frames hence more SURF inliers can be found and the deformation is small with low uncertainty. (Panel b) The image mosaicking process. The blue lines are the warped frame edges from time t to 0, which are not straight due to deformation.
Figure 3:
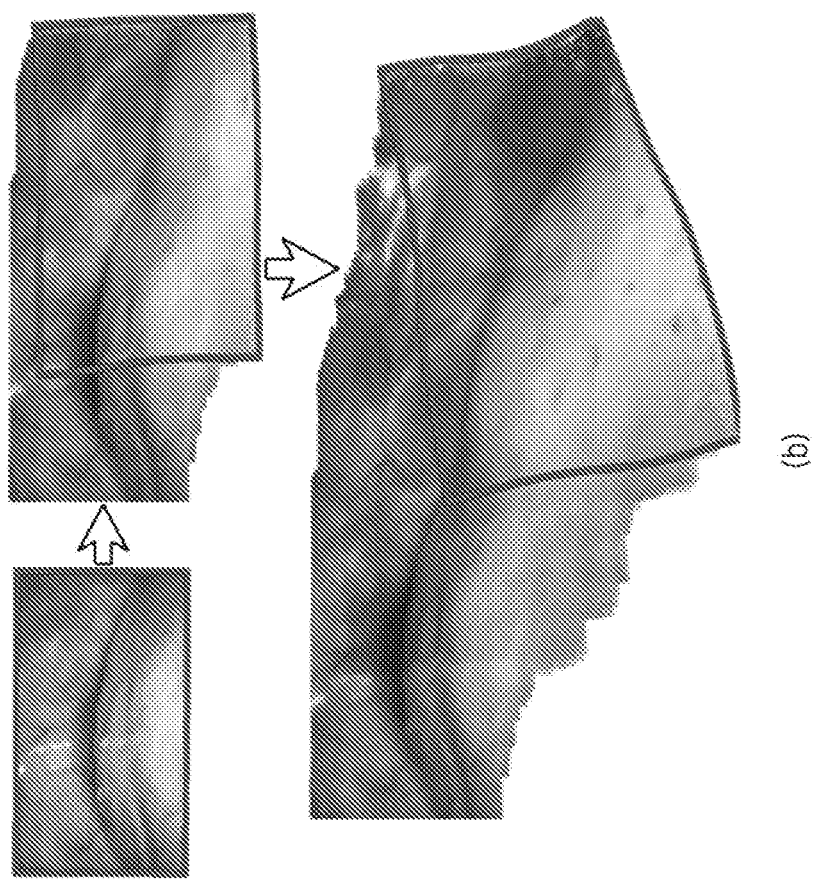

Hence, the deformation recovery problem is equivalent to the estimation of the warp functions $W_{i,t}$, i=1,2, ... ,N. We disclose a novel 2D non-rigid SLAM framework based on EMDQ, as shown in FIG. 3. This non-rigid SLAM system tracks the deformation from adjacent video frames using the EMDQ algorithm, which uses the SURF matching results as the input. However, this tracking strategy may result in accumulative errors and to solve this problem a loop closing method is integrated into the system. The tracking and loop closing results are merged according to the uncertainties. This system also include methods to determine, propagate, and merge the uncertainties. Finally, according to the deformation estimation results, we warp the coordinates of image pixels from time t to 0 according to Eq. (2) and (3), and generate a larger mosaic in real-time by using CPU or GPU parallel computing technologies.

Tracking

For each video frame at time step t, we extract the SURF feature points and match them with the t−1 frame. The changes of $W_i$ for node i=1,2, ... N can be obtained from the EMDQ algorithm, which are denoted as , $\Delta W_{i,t-1 \to t} = \Delta s_{i,t-1 \to t} \Delta q_{i,t-1 \to t}$. Then, we update the warp functions of all node i=1,2, ... ,N with $$W_{i,t,track}=f(W_{i,t-1}, \Delta W_{i,t-1 \to t}), \quad (5)$$

where $f(\cdot)$ is the updating function of the warp functions, which involves dual quaternion-based computation and the details are given in the section titled "Dual Quaternion-based Warp Function Updating" below. We use the subscript label "track" to denote the results of the tracking module.

Loop Closing and Key Frames

The results of the tracking module are accurate if the video sequence is short but may have accumulative errors for long video sequences. Hence, we integrate the loop closing module. As the example shown in FIG. 3, the basic idea of the loop closing method is to match the current video frame at time t with the previous key frames, obtain the EMDQ deformation field with respect to the key frames, and then merge the tracking and loop closing results according to the uncertainties.

Add new key frames: The non-rigid SLAM system maintains a list of key frames in the computer memory for loop closing. We will add frame t as a new key frame if the nodes have large displacements compared with those of the existing key frames, that is $$\min_{k \in \Omega} \frac{1}{N} \sum_{i=1}^{N} \|x_{i,t} - x_{i,k}\| > H, \quad (6)$$

where k is the index of previous key frames and $\Omega$ is the set of key frame indexes, $x_{i,t}$ and $x_{i,k}$ are the coordinates of node i at frame t and key frame k respectively, $H \in \mathbb{R}$ is a threshold. The information stored in the computer memory mainly include the SURF features and the warp functions of the deformation nodes.

Select previous key frames for loop closing: From the list of key frames, we select key frames that are close to the current frame t for loop closing, and the distance metric is the same as in Eq. (6). Using brute force, we compare all existing key frames with the tracking results $x_{i,t,track}$, which are obtained by Eq. (5) and (1). This brute force search is effective because the number of key frames is often small for the following reasons: (1) the surgical scene is usually much smaller than that of rigid SLAM methods, hence it does not need a long video sequence for mosaicking, and (2) the method to add key frames, given by Eq. (6), guarantees that the key frames have small overlap. For situations when long video sequences are required, such as fetoscopy or cystoscopy images, one may use the kd-tree structure for searching close frames. With a selected key frame k, we perform the SURF matching, the EMDQ computation and update the warp function (5) to obtain the estimation results of the warp functions at time t, that is $$W_{i,t,loop} = f(W_{i,k-1}, \Delta W_{i,k \to t}), \tag{7}$$

where $\Delta W_{i,k-1 \to t} = \Delta s_{i,k-1 \to t} \Delta q_{i,k \to t}$ is the change in warp function of node i from key frame k to frame t obtained by the EMDQ algorithm.

Tracking Failure: Too fast laparoscope motion and/or large glossy components of the tissue surface may cause a failure in the feature tracking process. In traditional rigid SLAM systems, this problem is usually solved in the loop closing module by matching the previous key frames. For short video sequences, the number of previous key frames is limited and it is feasible use brute force search. For long video sequences, one may refer to the bag-of-words (BoW) method that is widely used in large-scale rigid SLAM systems for obtaining candidate key frames to match the current frame. In addition to the technology solution, it is also possible to include the surgeon in the image mosaicking process by warning that a certain rate of laparoscope motion is tto fast to retrieve the tracking, since our method works in real-time.

Uncertainty

The estimated warp functions from the tracking and loop closing modules are $W_{i,t,track}$ and $W_{i,t,loop}$ respectively, which may be different and we merge them according to the uncertainties. The basic idea is borrowed from the extended Kalman filter (EKF) that uses Gaussian distributions to assign soft weights for merging.

Uncertainty of the EMDQ results: According to Eq. (5) and Eq. (7), the warp functions are updated according to results of EMDQ. Hence, the uncertainty of the EMDQ results is essential for estimating the uncertainty of the tracking and loop closing results. Because the EMDQ algorithm generates the deformation field by interpolating among the inliers of the feature matches, it is intuitive that if node i is distant from the inliers of feature matches, the uncertainty of $\Delta W_i = \Delta s_i \Delta q_i$ is high. Under this analysis, the uncertainty of $\Delta W_i$ is $$\Delta \sigma_i^2 = \min_j (\exp(\beta d_{i,j}^2)), \tag{8}$$

where $\beta$ is a coefficient, $d_{i,j}$ is the distance between node i and the feature inlier j. For each node i=1,2, ... N, we search all feature inliers and use the ones that provide the minimum uncertainty. We use the exponential function to make the uncertainty small at areas that are close to the features, and increase significantly at distant areas. This design is consistent with the observation that the estimation of areas that are close to the control points are much more certain and accurate.

Uncertainty propagation: According to Eq. (5), the uncertainty of node i at time t, $\sigma_{i,t}^2$, should be updated from $\sigma_{i,t-1}^2$ and $\sigma_{i,t-1 \to t}^2$. Because $W_{i,t-1}$ is independent with $\Delta W_{i,t-1 \to t}$ the uncertainty of node i is propagated by $$\sigma_{i,t,track}^2 = \Delta s_{i,t-1 \to t}^2 \sigma_{i,t-1}^2 + \Delta \sigma_{i,t-1 \to t}^2 \tag{9}$$

The uncertainties of the loop closing results, $\sigma_{i,t,loop}^2$, are obtained similarly.

However, because the tracking module updates the warp functions from each two adjacent frames, that is t→t+1→t+2→..., the uncertainties of nodes may increase too fast according to the prorogation method (9), since $\Delta \sigma_{i,t-1 \to t}^2$, is determined by the distance between node i and the image features (see (8)). To solve this problem, we propose to take into account the feature matching relationships among multiple frames. For example, for a feature point that can be tracked continuously at multiple frames, the uncertainties of its neighboring nodes should not increase too fast. Hence, we introduce the concepts of feature uncertainty. For a feature j at time t, if it is an inlier (can find the correct correspondence at t−1 by EMDQ), then its uncertainty is propagated by $$\sigma_{j,t,feature}^2 = \sigma_{j,t-feature}^2 + \sigma_{j,EMDQ}^2, \tag{10}$$

where $\sigma_{j,EMDQ}^2$ is the squared error of feature j when performing the EMDQ algorithm between t−1 and t. Because only matches with small errors are considered as inliers by the EMDQ algorithm, $\sigma_{j,EMDQ}^2$ is small and the increasing rate of the uncertainties of feature inliers is small. If feature j is an outlier at time t, then $\sigma_{i,t,feature}^2$ is determined in the same way as in Eq. (9).

Then, we introduce a spatial restriction between the uncertainties of nodes and features in the tracking module. For a node i, its uncertainty should satisfy $$\sigma_{i,t,track}^2 \leq \sigma_{j,t,feature}^2 + \exp(\beta d_{i,j}^2), \tag{11}$$

for any image feature j. Because the increase in the feature uncertainties are limited by (10), the increase of node uncertainties can also be limited.

Uncertainty-based Merging: For each node i=1,2, ... N, we consider the tracking and loop closing modules as two sensors, and merge their results $W_{i,t,track}$ and $W_{i,t,loop}$ by using the extended Kalman filter (EKF) according to the uncertainties $\sigma_{i,t,track}^2$ and $\sigma_{i,t,loop}^2$. The following merging algorithm is adapted from previous work. For node i, the covariance matrix is $$A_i = \begin{bmatrix} \sigma_{i,t,track}^2 & \eta_i \sigma_{i,t,track} \sigma_{i,t,loop} \\ \eta_i \sigma_{i,t,track} \sigma_{i,t,loop} & \sigma_{i,t,loop}^2 \end{bmatrix}, \tag{12}$$

where $\eta_i \in [0.0, 1.0]$ is the correlation coefficient, which is used in EKF to suggest the correlation relationship between sensors. In this system we determine $\theta$ by $$\eta_i = \exp(-\gamma \|x_{i,t} - x_{i,k}\|^2), \tag{13}$$

where $x_{i,t}$ and $x_{i,k}$ are the coordinates of node i at time t and key frame k respectively, $\gamma$ is a coefficient. Then, the merged uncertainty is $$\sigma_{i,t,merge}^2 = 1/\Sigma(A_i^{-1}), \tag{14}$$

and the weights of the two sensors are $$w_i = \sigma_{i,t,merge}^2 A_i^{-1} \begin{bmatrix} 1 \\ 1 \end{bmatrix}. \tag{15}$$

According to the weights (15), we take the weighted average of $W_{i,t,track}$ and $W_{i,t,loop}$ and obtain a new warp function $W_{i,t,merge}$ for node i at time t. However in practice we found that the equations (12) to (15) may result in negative weights $w_i$ if $\eta_i$ is too large, in that case we will simply take the values related to the smaller uncertainty as the merged values.

The uncertainties increase as in the tracking module (Eq. (9)), and decrease after merging with the loop closing results (Eq. (14)). In this way our system maintains the uncertainties of nodes at a low level.

The above EKF-based merging is equivalent to linear merging if $\eta_i$=0. EKF-based merging is more appropriate to handle slow motion when the results of tracking and loop closing modules are obtained from very close frames, hence one of them should be omitted without decreasing the uncertainty by Eq. (14). When the motion is slow, $\eta_i \approx 1$ according to (13), which will result in the omission.

ARAP-Based Smoothing

After merging the results of tracking and loop closing modules, we add an as-rigid-as-possible (ARAP) smoothing step to obtain the final estimation results of the warp functions at time t. ARAP smoothing is used in some non-rigid SLAM systems, which is usually integrated into the cost function and minimized by a Gauss-Newton-like optimization method. Because these real-time optimization methods often run on a powerful GPU, we propose a novel iterative method that uses closed form ARAP results to update the warp functions, which is also effective on the CPU. Specifically, the ARAP warp function of node i at time t, $W_{ARAP}$, is computed from the change of the coordinates of its neighboring nodes between time 0 and t. Specifically, $$C_0 = [w_1^i(x_{1,0}-x_{i,0}) \ldots w_N^i(x_{N,0}-x_{i,0})]_{x \times N}, \tag{16}$$

$$C_t = [w_1^i(x_{1,t}-x_{i,t}) \ldots w_N^i(x_{N,t}-x_{i,t})]_{x \times N}, \tag{17}$$

where $w_j^i = \exp(-\alpha \|x_{i,0}-x_{j,0}\|^2)$ is the weight between node l and j, which is similar to Eq. (4). In practice we will remove the related columns of $C_0$ and $C_t$ if $w_j^i$ is too small for faster computation. It is worth noting that there exists a trade-off between speed and robustness, because $\alpha$ large a will reduce the number of neighboring nodes for ARAP smoothing, which will result in faster speed but lower robustness.

Then the rotation matrix $R_{ARAP}$, translation vector $t_{ARAP}$ and scale $S_{ARAP}$ can be obtained by $$[E, \Sigma, V^T] = \text{svd}(C_t C_0^T), \quad R_{ARAP} = UV^T \tag{18}$$

$$s_{ARAP} = \|\text{vector}(C_t)\|/\|\text{vector}(C_0)\| \tag{19}$$

$$t_{ARAP} = \text{weightedaverage}(X_t, s_{ARAP} R_{ARAP} X_0) \tag{20}$$

Then we generate the quaternion from $R_{ARAP}$ and $t_{ARAP}$. Denoting the ARAP warp functions of node i at time t as $W_{i,t,ARAP} = \{s_i^t, q_i^t\}_{ARAP}$, our goal is obtain the warp function $W_{i,t} = s_{i,t} q_{i,t}$ that minimizes $$\|W_{i,t,merge}(x_{i,0}) - W_{i,t}(x_{i,0})\|^2 + \lambda \|W_{i,t,ARAP}(x_{i,0}) - W_{i,t}(x_{i,0})\|^2 \tag{21}$$

where $\lambda = (1+\sigma_{i,t}^2)/(1+\sigma_{ARAP}^2)$ is a coefficient suggesting the weight of the ARAP term, $\sigma_{ARAP}^2 = 100$ is a fixed value.

In this cost function, $W_{i,t,merge}$ is the data term, which is determined by the merging method and is fixed in this step. We update $W_{i,t}$ by $$W_{i,t} = (W_{i,t,merge} + \lambda W_{i,t,ARAP})/(1+\lambda) \tag{22}$$

Our method to minimize cost (21) is to iteratively estimate $W_{i,t,ARAP}$ by using Eq. (18)-(20), and then estimate the new $W_{i,t}$ by using Eq.(22) to update $x_{i,t}$ according to Eq. (1). We check the cost (21) after each iteration, and will terminate the process if the cost increases. In practice we found that a few iterations can obtain good results hence we set the maximum number of iterations to 5.

Figure 4:
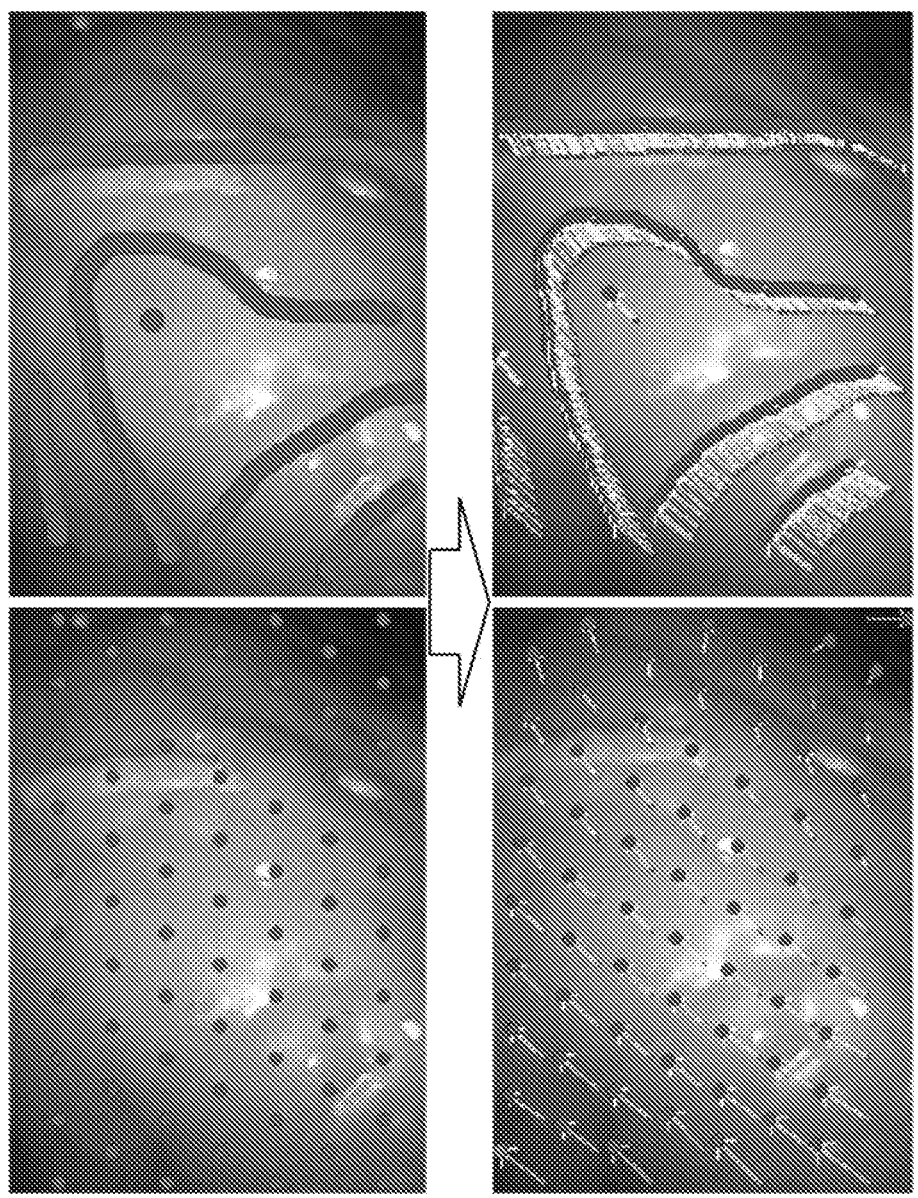
FIG. 4 shows an example to demonstrate the non-rigid pixel tracking ability with a heart phantom that simulated heartbeat. Left images: the tracking results of nodes. Right images: tracking results of other pixels, which are manually drawn on the upper-right image and tracked to other frames by interpolating among the nodes. The arrows are the displacements of nodes or pixels.

As the example shown in FIG. 4, the initial deformation nodes can be tracked robustly by using the methods disclosed herein. In addition, all pixels can also be tracked according to the interpolation among the nodes, which is a prerequisite for dense and non-rigid image mosaicking.

Adding New Nodes

At time 0, we insert the first node at the center of the image, and then insert new nodes by checking the 6-neighboring locations of existing nodes iteratively until all image areas are covered. The same node inserting strategy is also performed when new observed areas are distant from the existing nodes. The warp functions of new nodes are equal to the weighted average value of the neighboring existing nodes, where the weights are the same as the ARAP weights (4).

Dense and Non-rigid Image Mosaicking in Real-time

As the reference frame, frame 0 is inserted directly to the mosaicking image. At time t, we compute the warp functions of nodes $W_t = \{W_{1,t}, W_{2,t}, \ldots, W_{N,t}\}$, and then compute the warp effects on each pixel by interpolating among the neighboring nodes following Eqs. (2) and (3). The coordinate of pixel p at time 0 can be obtained by $x_{p,0} = W_p^{-1}(x_{p,t})$, and the related RGB value, $rgb_t$, will be merged to the mosaicking image at $x_{p,0}$. To make the mosaicking image more smooth, we have developed the truncated signed distance function (TSDF)-like method to merge frame t with the large mosaicking image, that is $$rgb_{merge} = w_{merge} rgb_{merge} + rgb_t, \tag{23}$$

$$w_{merge} = \max\{w_{merge}+1, 30\}, \tag{24}$$

The above computations, including both $x_{p,0}$ estimation and RGB values merging, need to be performed for all pixels, which is computationally expensive because the laparoscopic images may have millions of pixels. Note that the computations are independent for each pixel, hence parallel computational technologies can be used for acceleration. We have developed both CPU and GPU-based parallel computation methods. The CPU parallel computation is based on the OpenMP library to make full use of all CPU cores, and the GPU parallel computation is developed using CUDA C++, which launches GPU threads for each pixel in parallel. In practice we found that a powerful CPU can achieve the real-time requirement, while the GPU-based computation can make the system performance 2× faster than the CPU version.

Parameters Setting

Key parameters used in our method are as follows: $\alpha$=2e-4 is used to compute the weight between nodes and pixels (see Eq. (4)), which is also used for computing the ARAP weights between nodes. β=3e-3 is used to compute the uncertainty of nodes according to the distance to feature inliers (see Eq. (8)). γ=5e-3 is used to correlation coefficient for uncertainty-based merging (see Eq. (13)). Every K=5 frames, we perform the loop closing step and every 2 frames are used for mosaicking. Because α, β and γ are related to squared distances in pixels, to make the algorithms self-adaptive to different image resolutions, we propose to adjust α, β and γ by multiplying $1/s^2$. By considering 480×270 as the reference resolution, s=(w/480+h/270)/2 suggests the scale change of the input video frames, where w and h are the width and height of the video frames.

Experimental

In one embodiment, the source code was implemented in C++ and ran on a desktop with an Intel Core i9 3.0 GHz CPU (16 cores) and NIVI DA Titan RTX GPU.

To evaluate the performance of the proposed mosaicking method on laparoscopic images in real-world surgical scenarios, we obtained intraoperative videos during surgeries performed in our hospital and online videos. The videos were recorded under an Institution Review Board approved protocol. We compared the results of our algorithm to the the as-natural-as-possible (ANAP) and Parallax image mosaicking methods for comparison. Both ANAP and Parallax include elastic warping mechanisms to handle image deformation. Due to the heavy computational burden, both ANAP and Parallax are off-line methods and their codes were available as Matlab scripts. In our experiments, we downsampled the video frames to reduce the computational time of ANAP and Parallax since they are very slow for long image sequences. For the runtime, we report the average per frame computational time for our method since it is an online real-time method, and report the total computational time for ANAP and Parallax since they are off-line methods.

Figure 5:
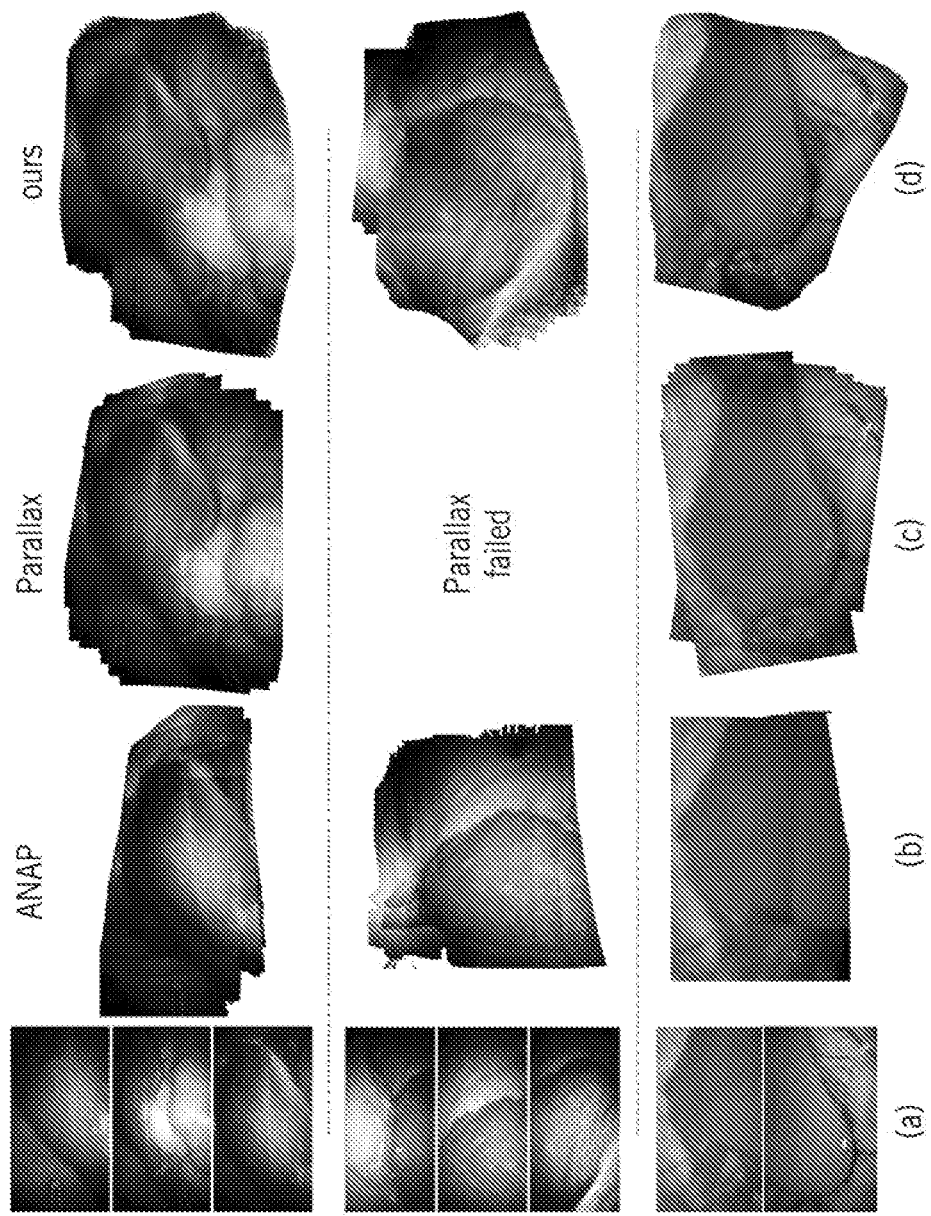
FIG. 5 shows experiments on laparoscopy videos captured during a robot-assisted liver surgeries at our hospital. The liver had small deformation due to respiration. (Panel a) Sample frames. (Panel b) ANAP. (Panel c) Parallax. (Panel d) Ours. Number of frames: 161, 132 and 844 respectively. Resolution: 728×392, 728×392 and 440×280 respectively. Average GPU/CPU computational time per frame: 93.0/158.4, 98.0/189.1 and and 58.1/79.0 ms respectively. The number of down sampled images for ANAP and Parallax were 30, 35 and 20 respectively, and the total ANAP/Parallax runtime for the three cases were 5/23, 6/35 and 3/20 minutes respectively.

As shown in FIG. 5, the first experiments were conducted on laparoscopy videos captured during robot-assisted liver surgery. We asked the surgeons to move the laparoscope within the patients' abdomens. The livers had small deformation caused by respiration. The translational motion of the laparoscope is large and the tissue surfaces had significant 3D shapes, which caused large pixel deformation due to parallax. For these cases, ANAP and Parallax are not as robust as our method.

Figure 6:
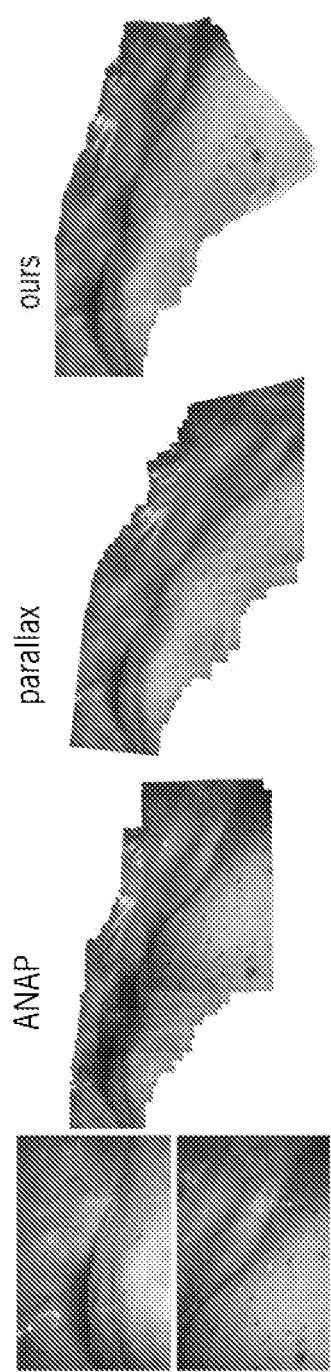
FIG. 6 shows experiments on laparoscopy videos captured during minimally invasive lung surgery at our hospital. The lung has significant deformation due to heartbeat. (Panel a) Sample frames. (Panel b) ANAP. (Panel c) Parallax. (Panel d) Ours. Number of frames: 227. Resolution: 484×312. Average GPU/CPU computational time per frame: 59.2/106.2 ms. The number of down sampled images for ANAP and Parallax was 28, and the total ANAP/Parallax runtime were 4/16 minutes.

For the experiment shown in FIG. 6, the videos were captured during a minimally invasive sublobar lung surgery. Due to heartbeat and respiratory motion caused by the adjacent lung, the deflated lung had significant and fast deformation. For this data, the camera motion was mainly along the tissue surface without significant changes in magnification, which made it easier to match adjacent video frames. Hence, all three methods were able to obtain satisfying results.

Figure 7:
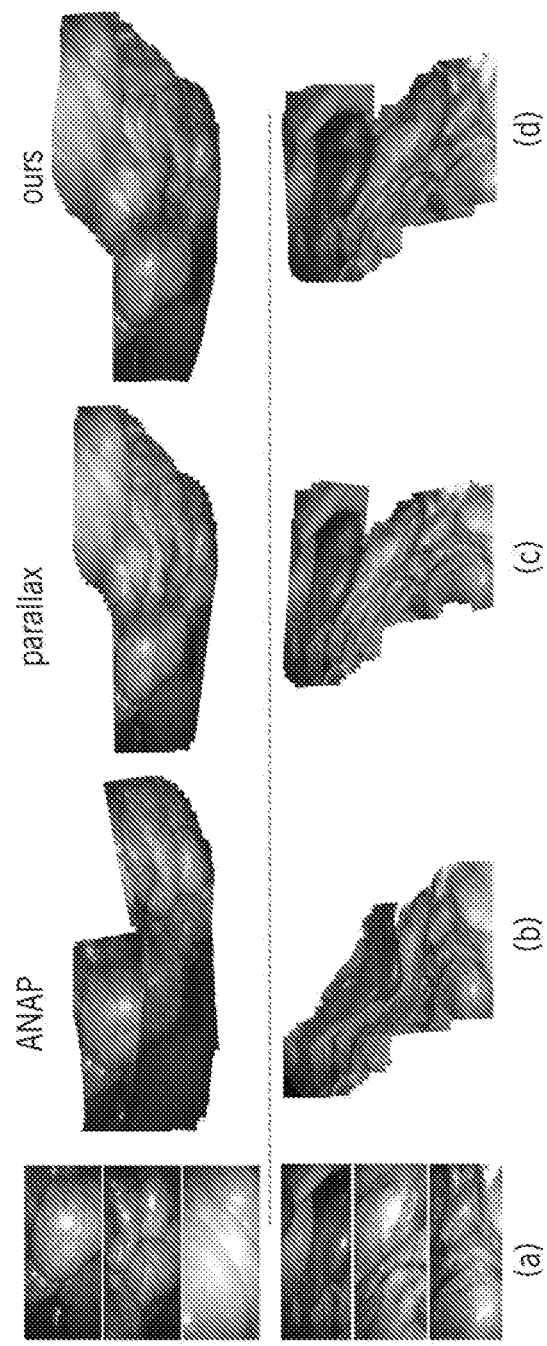
FIG. 7 shows experiments on the Hamlyn dataset. (Panel a) Sample frames. (Panel b) ANAP. (Panel c) Parallax. (Panel d) Ours. Number of frames: 387 and 362 respectively. Resolution: 680×248 for both. Average GPU/CPU computational time per frame: 61.3/70.2 ms and 71.6/120.4 ms respectively. The number of down sampled images for ANAP and Parallax was 67 and 43 respectively, and the total ANAP/Parallax runtime were 9/46 and 7/33 minutes respectively.
Figure 8:
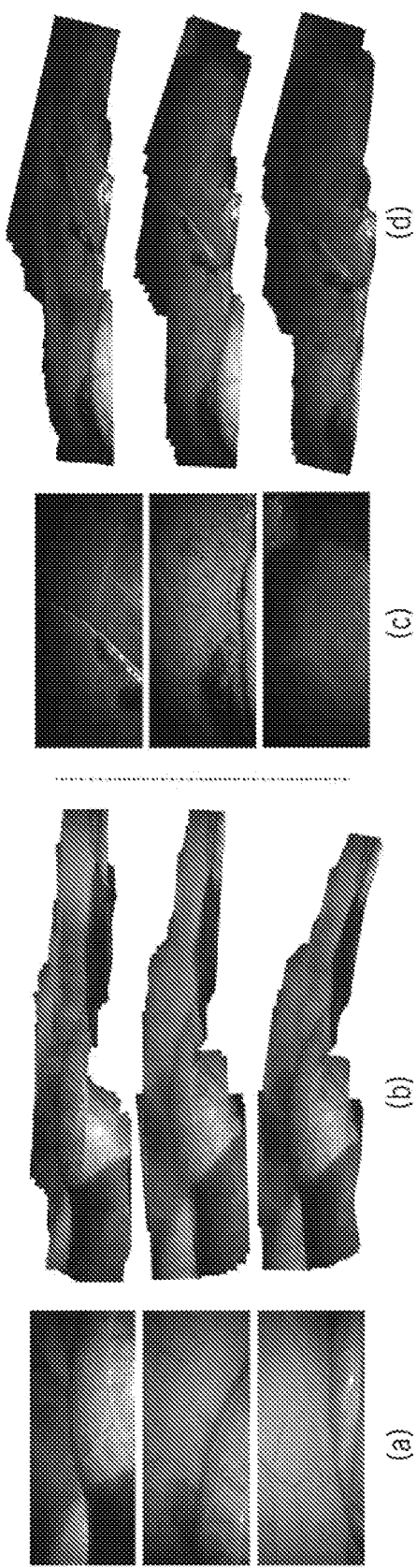
FIG. 8 shows experiments on the Hamlyn dataset, which include long image sequences. (a) and (c) are the sample images of the two cases respectively. From top to bottom in (b)-(d) are the results of ANAP, Parallax and ours. Number of frames: 741 and 772 respectively. Resolution: 680×248 for both. Average GPU/CPU computational time per frame: 80.0/142.9 ms and 69.3/119.0 ms respectively. The number of down sampled images for ANAP and Parallax was 80 and 63 respectively, and the total ANAP/Parallax runtime were 11/52 and 8/40 minutes respectively.

In the experiments shown in FIGS. 7 and 8, the laparoscopy videos were obtained from the Hamlyn public dataset, which includes videos showing the porcine abdomen deformed due to respiration. Our method and the Parallax method can obtain good mosaicking results.

Figure 9:
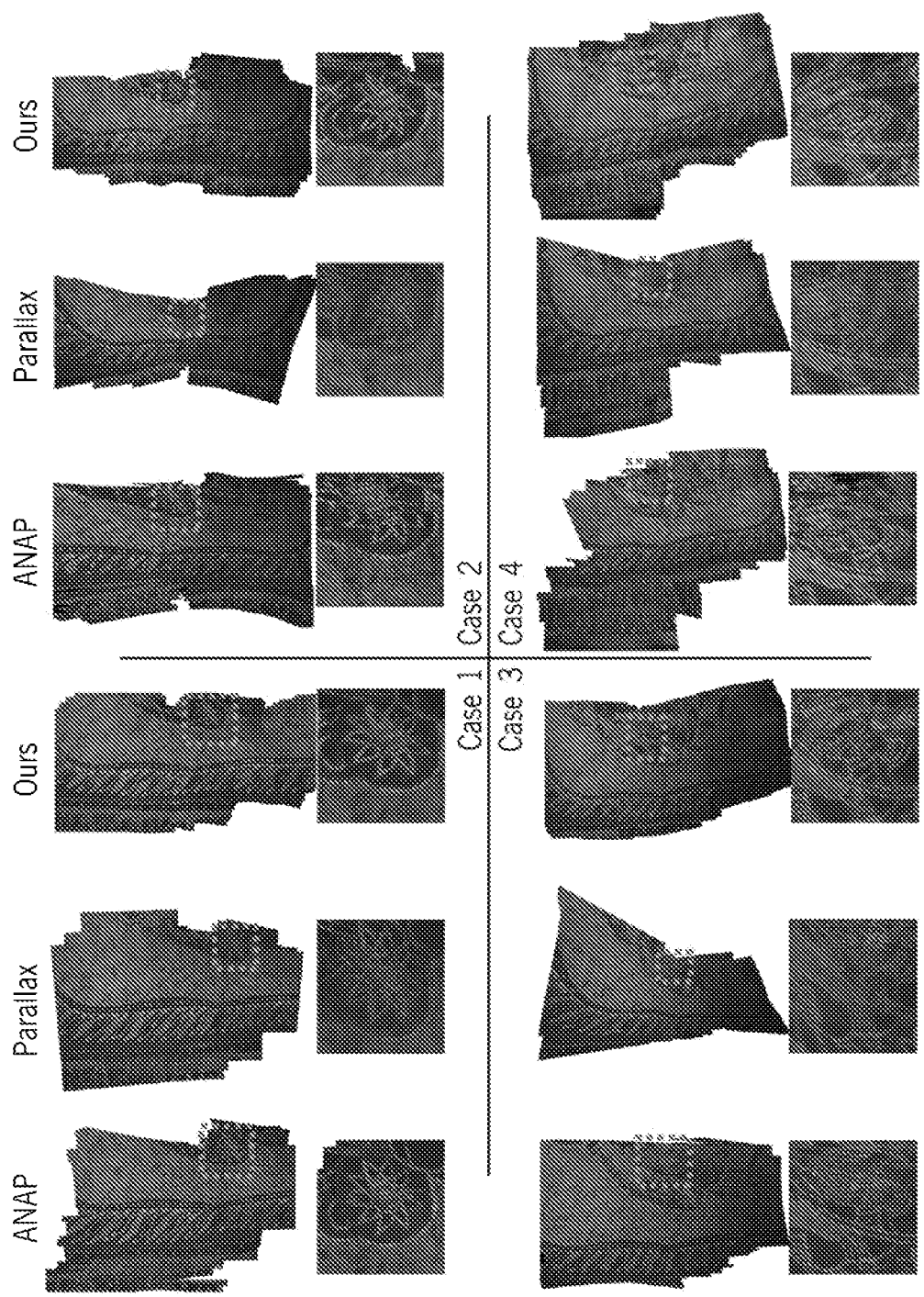
FIG. 9 shows experiments on the Mandala data. Deformation increased from case 1 to case 4. For each case, up: the mosaicking results, bottom: parts within the red dash lines are enlarged for better visualization of the texture details. Our method demonstrated much better accuracy.
Figure 10:
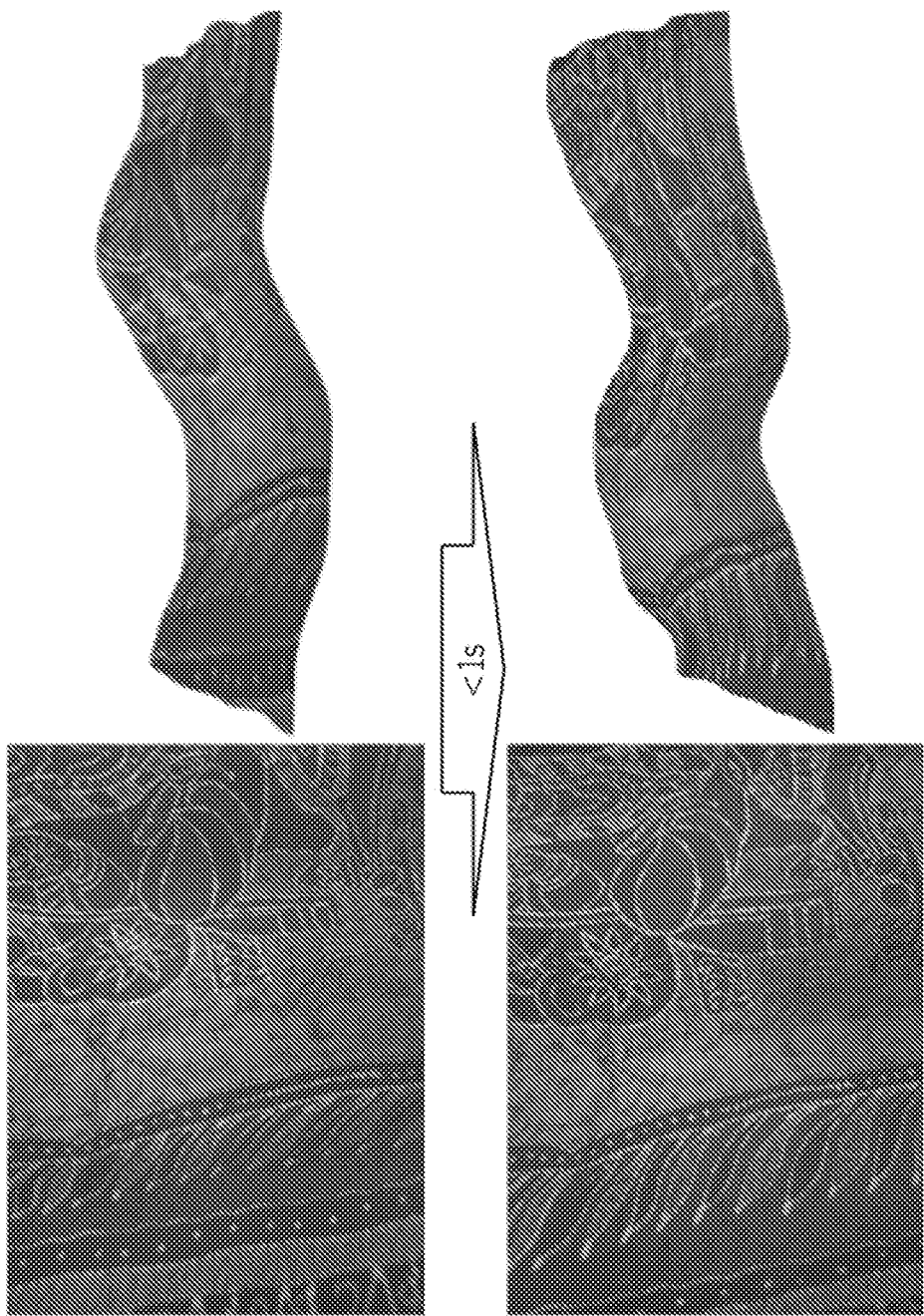
FIG. 10 (left) shows sample images of case 4 in the Mandala dataset.

In these above experiments on in vivo laparoscopy videos, our online real-time mosaicking method obtained excellent results, which were comparable with the results of the off-line methods. Since the tissue deformation in most of the collected in vivo videos were relatively small, the ability to handle large deformation was not fully evaluated. Hence, we introduce the Mandala dataset, which includes four gray-level image sequences of a soft blanket. As shown in FIG. 10, the deformation of the blanket increased from case 1 to case 4, and the camera scanned the deforming blanket. The deformation in the Mandala data was significant and fast. Our method demonstrated better ability to handle large deformation to reserve more texture details, as illustrated in FIG. 9. In this experiments, the images blending method was the multi-band blending (MBB) method, which can handle larger registration errors caused by the large deformation. However, MBB may not be appropriate for blending laparoscopy images due to the complex illumination condition. Hence, for laparoscopy images mosaicking, we found the TSDF-based methods (Eq. (23) and (24)) can obtain better results.

Thus, we have developed and disclosed various embodiments of a novel 2D non-rigid SLAM system for laparoscopy images mosaicking. To the best of our knowledge, this is the first image mosaicking method that can handle large translational camera motion, complex anatomical surfaces and tissue deformation in real-time, which makes it possible to mosaic in vivo laparoscopic images. Experiments with real-world in vivo data on different types of organs have shown the feasibility of our method. This would be particularly useful for minimally invasive surgeries wherein a larger field of view can provide the surgeon with a precise anatomical map to plan the surgery (for example segmentectomy) or placement of a device (meshes for hernias).

Some qualifications include: (1) 2D image mosaicking has an intrinsic requirement that different images of 3D objects can be reprojected to the same mosaic, hence it may not be able to mosaic images obtained at arbitrary positions. Hence, our method is mainly designed for situations when the laparoscope moves along the tissue surface, and may be less suited to data from some types of camera motions, such as going through the tubular airways/vessels. (2) Our method works under a reasonable assumption that during the scan, the instruments are removed from the field of view. Occlusion by surgical instruments may interfere with the SURF feature matching results and further affect the deformation field generated by EMDQ. Future works will include the integration of instrument segmentation to improve the robustness. (3) Because EMDQ assumes the deformation is smooth, our method is less equipped to handle sharp non-rigid motions of the tissue, such as cutting of tissue surfaces.

Dual Quaternion-Based Warp Function Updating

The updating function of the warp function used in (5) is $$\{s_{new}, q_{new}\}=f(s_{old}, q_{old}, \Delta s, \Delta q), \quad (25)$$

which suggest that if $$x_1 = s_{old} q_{old}(x_0) \quad (26)$$

then $s_{new}$ and $q_{new}$ should have $$s_{new} q_{new}(x_0) = \Delta s, \Delta q(x_1) \quad (27)$$

Under this requirements, the details of the computation are as follows:

$$q_1 = \text{trans2dq}((1-s_{old}) \cdot s_{old} \Delta t), \quad (28)$$

where trans2dq(·) is the function that convert a translational vector to the related dual quaternion. Then, $$q_2 = \Delta q * q_1, \quad (29)$$

$$q_{new} = q_{old} * q_2 \text{ and } s_{new} = \Delta s s_{old}, \quad (30)$$

where * is the multiply function between two dual quaternions.

EXAMPLES

The following are non-limiting examples of embodiments of the disclosure

Example 1—Removal of Mismatches

This Example discloses a novel method for removing image feature mismatches in real-time that can handle both rigid and smooth deforming environments. Image distortion, parallax and object deformation may cause the pixel coordinates of feature matches to have non-rigid deformations, which cannot be represented using a single analytical rigid transformation. To solve this problem, we disclose an algorithm based on the re-weighting and 1-point RANSAC strategy (R1P-RNSC), which operates under the assumption that a non-rigid deformation can be approximately represented by multiple rigid transformations. R1P-RNSC is fast but suffers from the drawback that local smoothing information cannot be considered, thus limiting its accuracy. To solve this problem, we disclose a non-parametric algorithm based on the expectation-maximization algorithm and the dual quaternion-based representation (EMDQ). EMDQ generates dense and smooth deformation fields by interpolating among the feature matches, simultaneously removing mismatches that are inconsistent with the deformation field. It relies on the rigid transformations obtained by R1P-RNSC to improve its accuracy. The experimental results demonstrate that EMDQ has superior accuracy compared to other state-of-the-art mismatch removal methods. The ability to build correspondences for all image pixels using the dense deformation field is another contribution of this work.

Feature matching is the foundation of many computer vision applications, such as simultaneous localization and mapping (SLAM) and image mosaicking. Feature matching between two images typically involves multiple steps. The first usually entails detecting key points and extracting descriptors from the input images. This process has been studied for decades and many effective methods have been proposed, including SIFT, SURF and ORB. In recent years, deep learning-based methods have also been developed to improve the performance of hand-crafted features, such as LIFT, L2-Net, HardNet, AffNet, Deepdesc, and D2-Net. Correspondences between the detected feature points can then be built according to computed descriptors using LFANN or brute-force matching. However, owing to noise, incorrect matches or "mismatches" are unavoidable. Removing mismatches is essential for feature-based applications, and the related methods can be roughly classified as parametric and non-parametric methods.

Classic parametric methods assume the existence of a single analytical transformation between two sets of feature points. They use the random sample consensus (RANSAC) method or its variants, such as MAGSAC and PROSAC, to estimate the transformations from small sets of randomly selected control points. The transformation models include affine, homography, epipolar geometry and so on. For well-calibrated images in three-dimensional (3D) reconstruction tasks, such as SfM and SLAM, closed-form algorithms can be combined with the RANSAC framework to estimate 3D camera poses and to remove mismatches simultaneously. However, single transformation-based methods cannot handle objects with non-rigid deformations. They also have limitations for rigid objects. For example, homography requires the observed objects to be approximately planar, or the translational component of the camera motion to be small. In addition, inaccurate camera calibration may lead to image distortion. Hence, even for rigid objects, it is often difficult to find a single transformation between the feature matches owing to parallax and image distortion. To solve this problem, some works have suggested the use of multiple local rigid transformations. For example, some have proposed using multiple homographies to represent the transformation between two views of a scene consisting of multiple planar structures. Others have proposed a multi-affine (HMA) algorithm, which uses a hierarchical k-means strategy to iteratively cluster the feature matches in small local areas and requires hundreds of milliseconds to match two images. Recently, one group has proposed the AdaLAM algorithm that splits the image into small local regions and then assumes the correct feature matches should be consistent with the local affine transformations. AdaLAM runs on the GPU in parallel to achieve real-time performance. Traditional RANSAC methods are inefficient at estimating multiple local transformations because the selected sets of control points must be (1) correct matches that (2) fit into the same rigid transformation. In this disclosure, we describe a novel re-weighting and 1-point RANSAC-based method (R1P-RNSC) that naturally satisfies the second condition because only one control point is needed in each trial. Hence, R1P-RNSC is highly efficient compared with traditional RANSAC-based methods. R1P-RNSC was derived from our previous work, in which we were studying a 3D-2D correspondence problem when we discovered this strategy was even more efficient for handling the 2D-2D correspondence problem. Compared with local region-based methods, the rigid transformations obtained by R1P-RNSC are not restricted to small local regions. Hence, it is very fast, even when running on a regular CPU.

Compared with parametric methods, non-parametric methods are more flexible in their approach to removing mismatches, especially when non-rigid deformation exists. Most non-parametric methods are explicitly or implicitly based on the assumption that the deformation is smooth in local areas, and they consider a match incorrect if it is not consistent with its neighbors. For example, one group has used the isometric deformation prior, which assumes that distances between matches are preserved under deformations. Some have proposed a method to estimate the vector field from the matches that achieved high performance in terms of speed and accuracy. They further proposed the use of machine learning methods to exploit the consensus of local neighborhood structures. Hence, the representation of local smoothing information is essential to the accuracy of non-parametric methods. In this disclosure, we describe an algorithm called expectation-maximization and dual quaternion (EMDQ). This algorithm generates the smooth deformation field by interpolating among the feature matches, simultaneously removing mismatches according to the deformation field. Dual quaternion is a mathematical tool that was introduced to the computer vision field by some for smooth interpolation among rigid transformations. To reduce the impact of mismatches during the interpolation, we use the expectation-maximization algorithm to adjust the weights of the feature matches.

In recent years, end-to-end deep learning-based outliers filtering methods have also been developed. For example, the Context Networks (CNe) proposed a deep neural network based on PointNet to distinguish correct and incorrect matches from the input coordinates of sparse feature matches, and many following works have been proposed.

However, the performance of these deep learning-based outliers filtering method in practical applications is still unclear.

Figure 11:
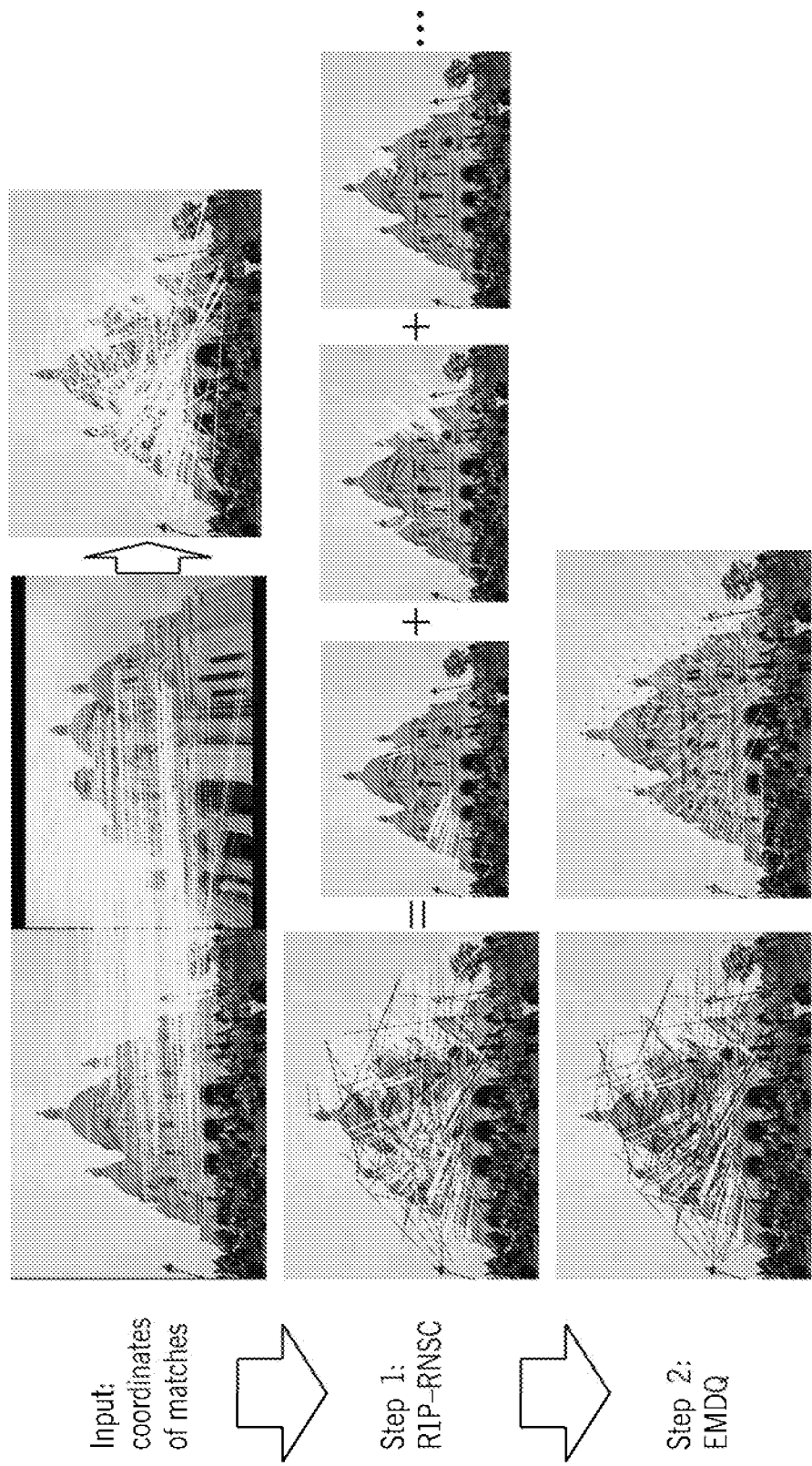
FIG. 11 shows an outline of the disclosed method to remove incorrect matches, or "mismatches". First row: The input images. The feature points were detected by AffNet, and the matches were built according to the AffNet descriptors using brute-force searching and the nearest neighbor ratio (NNR). Although the objects are rigid, the pixel displacements of the correct matches may be non-rigid owing to parallax. Second row: R1P-RNSC results assume that the non-rigid deformation can be represented by multiple rigid transformations. Third row: EMDQ results and the generated deformation field. In this example, it took approx. 20 ms to remove the outliers plus an additional 3 ms to generate the deformation field on the grid points.

The method described in this disclosure has been designed for rigid and smooth deforming environments. The input of our method is the pixel coordinates of two sets of feature matches. As shown in FIG. 11, our method includes two steps: R1P-RNSC and EMDQ. R1P-RNSC is used to extract rigid transformations of the feature matches, and the transformation model includes rotation, translation and scaling. The results of R1P-RNSC are essential to improving the accuracy of the interpolations derived from the subsequent EMDQ algorithm. The experimental results show that combining the two algorithms not only yields superior accuracy compared with other state-of-the-art methods, but also has sufficient speed for real-time applications. In addition, compared with other mismatch removal methods, our method can provide the deformation field for all image pixels. This approach has many potential applications, such as non-rigid image mosaicking.

One classic workflow of feature matching between two images is (1) detecting feature points and extracting the descriptors from the images, (2) creating a list of tentative matches by nearest-neighbor search in descriptor space, and (3) pre-filtering the incorrect feature matches. For the first step, there are many effective methods to detect key points and extract the descriptors from images, such as SIFT, SURF, ORB, A-SIFT, and LIFT. For the second step, there are also many works that aim to develop more robust and efficient matchers, such as FLAN N. A recent work has proposed a learning-based feature matching method and has achieved better accuracy. However, mismatches are often unavoidable after the first step, hence a following step to remove the mismatches is necessary. The problems in the first step have been studied for many years but less attention has been given to identifying outliers in the obtained matches.

It is very common for the correct matches in the images to have non-rigid deformations, because even when observing a rigid three-dimensional (3D) object from different angles and positions, the displacements of different parts of the object on the two-dimensional (2D) images are often non-rigid. Non-parametric methods are more flexible in handling the non-rigid deformation. For example, one group has proposed the ICF algorithm based on a diagnostic technique and SVM to learn correspondence functions that mutually map one point set to the other. Mismatches are then identified according to their consistency with the estimated correspondence functions. Another group proposed the SIM algorithm, which achieves affine invariance by computing the shape interaction matrices of two corresponding point sets. SIM detects the mismatches by removing the most disparate entries between the interaction matrices. Basically, these methods interpolate a non-parametric function by applying the prior condition, in which the motion field associated with the feature correspondence is slow-and-smooth. Similarly, a recent work proposed a regression algorithm based on as-smooth-as-possible piece-wise constraints to discover coherence from the input matches.

Graph matching is another type of feature-matching method that uses nodes and edges to represent features and connections, respectively. For example, one group has proposed a spectral approach using a weighted adjacency matrix to represent pairwise agreements between matches. Another group proposed a graph-matching optimization technique to minimize the energy function defined by the appearance and spatial arrangement of the features. Yet another group proposed a graph-based method to handle multiple patterns. Still another group proposed a method based on hierarchical agglomerative clustering. Although the graph-matching methods are flexible and can be used for multiple types of transformations, they suffer from their NP-hard nature.

Re-Weighting and 1-Point RANSAC (R1P-RNSC)

The input of our method is the pixel coordinates of two sets of feature matches. Under a reasonable assumption that a non-rigid deformation of the feature matches can be approximatively represented by multiple rigid transformations, we propose a method based on the re-weighting and 1-point RANSAC (R1P-RNSC) strategy to handle matching outliers when non-rigid deformation exists. Compared with traditional RANSAC methods that are based on 5-, 7-, or 8 control points, the ability to use only one control point to estimate the rigid transformations can naturally satisfy the requirement that all control points should have a similar rigid transformation.

The R1P-RNSC method is fast and can provide good initial values for the subsequent refinement step. The basic idea of R1P-RNSC was derived from our previous work, which studies the perspective-n-points (PnP) problem. The main differences of R1P-RNSC and our previous PnP algorithm are as follows: (1) R1P-RNSC studies the non-rigid 2D-2D correspondence problem while the PnP algorithm studies the rigid 3D-2D correspondence problem. (2) R1P-RNSC preserves multiple rigid transformations with a modified RANSAC framework to represent the non-rigid deformation, and the PnP algorithm uses standard RANSAC.

Re-Weighting

Denote the two coordinates of the ith match as $x_i \in \mathbb{R}^2$ and $y_i \in \mathbb{R}^2$, i=1,2, ... N. The rigid transformation between $x_i$ and $y_i$ can be represented by $$y_i = \mu(Rx_i + t) \tag{31}$$

where $R \in SO(2)$ is the rotation matrix, $t \in \mathbb{R}^2$ is the translation vector and $\mu \in \mathbb{R}$ is the scale factor.

In the R1P-RNSC algorithm, we randomly select a match o as the control point, then the coordinates of other matches with respect to match o are $$y_i - y_o = \mu R(x_i - x_o), \ i=1,2,\ldots,N, \tag{32}$$

which suggests that a rigid transform can be represented by R, $\mu$, $x_o$ and $y_o$. Because $x_o$ and $y_o$ are constants, only R and $\mu$ are needed to be estimated. R and $\mu$ can be obtained from $x_i$ and $y_i$, i=1,2, ... N, by $$[E, \Sigma, V^T] = \text{svd}(YX^T), \ R = UV^T, \tag{33}$$

$$\mu = \|\text{vector}(Y)\| / \|\text{vector}(X)\|, \tag{34}$$

where $$X = [x_1 - x_o \ldots x_N x_o]_{2 \times N}, \tag{35}$$

$$Y = [y_1 - y_o \ldots y_N y_o]_{2 \times N}, \tag{36}$$

Because incorrect matches exist and not all correct matches can fit into the rigid transform of match o, the estimation of the rigid transformation represented by R and $\mu$ may be incorrect. We propose a re-weighting method to dynamically update the weights of matches i=1,2, ... N by $$d_i = \|y_i - y_o - \mu R(x_i - x_o)\|, \ ( \tag{37}$$

$$w_i = \min(H/d_i, 1) \tag{38}$$

where d i is the error distance of match i with the estimated R and $\mu$, H is a pre-defined threshold that when the error distance $d_i$<H, match i is recognized as correct.

With the obtained weights of matches $w_i$, i=1,2, ... N, the related items of matrices X and Y are adjusted according to the weights. Small weights $w_i$ will be assigned to both incorrect matches and correct matches that cannot fit into the same rigid transformation of match o, hence the estimation of R and $\mu$ in (33) and (34) will not be affected.

We perform the re-weighting strategy within an iterative process. With a randomly selected match o as the control point, we set the initial values of weights as $w_i$ for i=1, 2, ... N. Then, we alternatively update R and $\mu$ according to (33) and (34), and update the weights of matches $w_i$ according to (37) and (38). In practice we find this iteration process only requires a very small number of iterations to converge, and we choose the number of iterations 3 in the experiments.

At the end of the iteration process, we recover the translation t by $$t = y_o/\mu - R x_o, \quad (39)$$

which is not needed by R1P-RNSC for removing incorrect matches, but the subsequent EMDQ algorithm requires the estimation results of rigid transformations represented by R, t and $\mu$ to generate the initial dual quaternions.

Modified RANSAC

Traditional RANSAC methods aim to find the consensus that is supported by the most number of input data, and other consensuses are simply abandoned. It is difficult to use a single parametric transformation to represent the non-rigid deformation. To solve this problem, we propose to use multiple rigid transformations. In the R1P-RNSC algorithm, the rigid transformations are obtained in different RANSAC trials with different control points o. Hence, it is necessary to modify the standard RANSAC methods to reserve the obtained rigid transformations and design a new termination condition.

Results Reservation

Within the RANSAC framework, we randomly try different matches as the control point o. With a control point o, some matches may have small error distances $d_i$ as in (37) and can be considered as the candidate inliers. Denote the number of candidate inliers detected with control point o as $T_o$, we omit the results if $T_o < T_{min}$, where $T_{min} \in \mathbb{R}$ is a threshold. A small $T_o$ suggests that the selected match o may be incorrect and the results obtained from should be omitted. If $T_o > T_{min}$, we add the candidate inliers to the final detection results, and update the inliers ratio by $$\gamma = N_{inliers}/N, \quad (40)$$

where $N_{inliers}$ is the total number of detected inliers.

In our algorithm, the control point o is only selected from the matches that are not considered correct so far, which aims to avoid repeatedly find the same rigid transformation.

RANSAC Termination

The standard termination condition of RANSAC is determined by the number of trials and the largest number of detected inliers in one trial, which needs to be modified for the R1P-RNSC algorithm. The basic idea of the modified RANSAC termination condition is to terminate the RANSAC process when inliers are unlikely to exist in the remaining matches.

$T_{min}$ is the minimal number of inliers detected by one trial that can be reserved. Assuming that there exists a set of $T_{min}$ inliers in the remaining matches, then the possibility that a selected control point o belongs to this set of inliers is $T_{min}/(N-\gamma N)$. Then, the possibility that after k trials of different control point o, the possibility that a set of $T_{min}$ inliers is not found is $(1-T_{min}/(N-\gamma N))^k$, which equals to 1−p. p is the widely used RANSAC parameter, which suggests the desired probability that the RANSAC algorithm provides a useful result after running and in our algorithm we set p=0.95. Hence, the termination of our 1-point RANSAC framework is $$k > \frac{\log(1-p)}{\log(1-T_{min}/(N-\gamma N))}, \quad (41)$$

where k is the number of RANSAC trials.

Sparse Implementation

The R1P-RNSC algorithm computes the rigid transformations by re-weighting all matches. A more efficient way is to use a small number of sample points $N_{sparse} < N$ to compute the rigid transformations, and then apply the obtained rigid transformations back to all matches to determine inliers and outliers. This sparse implementation is less accurate because it may miss possible rigid transformations to represent the non-rigid deformation, but is faster due the the smaller number of matches involved in the re-weighting process.

R1P-RNSC

The proposed R1P-RNSC algorithm (see FIG. 11A) is a parametric method that is efficient in estimating rigid transformations from the matches when outliers exist. It is worth nothing that R1P-RNSC does not consider the distances between feature matches. Hence, the obtained rigid transformations are not restricted to small local areas. For example, if the transformation between the two images is rigid, R1P-RNSC will only need one RANSAC trail to cover all feature matches. Compared with the multi-affine method that splits the images into small local areas, our R1P-RNSC method can take into account all matches at the same time and is hundreds of times faster. However, the neglect of local smoothing information limits the accuracy of R1P-RNSC. To solve this problem, we propose a non-parametric algorithm called as EMDQ as the refinement step, which generates the smooth deformation field by interpolating among the correct matches, and simultaneously remove incorrect matches according to the deformation field.

Expectation Maximization and Dual Quaternion (EMDQ)

We disclose a non-parametric algorithm called as EMDQ to remove incorrect matches by generating the smooth deformation field. Denote a deformation field as f, f ($x_i$) is the displacement of $x_i$ caused by f. Correct matches should be consistent with the deformation field f, which suggest $$y_i = f(x_i) \quad (42)$$

if match i is correct.

According to (42), the proposed EMDQ algorithm distinguishes correct and incorrect matches according to the error distances between $y_i$ and f ($x_i$), i=1,2, ... N. The ability to generate the smooth deformation field f from a mixed set of correct and incorrect matches is essential, and we employ dual quaternion to solve this problem.

Dual Quaternion-Based Deformation Field

We assign discrete transformations $g_i$, i=1,2, ... N to all matches, and the smooth deformation field f is generated by interpolating among $g_i$. According to (31), a transformation $g_i$ includes the rotation $R_i$, the translation $t_i$ and the scale $\mu_i$, which moves coordinate $x_i$ to $y_i$ by $$y_i = g_i(x_i) = \mu_i(R_i x_i + t_i). \quad (43)$$

Then, the value of f at a location is equal to the weighted average value of neighboring $g_i$. In this mismatches removal problem, we mainly focus on the values of f at the locations of the matches $x_i$, i=1,2, ... N, that is $$f_{x_i} = \Sigma_{j=1}^N w_j^i g_j, \quad (44)$$

where $w_j^i$ is the weight that suggests the impact from match j to i. $f_{x_i}$ is the value of f at the coordinate $x_i$. This weighted average strategy (44) suggests that only when the transformations of neighboring matches are consistent with that of a match i, then match i can be recognized as correct according to (42).

However, when performing interpolation according to (44), the use of the rotation matrices and translation vectors as in (43) may lead to inaccurate results. To overcome this difficulty, we use a mathematics tool called as dual quaternion (DQ) for smooth interpolation.

A DQ is a 8-dimension vector that can represent a 3D rotation and a 3D translation simultaneously. A 2D transform can be considered as a 3D transform that is restricted at the z=0 plane, and 4 out of the 8 components of a DQ is always zero. To improve the efficiency, we only compute the 4 non-zero components in our EMDQ implementation. Denote a dual quaternion related to match i as $q_i$, we have $$y_i = g_i(x_i) = \mu_i q_i(x_i) \quad (45)$$

where $q_i(x_i)$ suggests to apply $q_i$ to the coordinate $x_i \in \mathbb{R}^D$ to obtain a transformed coordinate.

According to (44) and (45), the deformation field f at the location $x_i$ is determined by the weighted average value of $\mu_j$ and $q_j$, that is $$f_{x_i} = \bar{\mu}_i \bar{q}_i \quad (46)$$

where $$\bar{q}_i = \Sigma_{j=1}^N (w_j^i q_j) / \|\Sigma_{j=1}^N (w_j^i q_j)\|_{dq}, \quad (47)$$

$$\bar{\mu}_i = \Sigma_{j=1}^N (w_j^i q_j) / \Sigma_{j=1}^N (w_j^i q_j), \quad (48)$$

where $\|\cdot\|_{dq}$ is the norm of the dual quaternion. Many works in the computer graphics field have proven the feasibility and efficiency of using the linear combination of DQ as in (47) to generate smooth interpolations. For example, by using DQ-based interpolation from skeletons, the motion of the skin surface of a mesh model can be generated. However, due to the existence of incorrect matches, the interpolation process (47) and (48) may be incorrect. One way to reduce the impacts of outliers is to assign a small weight $w_j^i$ when match j is incorrect. Hence, we employ the expectation maximization (EM) algorithm to dynamically update the weights $w_j^i$ in the EM iteration process.

EM Algorithm

The EM algorithm (see FIG. 11B) is an iterative process that alternatively performs two steps. In the E-step, the probabilities of matches being correct, or "inliers", are computed, and the weights $w_j^i$ are further updated. In the M-step, the deformation field f is updated according to the weights $w_j^i$. The details of the EM algorithm is as follows.

(1) E-step:

Inspired by work of others, we consider the mismatches removal problem as a classification problem according to the error distances between $y_i$ and $f(x_i)$, i=1,2, ... N. With a deformation field f, we have $$p(i|\text{inlier}) = \frac{1}{2\pi\sigma^2} \exp\left(\frac{\|y_i - f(x_i)\|^2}{2\sigma^2}\right) \quad (49)$$

where $\sigma$ is the standard deviation.

We consider the incorrect matches, or "outliers", follow an uniform distribution, that is $$p(i|\text{outlier}) = \alpha, \quad (50)$$

where $\alpha$ is a constant.

Denote $\gamma$ as the inliers ratio, we have p(inlier)=$\gamma$ and p(outlier)=1-$\gamma$. According to Bayes' theorem, we have $$p(\text{inlier}|i) = \frac{p(i|\text{inlier})p(\text{inlier})}{p(i|\text{inlier})p(\text{inlier}) + p(i|\text{outlier})p(\text{outlier})} = \quad (51)$$

$$\frac{\exp(\|y_i - f(x_i)\|^2 / 2\sigma^2)}{\exp(\|y_i - f(x_i)\|^2 / 2\sigma^2) + 2\pi\sigma^2 \frac{(1-\gamma)}{\gamma} a}$$

p(inlier|i) suggests the probability that match i is an inlier. We adjust the weight $w_j^i$, which is the influence of match j to match i, according to p(inlier|j). Taking into account the distances between matches, $w_j^i$ is determined by two parts, that is $$w_j^i = w_{j,distance}^i p(\text{inlier}|j), \quad (52)$$

where $w_{j,distance}^i$ is determined by the distance between match i and j, that is $$w_{j,distance}^i = \max\left(\exp\left(\frac{\|y_i - y_j\|^2}{2r^2}\right), \exp\left(\frac{\|x_i - x_j\|^2}{2r^2}\right)\right) \quad (53)$$

where r∈ $\mathbb{R}$ is a pre-defined radius. Because $w_{j,distance}^i$ does not contain variables, we only compute it at the initial phase. Eq. (53) treats the two images equally, which can improve the accuracy when computing the local smooth deformation field because the distances between feature matches in both images can be taken into account.

(2) M-Step:

According to the updated weight $w_j^i$, we update $\bar{q}_i$ and $\bar{\mu}_i$ for each match i according to (47) and (48) respectively, which represent the value of the deformation field f at $x_i$, or $f_{x_i}$.

The standard deviation $\sigma$ is updated by $$\sigma^2 = \Sigma_{i=1}^N (p(\text{inlier}|i) \forall y_i - f(x_i)\|^2) / \Sigma_{i=1}^N p(\text{inlier}|i). \quad (54)$$

Finally, we update $q_i$ to keep the transformation $g_i$ close to the deformation field $$\Delta q_i = \text{trans2dq}((y_i - f(x_i))/\bar{\mu}_i), \quad (55)$$

$$q_{i,new} = q_{i,old} \Delta q_i. \quad (56)$$

Equations (55)-(56) aim to keep (45) holding and make the transforms $g_i$ more smooth, and trans2dq represents the conversion of the transform to the DQ representation.

The termination condition of the EM algorithm determined by the change p(inlier|i), that is $$\frac{1}{N}\left(\sum_{i=1}^{N} |p(\text{inlier}|i)^{(k)} - p(\text{inlier}|i)^{(k-1)}|\right) < \theta, \quad (57)$$

where $\theta$ is a threshold. k suggests the value of the kth iteration in the EM algorithm. After termination, matches with $$p(\text{inlier}|i) > p_{min} \text{ and } y_i - f(x_i) < H \quad (55)$$

are considered as inliers, where $p_{min}$ is a threshold and H is the same threshold used in the R1P-RNSC algorithm.

Initialization from R1P-RNSC Results

There are mainly three variables in the EMDQ algorithm that need to be initialized, which include the dual quaternions $q_i$, the scale factors $\mu_i$ and the weights between matches $w_j^i$. According to (52), $w_j^i$ is determined by $w_{j,distance}^i$ and p(inliers||j), and $w_{j,distance}^i$ is constant in the EM iterations. The initial values of the three variables determine the initial deformation field f according to (44), and we use the results of R1P-RNSC for the initialization.

Figure 12:
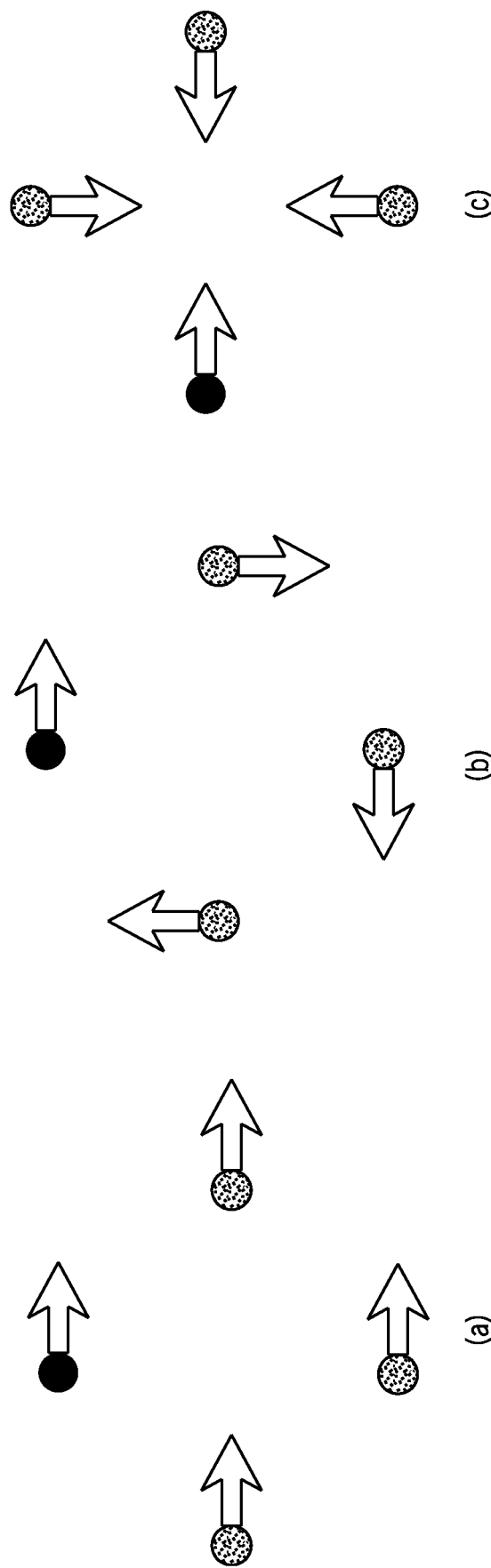
FIG. 12 shows a toy model in which the estimation of rigid transformations by R1P-RNSC can improve the accuracy of deformation field generation, which is essential for the subsequent EMDQ algorithm. The black points in (Panel a), (Panel b), and (Panel c) have the same displacements, which are caused by translation, rotation and scaling, respectively, according to the neighboring blue points. Hence, when performing an interpolation, the effects of the black points on the neighboring areas should be different for each of the three cases.
Figure 13:
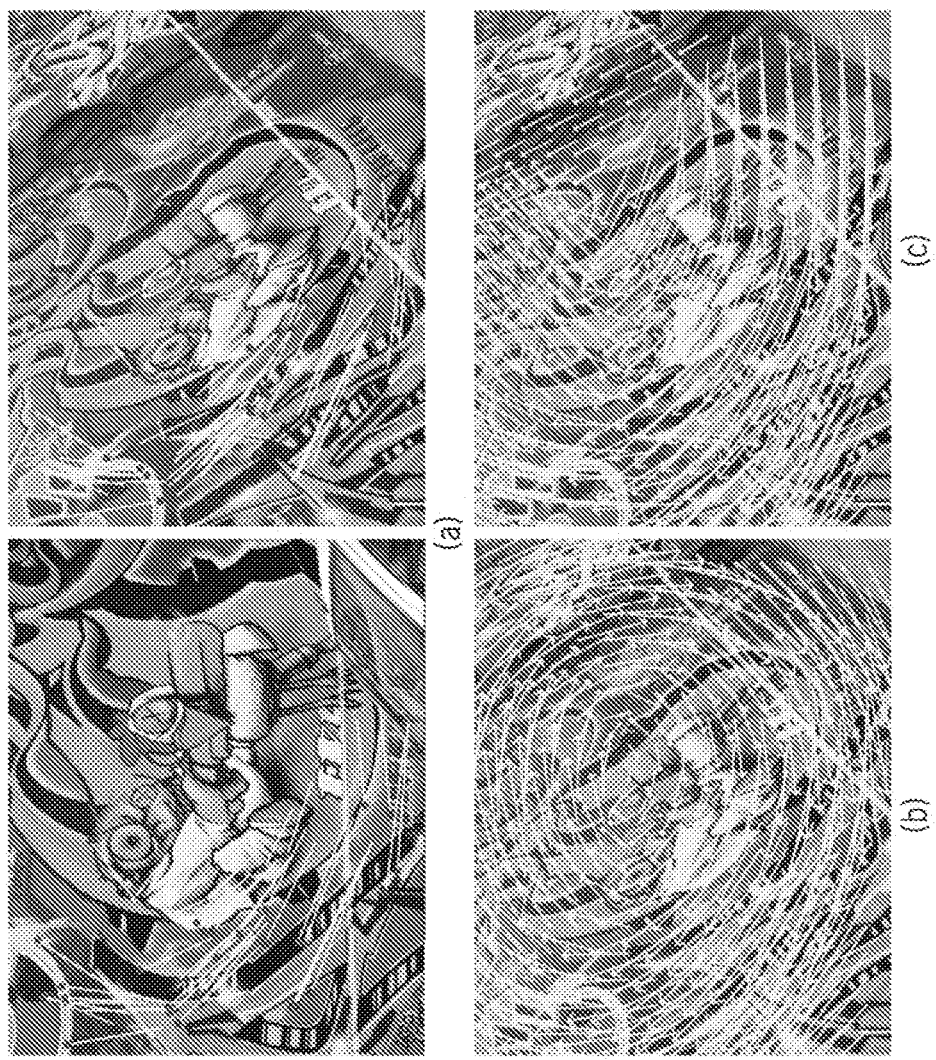
FIG. 13 shows: (Panel a) Two images showing the correct SURF matches between them. (Panel b) The deformation field obtained by interpolating among the dual quaternions of the SURF matches according to the R1P-RNSC results. (Panel c) The resultant deformation field without using R1P-RNSC results. This field considers the displacement of the feature matches caused by translational motions only (FIG. 12). The deformation field in (Panel b) is more accurate. Since EMDQ uses the deformation field for mismatches removal, the R1P-RNSC results can also improve the accuracy of mismatches removal.

The proposed R1P-RNSC algorithm detects multiple rigid transformations. If a match i is considered as an inlier with a rigid transformation detected by R1P-RNSC, then the related $q_i$ and $\mu_i$ will be initialized according to the results. A match i may satisfy multiple rigid transformations, and we use the one that has the least error for EMDQ initialization. The rigid transformations obtained by R1P-RNSC can improve the accuracy of the interpolation, as shown in FIGS. 12 and 13.

The initial values of p(inliers|i) are important for reducing the impact of outliers when generating the initial deformation field f. The natural idea is to initialize p(inliers|i)=1 if match i is recognized as an inlier by R1P-RNSC, or p(inliers|i)=0. However, because at some local areas, there may be more false positives than true positives in the R1P-RNSC results, and the generated deformation field f yields false positives. We propose a simple method to overcome this problem according to the uncertainty of the detected rigid transformations provided by R1P-RNSC. With match o as the control point, R1P-RNSC may find different number of inliers, which is denoted as $T_o$. It is intuitive that when $T_o$ is large, the results are more reliable. Hence, we initialize $$p(\text{inliers}|i) = T_o / \Sigma T_o(i) \quad (59)$$

if match i is recognized as an inlier with match o as the control point. This allows that f is initially generated from the most reliable matches.

Experiments

The performance of the proposed EMDQ algorithm was evaluated against the state-of-the-art mismatch removal methods. The source code was implemented in MATLAB and executed on a computer with an Intel Core i7 2.60 GHz CPU. The Matlab code also includes the other methods that are used for comparison in this disclosure. In our MATLAB implementation, we used the vlfeat open source library for generating the kd-tree to obtain the neighboring matches.

The parameters are as follows: H=20 pixels is the inliers threshold; $T_{min}$=≡is the least number of correct matches found by one R1P-RNSC trial that will be added to the final R1P-RNSC results; r=80 pixels is the radius to compute $w_{j,distance}^i$ between matches; $\alpha$=1e−5 is used for computing p(i|outlier); $p_{min}$=0.5 is the threshold for EMDQ to determine inliers and outliers; $\theta$=0.005 is threshold used in the termination condition of EMDQ iterations; $N_{neighbor}$=20 is the number of neighboring matches that are considered in the EMDQ algorithm, which are found by kd-tree. $N_{sparse}$=min(100,N). The above parameters are not sensitive. For example, in practice we found that using a significantly different parameters H=100 does not change the results in most situations. However, when the deformation or distortion between two images are large, we suggest to use a larger H to make R1P-RNSC can tolerate larger differences between the estimated rigid transformations and the real non-rigid deformation.

The EMDQ algorithm has been designed for rigid or smooth deforming environments. Hence, the experiments were conducted on the two situations.

Rigid Environment

The rigid environment experiments were mainly conducted on DTU robot image data, which provides images and the related 3D point cloud obtained by the structured light scan. The camera was fully calibrated and the true values of the camera positions and orientations are known. Images have a resolution of 800×600. Datasets numbered 1 to 30 were used. In each dataset, the images were captured under 19 different illumination situations and from 119 camera positions. We randomly selected 5 out of 19 illumination situations. Hence, a total of 30×5×119=17850 images were included in this evaluation. Following instruction of the DTU dataset, for each dataset and illumination situation, we used image number 25 as the reference image and performed SURF matching between the reference image and other images, which were captured within approximately ±36 degrees of the reference image. A larger camera shot angle between two images often leads to a larger percentage of incorrect matches. By re-projecting the 3D point clouds to the images according to the true values of the camera positions and orientations, we designated matches with a re-projection error smaller than 10 pixels as inliers.

The EMDQ algorithm requires R1P-RNSC for initialization. Hence, in this section, EMDQ reports the final accuracy and runtime results of the R1P-RNSC and EMDQ algorithms combined, whereas the sEMDQ reports the results when using the sparse implementation of R1P-RNSC. We also provide the results of EMDQ without using R1P-RNSC initialization, which is denoted as EMDQ (no RNSC). EMDQ (no RNSC) was initialized under the assumption that displacements of the feature matches were caused by translational motions only, which suggests $\mu$=1 and R=I for all matches.

The mismatch removal methods used for comparison included AHC, LPM, LMR, SIM, VFC, Context Network (CNe), and OANet. All these methods have been recently proposed and thus reflect state-of-the-art performance. Among these methods, CNe, OANet and LMR are deep learning-based mismatch filtering methods, and the others are not learning-based. For our experiments, we used the pre-trained models provided by the authors of the machine learning-based methods. We have also included the traditional RANSAC+homography and RANSAC+epipolar geometry methods. VFC has a fast version and a sparse version, referred to as fVFC and sVFC, respectively. AHC is a very fast method for removing matching outliers and focuses on 3×3 projective transformations, namely, planar homographies. However, for the DTU dataset, the images were captured with rotating 3D objects; hence, the planar homographies assumption may not stand.

Figure 14:
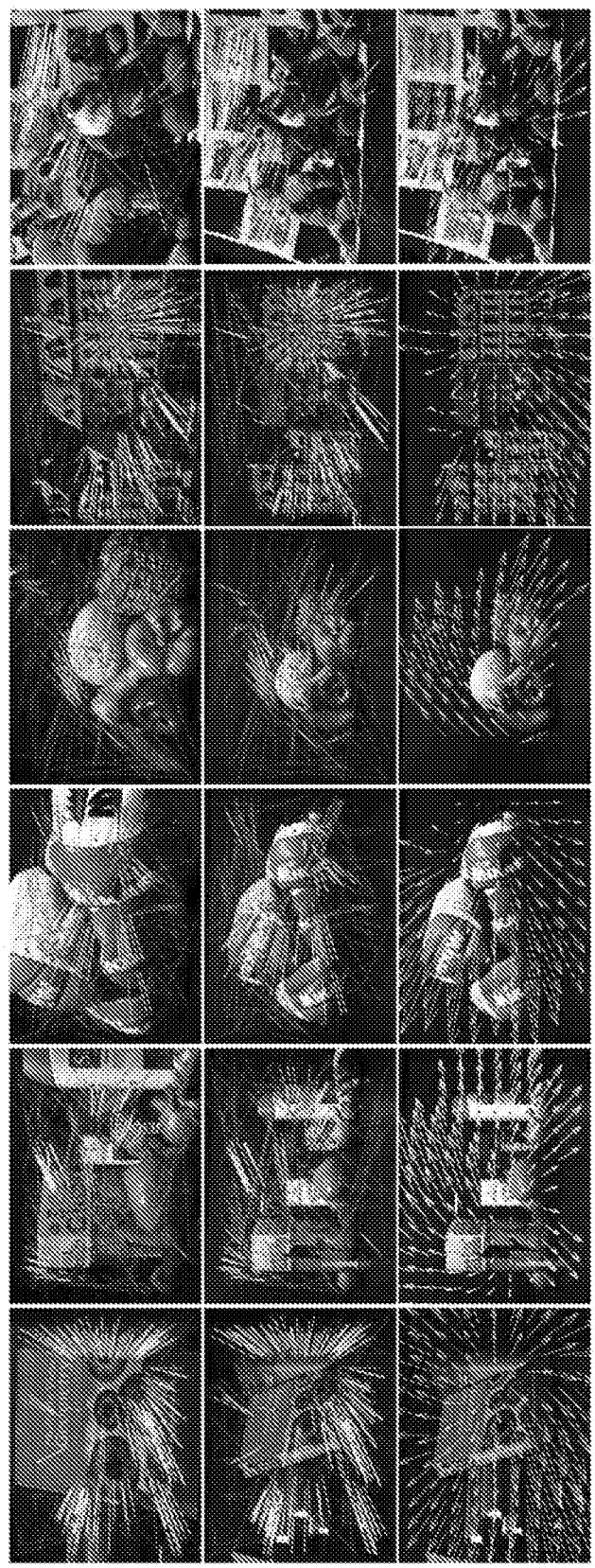
FIG. 14 shows samples of the results of EMDQ on the DTU images with SURF matches. First and second rows: two images are shown with SURF matches. The yellow and red lines have been identified as inliers and outliers, respectively, by EMDQ. Third row: the generated deformation field on grid sample points, which are obtained by taking the weighted average of neighboring q and μ of the match inliers. The deformation field is shown only at locations close to the match inliers, suggesting lower uncertainty.

As shown in FIG. 14, the total number of matches and the percentage of outliers varied with objects, illumination situations and camera pose. Although clear comparisons require only one factor be different, this kind of variable-controlling is difficult when evaluating real-world data because the SURF matching results are unpredictable. In experiments, we found that the accuracy of the outlier removal algorithms was mainly affected by the percentage of outliers, and the runtime was mainly affected by the total number of matches. Therefore, in this section, we report the accuracy and runtime evaluation results by comparing the statistical results for each percentage of outliers and the range of total number of matches, respectively.

For accuracy evaluation, we report four metrics, which include the number of errors, F-score, recall and precision. The number of errors suggests the total number of differences between the ground truth and the inliers-outliers recognition results. F-score is widely used for statistical analysis of binary classification, and we use the balanced F-score $$F\text{-score} = 2\text{Recall} \cdot \text{Precision}/(\text{Recall} + \text{Precision}) \quad (60)$$

for the DTU experiments. We are aware that the Precision rate is relatively more important for the mismatches removal task, and there exist F-score that can weight Precision higher than recall. However, our experimental results show that our methods have better Precision rates than most other methods. Hence, the balanced F-score in Eq. (30) may reflect the performance of our method better.

Figure 15:
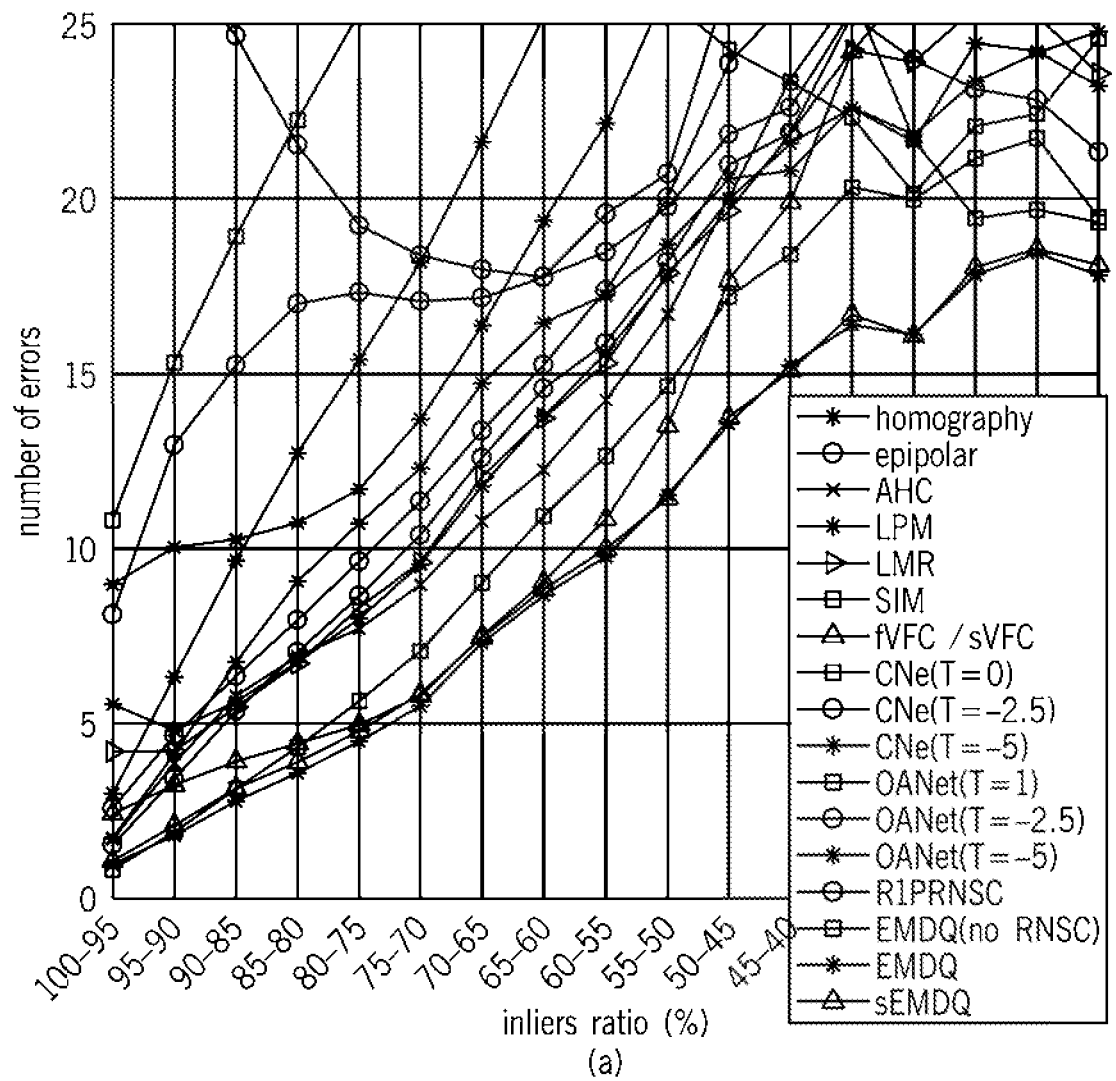
FIG. 15 shows accuracy results on the DTU data. (Panel a) Number of errors. (Panel b) F-score. (Panel c) Recall. (Panel d) Precision.
Figure 15:
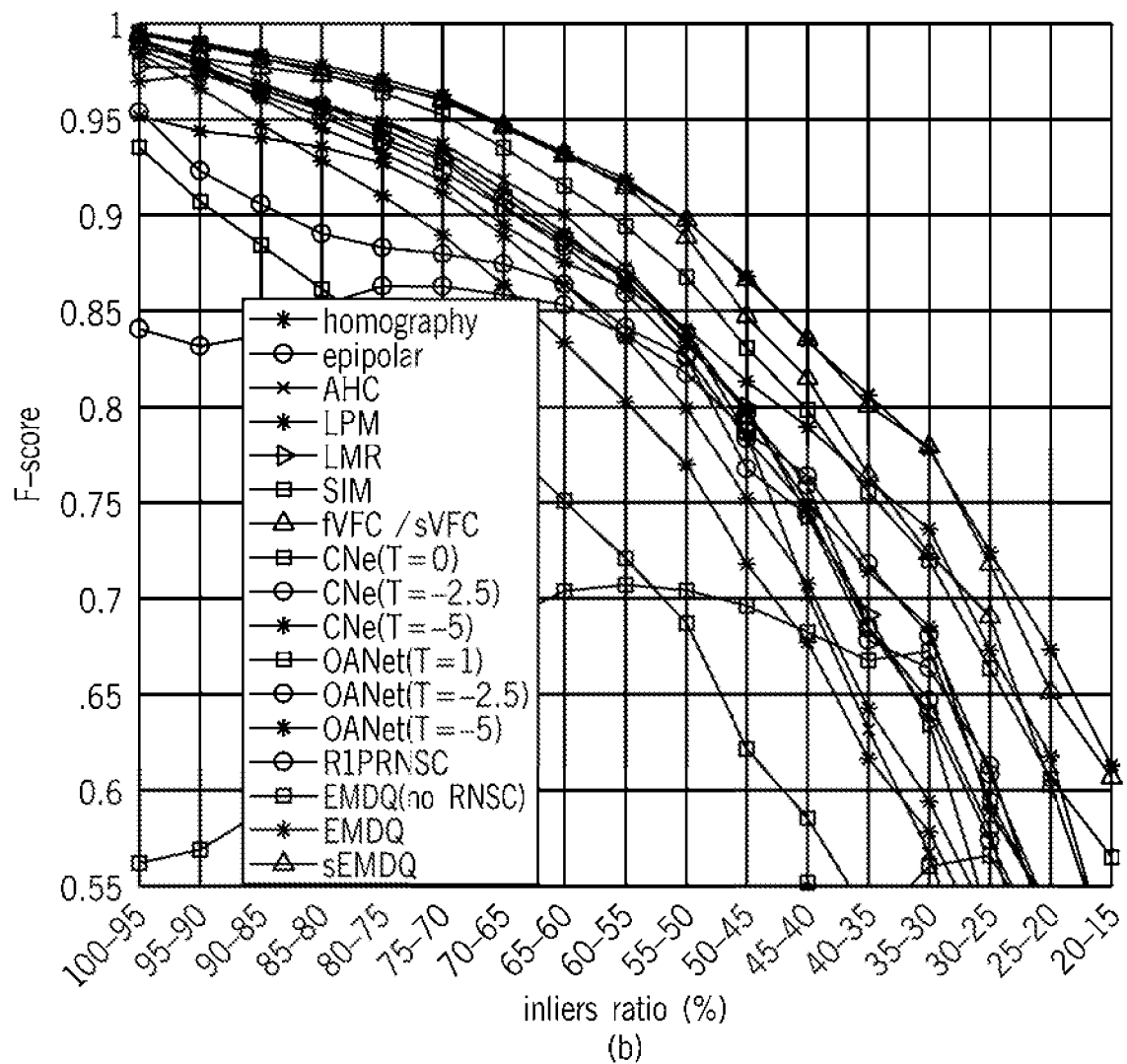
Figure 15:
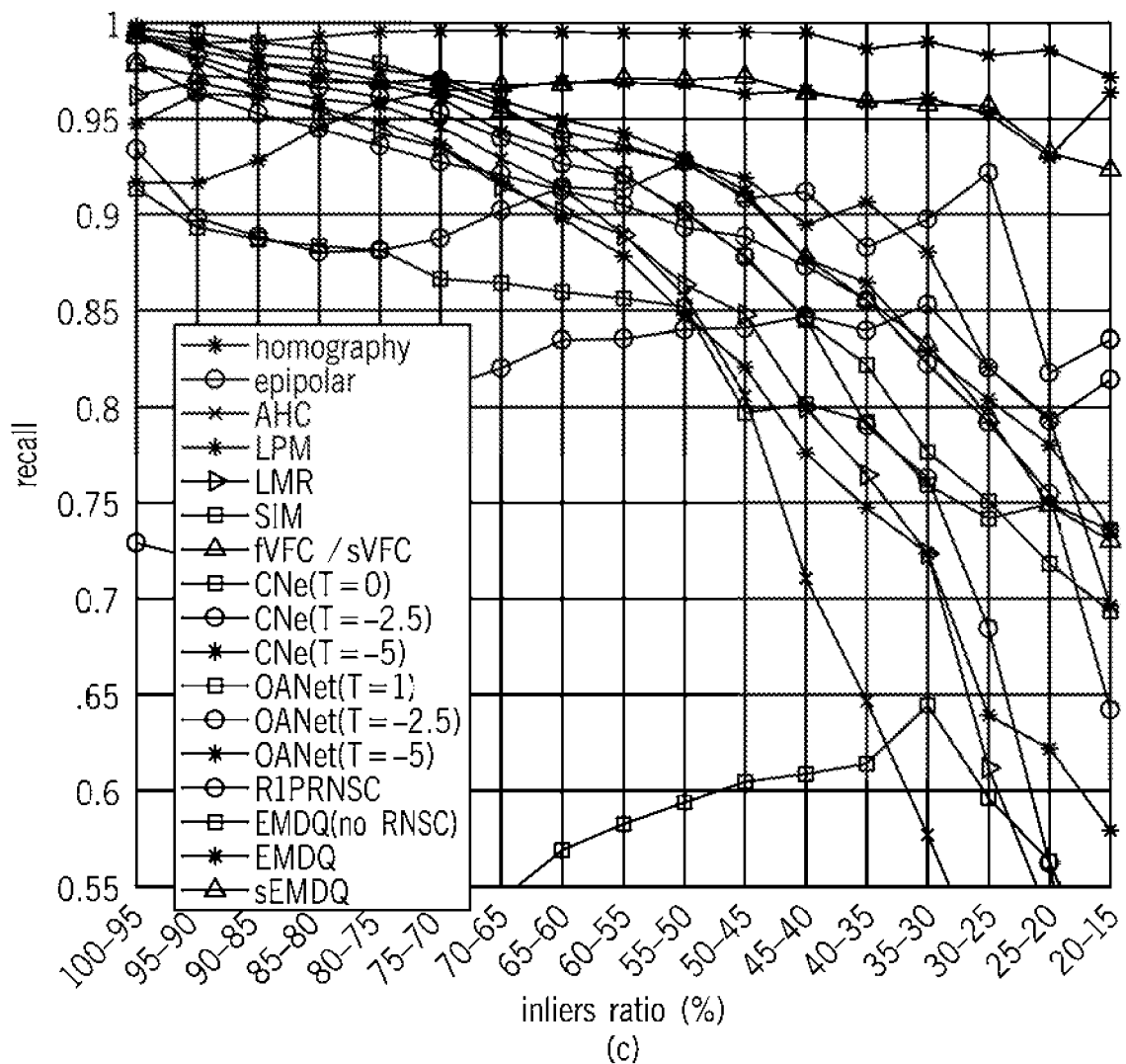
Figure 15:
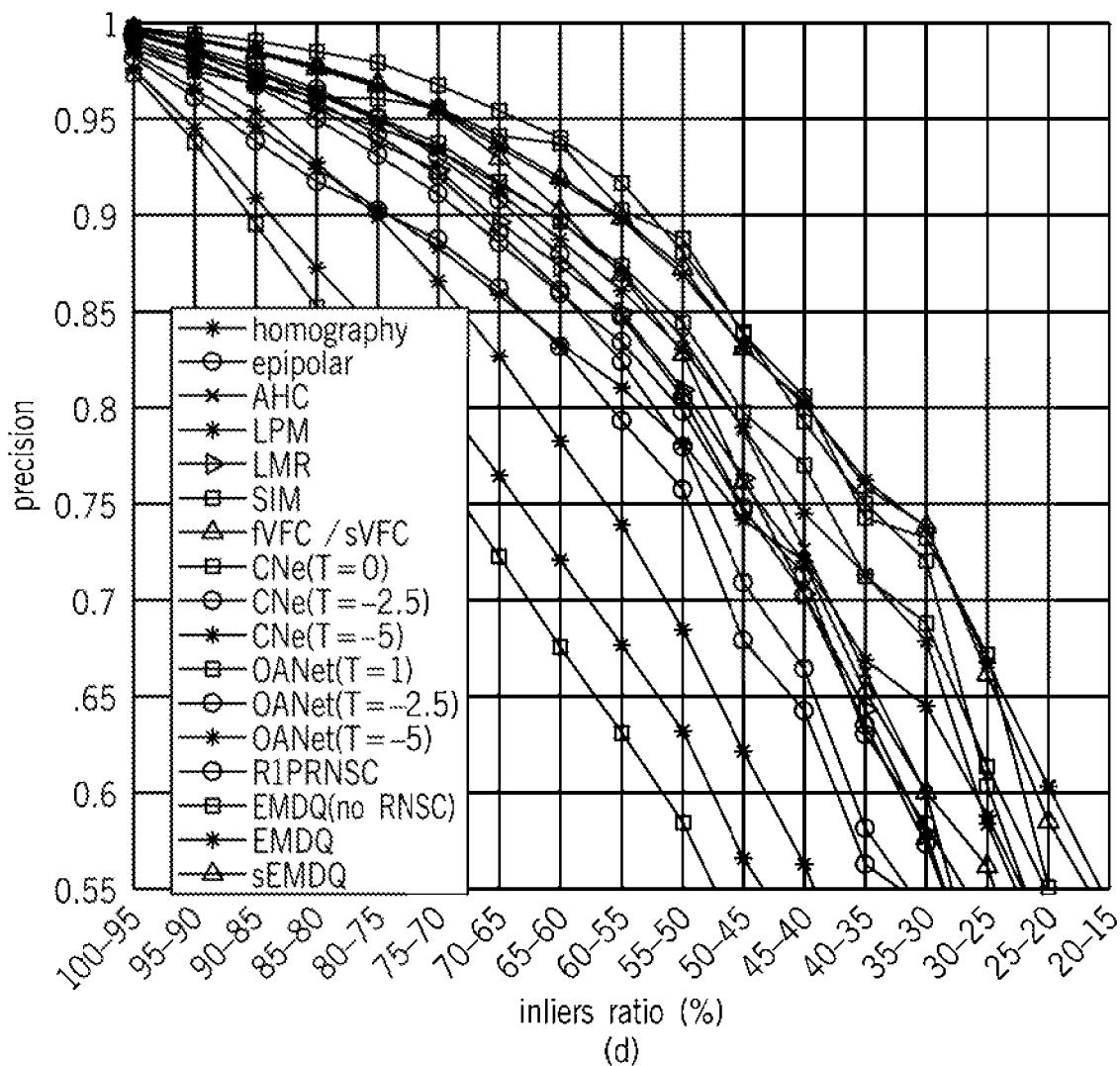
Figure 17:
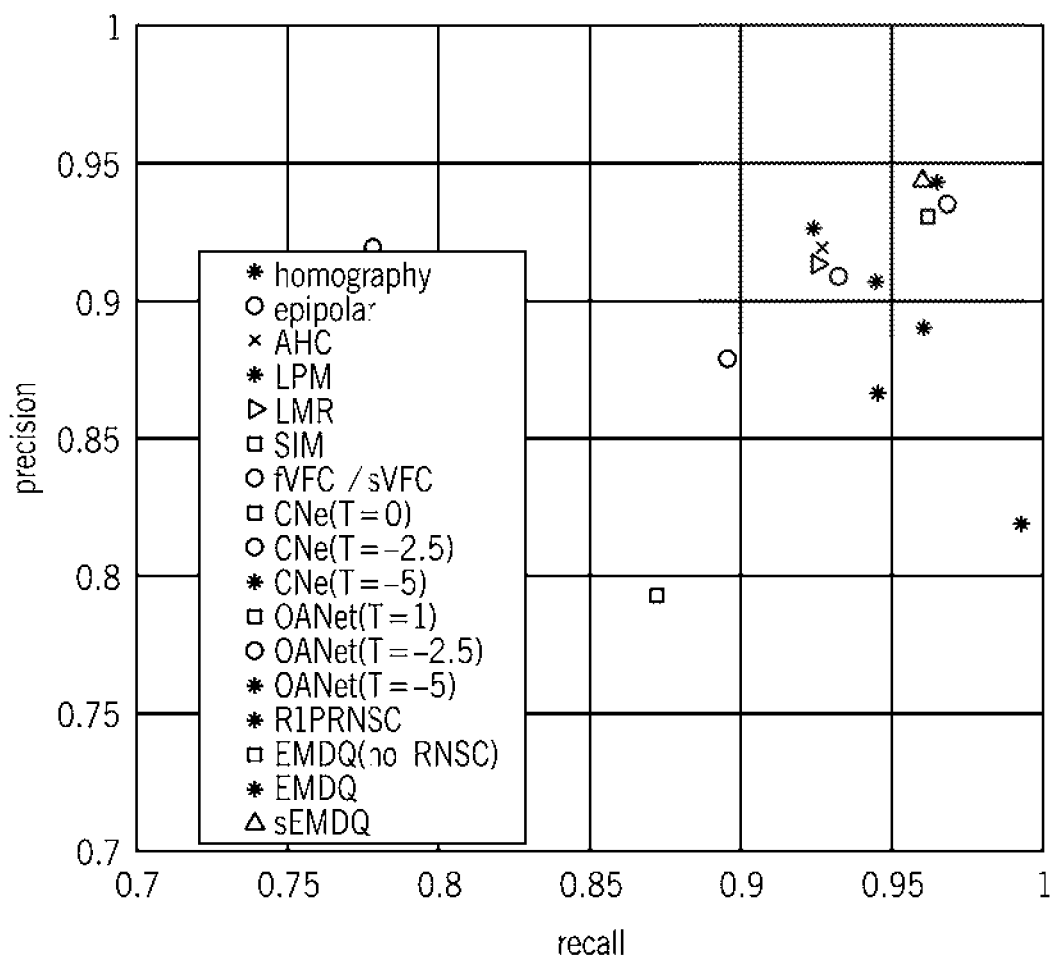
FIG. 17 shows overall precision and recall rates of the DTU experiments in FIG. 15.

As shown in FIGS. 15 and 17, the proposed EMDQ method has the highest accuracy in terms of number of errors and the F-score. sEMDQ did not show an obvious decrease in accuracy compared with EMDQ. fVFC and sVFC yielded very similar results; hence, we combined them in FIG. 15. When the inliers ratio was high, the recall rate of fVFC/sVFC was lower than EMDQ/sEMDQ but the precision rate was slightly higher. As the inliers ratio decreased, the precision rate of fVFC/sVFC dropped significantly, which decreased the F-score significantly although the recall rate remained high. When we compared EMDQ and EMDQ (no RNSC), it became clear that R1P-RNSC initialization improves the accuracy of EMDQ. FIG. 15 shows that EMDQ (no RNSC) has a similar accuracy with EMDQ when the percentage of outliers is low because a low percentage of outliers often suggests a small change of camera pose between the two images. Hence, the translational motion-based initialization is similar to the R1P-RNSC initialization. The direct outputs of Context Network (CNe) and OANet are the scores for each pair of matches that suggest the binary classification results, and we report the results with different thresholds in FIG. 15. When using a strict threshold T=0 or T=1, CNe and OANet only considered a few matches to be correct. Therefore, its precision rate is high but the recall rate is much lower than other methods. In our experiments, we found the threshold T=−2.5 yielded a balanced trade-off between precision and recall for CNe and OANet; however, the number of errors and the F-score were not very satisfying.

Figure 16:
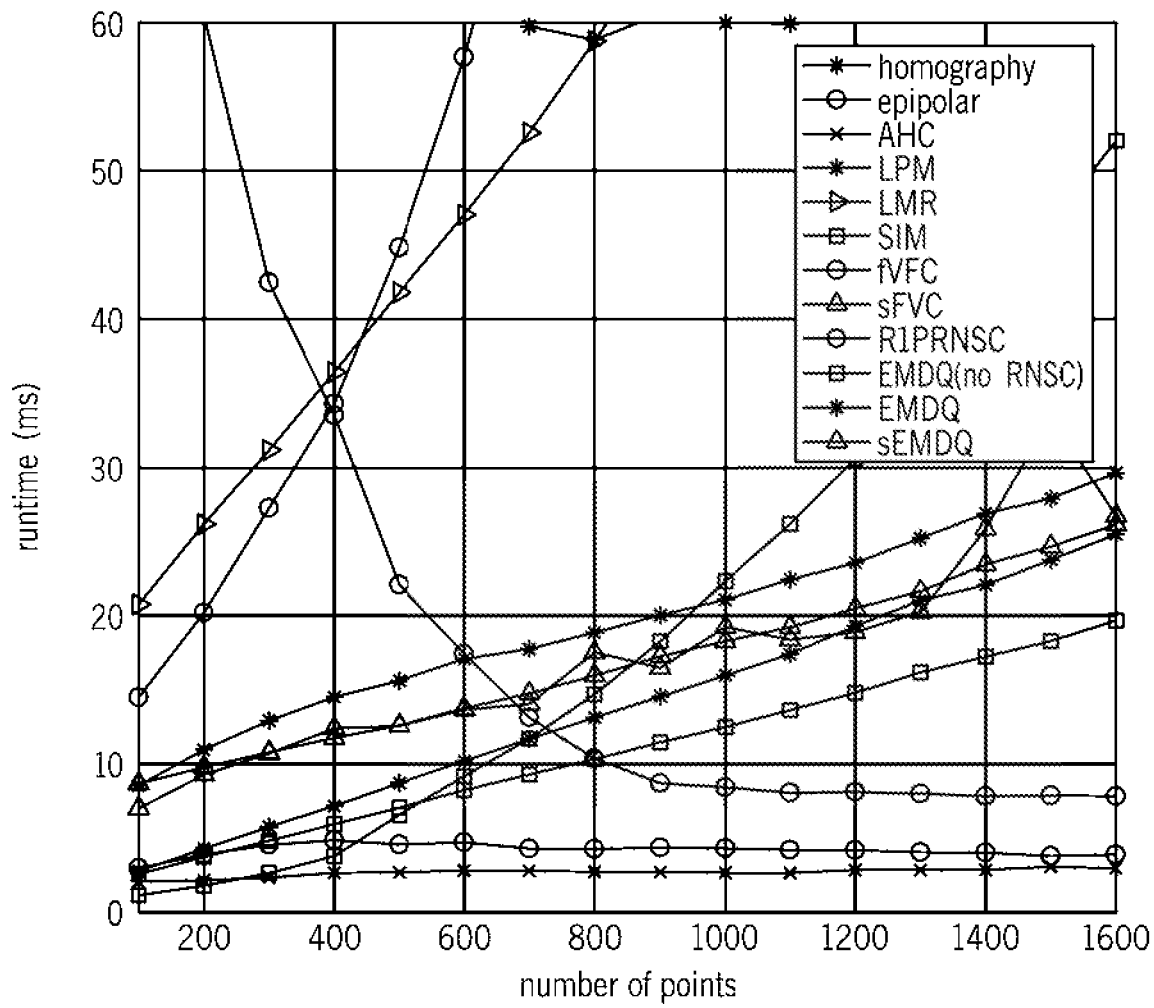
FIG. 16 shows runtime results on the DTU data.

As shown in FIG. 16, sEMDQ had a comparable runtime with sVFC. AHC was fastest because it assumes that the object is planar, namely the planar homographies problem. This assumption makes AHC not suitable for solving the general outliers removal problem. Hence as shown in FIG. 15, the accuracy of AHC was lower than EMDQ and VFC. EMDQ were among the most performant methods in terms of speed.

Figure 18:
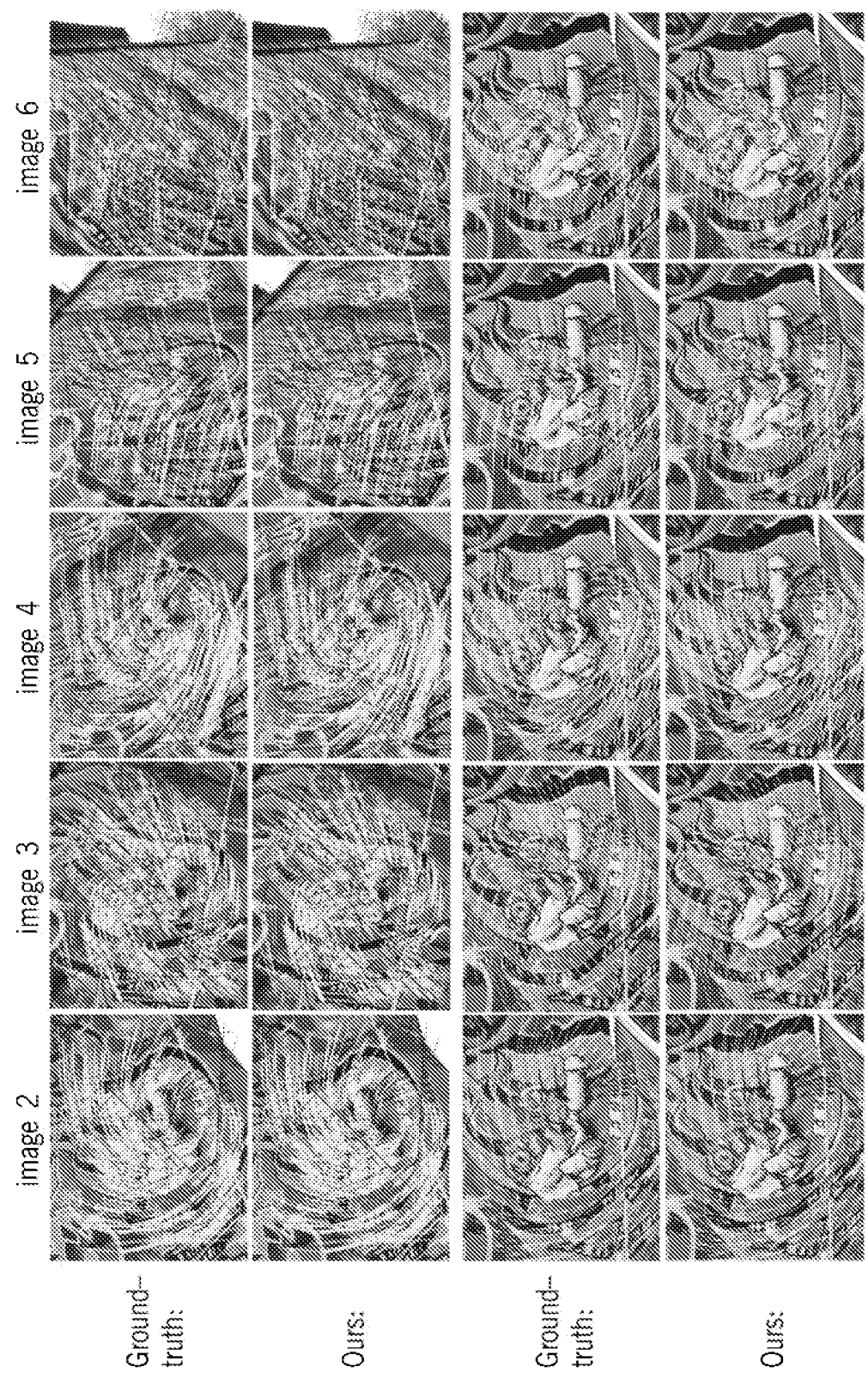
FIG. 18 shows experiments on the Graffiti data from the VGG dataset with AffNet matches, the object is rigid and planer and the ground-truth homography matrices are known. We detected feature points using the AffNet and then matched image 1 with other images using brute-force matching in the descriptor space.

Another quantitative experiment was conducted on the VGG dataset, as shown in FIG. 18. The data include planar rigid objects, and the ground-truth homography matrices are given. In this experiment, we used the AffNet method to detect feature points and extract descriptors, and matches were built according to the AffNet descriptors using brute-force searching and the nearest neighbor ratio (NNR) (threshold=0.8). AffNet finds many more matches than SURF especially when the two images have significant orientations. The quantitative results are given in Table 1. The proposed EMDQ algorithm provides relatively accurate results in terms of the number of errors and F—score. However, since EMDQ aims to handle more general situations, such as smooth deforming environments, it is not as accurate as homography-based methods, such as AHC and the traditional RANSAC+homography method. Conversely, the homography-based methods are not as accurate in handling general 3D situations, as shown in the DTU experiments in FIG. 15. Note: in these experiments, we use the following F-score, which weighs recall lower than precision:

$$Fscore = (1 + 0.5^2)\frac{\text{precision} * \text{recall}}{0.5^2 \text{ precision} + \text{recall}}. \quad (61)$$

|  |  | RANSAC + homography | RANSAC + epipolar | AHC | LPM | LMR | SIM | VFC | CNe (T = −2.5) | OANet (T = −2.5) | RIPR NSC | EMDQ |
|---|---|---|---|---|---|---|---|---|---|---|---|---|
| image2 (correct matches = 1487/total matches = 1618) | recall | 100.00 | 95.35 | 100.00 | 96.09 | 95.56 | 89.50 | 94.88 | 74.84 | 99.86 | 100.00 | 99.12 |
|  | precision | 98.93 | 99.57 | 99.79 | 99.79 | 99.85 | 93.93 | 100.00 | 98.75 | 98.34 | 97.5 | 99.93 |
|  | errors | 16 | 75 | 3 | 61 | 68 | 242 | 76 | 388 | 27 | 37 | 14 |
|  | F-score | 99.14 | 98.70 | 99.83 | 99.02 | 98.96 | 93.01 | 98.93 | 92.82 | 98.64 | 98.04 | 99.77 |
| image3 (1043/1178) | recall | 100.00 | 89.45 | 100.00 | 90.31 | 89.93 | 100.00 | 97.31 | 68.74 | 89.84 | 98.94 | 99.42 |
|  | precision | 98.95 | 99.46 | 99.90 | 99.89 | 99.89 | 88.53 | 100.00 | 98.08 | 99.15 | 95.46 | 100.00 |
|  | errors | 11 | 115 | 1 | 102 | 106 | 135 | 28 | 340 | 114 | 60 | 6 |
|  | F-score | 99.16 | 97.28 | 99.92 | 97.81 | 97.72 | 90.61 | 99.45 | 90.37 | 97.14 | 96.14 | 99.88 |
| image4 (728/874) | recall | 100.00 | 87.22 | 100.00 | 83.92 | 77.06 | 88.18 | 96.97 | 71.56 | 100.00 | 95.46 | 94.78 |
|  | precision | 98.77 | 99.68 | 99.86 | 99.51 | 99.46 | 86.63 | 100.00 | 97.20 | 85.05 | 92.29 | 99.85 |
|  | errors | 9 | 95 | 1 | 120 | 170 | 185 | 22 | 222 | 128 | 91 | 39 |
|  | F-score | 99.02 | 96.91 | 99.89 | 95.94 | 94.00 | 86.94 | 99.38 | 90.70 | 87.67 | 92.91 | 98.79 |

| | | RANSAC + homography | RANSAC + epipolar | AHC | LPM | LMR | SIM | VFC | CNe (T = -2.5) | OANet (T = -2.5) | RIPR NSC | EMDQ |
|---|---|---|---|---|---|---|---|---|---|---|---|---|
| image5 (250/393) | recall | 100.00 | 87.60 | 100.00 | 68.00 | 66.00 | 90.40 | 98.00 | 86.00 | 99.60 | 96.80 | 97.20 |
| | precision | 97.65 | 98.20 | 99.20 | 97.70 | 99.39 | 69.53 | 100.00 | 91.48 | 97.27 | 81.48 | 99.18 |
| | errors | 6 | 35 | 2 | 84 | 86 | 123 | 5 | 55 | 8 | 63 | 9 |
| | F-score | 98.11 | 95.88 | 99.36 | 89.85 | 90.26 | 72.90 | 99.59 | 90.33 | 97.72 | 84.14 | 98.78 |
| image6 (141/282) | recall | 100.00 | 78.72 | 100.00 | 63.12 | 41.13 | 100.00 | 98.58 | 71.63 | 100.0 | 100.00 | 95.03 |
| | precision | 95.27 | 94.87 | 98.60 | 96.68 | 84.05 | 50.00 | 98.58 | 87.06 | 90.96 | 69.11 | 95.71 |
| | errors | 7 | 36 | 2 | 58 | 94 | 141 | 4 | 55 | 14 | 63 | 13 |
| | F-score | 96.18 | 91.13 | 98.87 | 85.41 | 69.54 | 55.55 | 98.58 | 83.47 | 92.64 | 73.66 | 95.58 |

Figure 19:
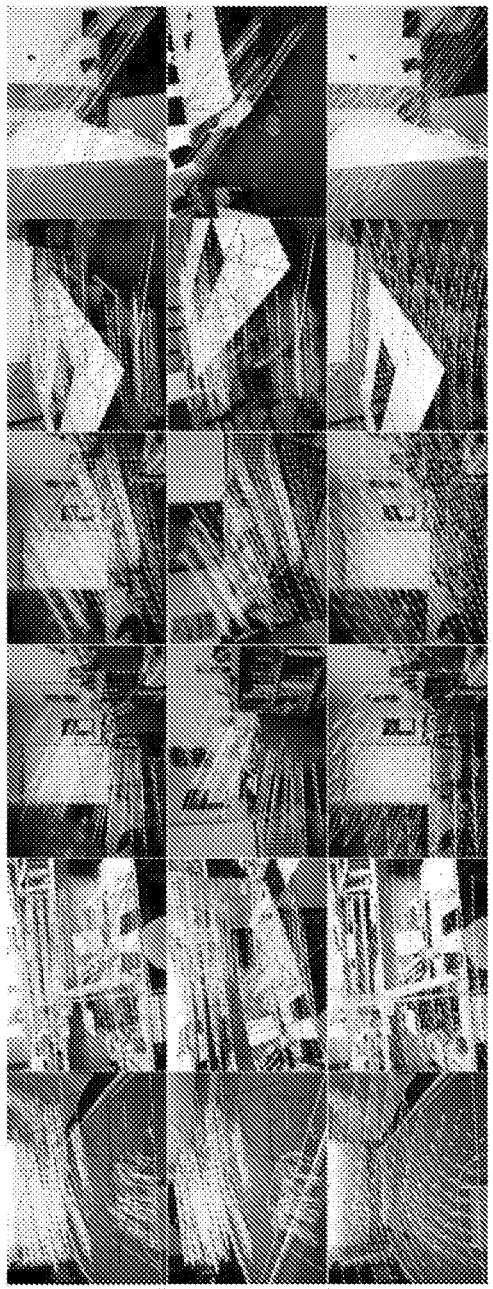
FIG. 19 shows results of EMDQ on the sun3D data with AffNet matches.
Figure 20:
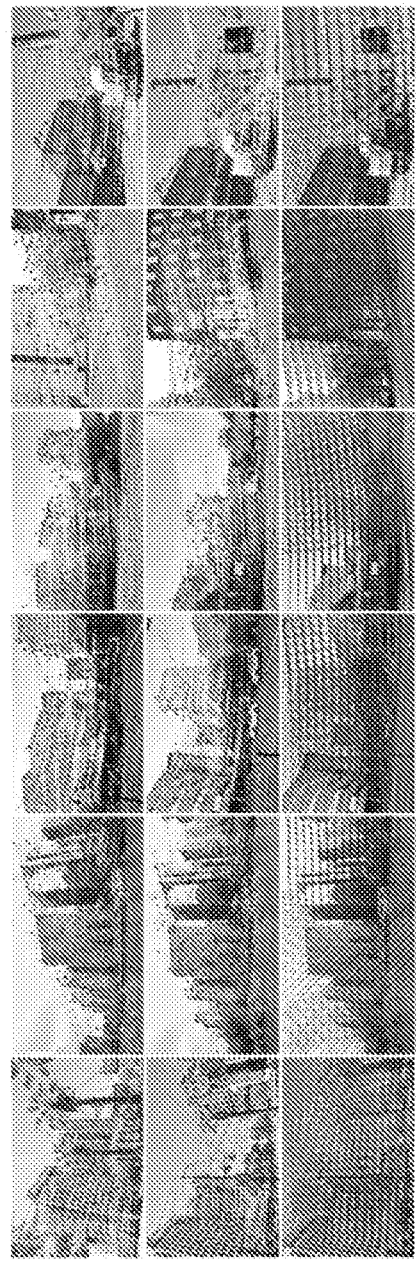
FIG. 20 shows results of qualitative experiments on natural images with SURF matches. The colored arrows of the third row are the deformation field with uncertainties (blue to red: low to high uncertainty) The uncertainties were determined by $\sigma^2 = \exp(0.005 d^2)$, where $\sigma^2$ is the uncertainty of the deformation field at a pixel, and d is the distance between the pixel and the closest feature inliers.
Figure 21:
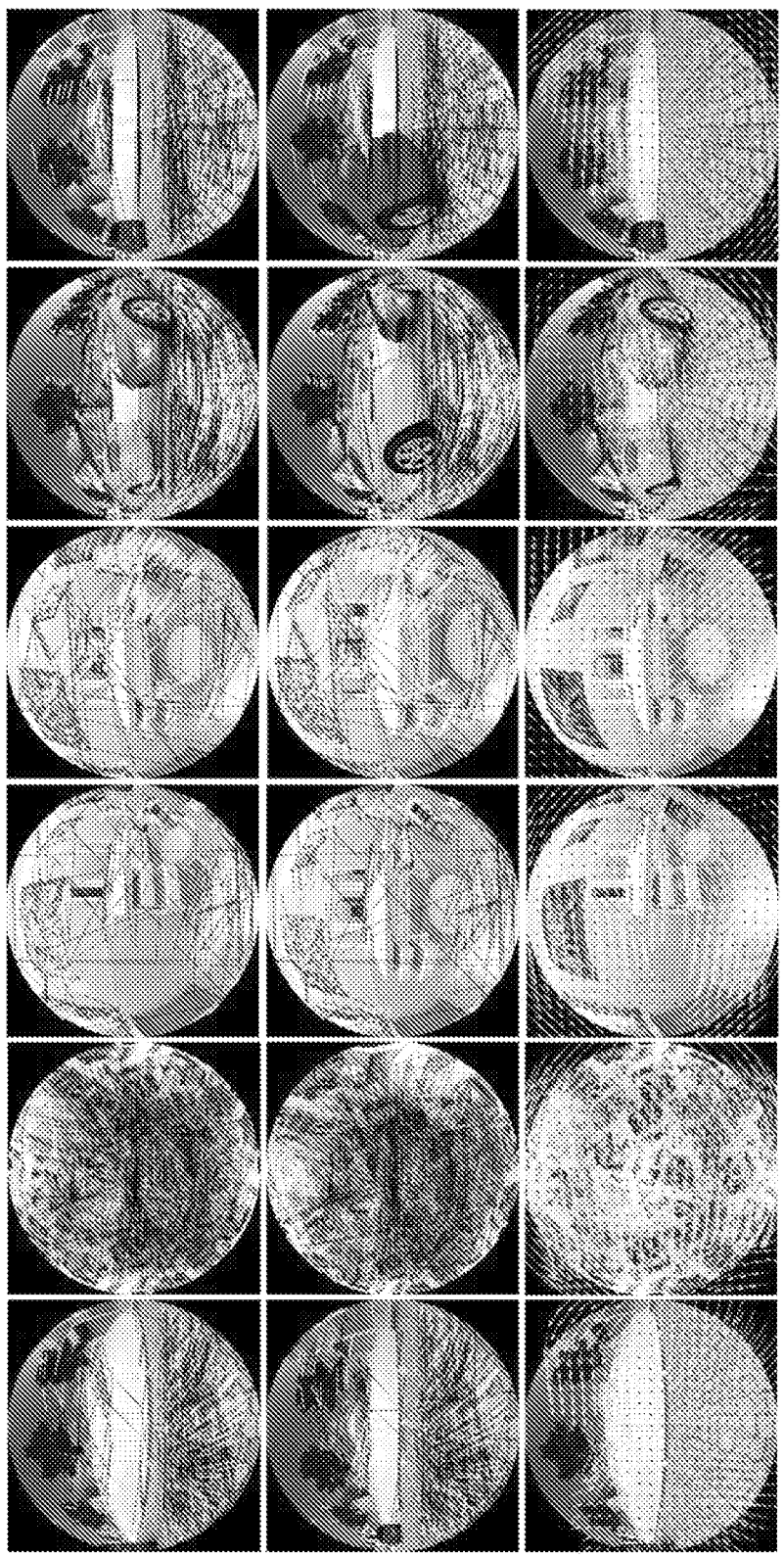
FIG. 21 shows results of EMDQ on fisheye images with AffNet matches. This experiment aims to show the ability of EMDQ to handle image distortion or un-calibrated images.

In addition to the quantitative experiments, we also conducted qualitative experiments. As shown in FIG. 19, the images were obtained from the sun3D dataset, we used AffNet to obtain matches and the generated deformation fields by EMDQ are smooth and physically realistic. As shown in FIG. 20, another experiment was conducted on natural images, which were usually used in the image mosaicking task. The third qualitative experiments was conducted on fisheye images as shown in FIG. 21. Fisheye images have extremely large image distortion, and the ability to handle fisheye images show that our method can handle un-calibrated images.

Smooth Deforming Environments

Figure 22:
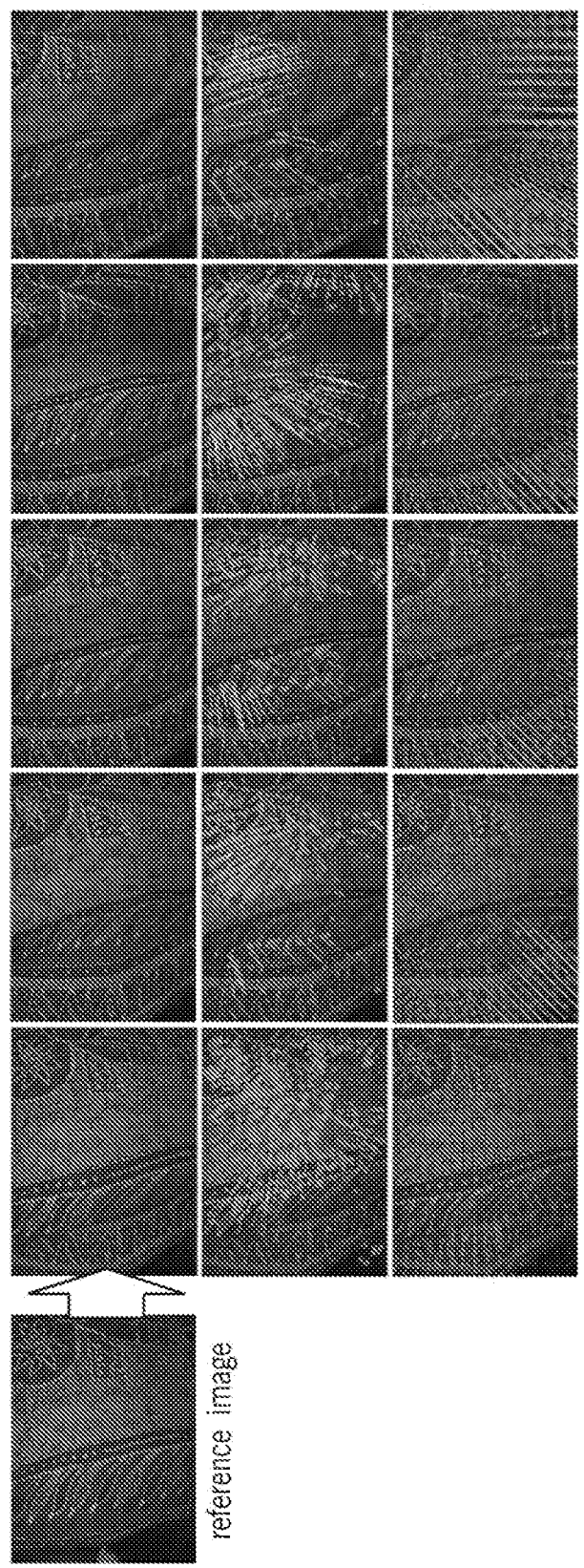
FIG. 22 shows results of qualitative experiments on the non-rigid Mandala data, which includes non-rigid deforming objects. First row: the input images, which are matched with the reference image. Second row: the mismatch removal results from SURF matches. The yellow and black lines are identified as inliers and outliers by EMDQ respectively. Third row: The generated deformation field. Blue to red: low to high uncertainty.
Figure 23:
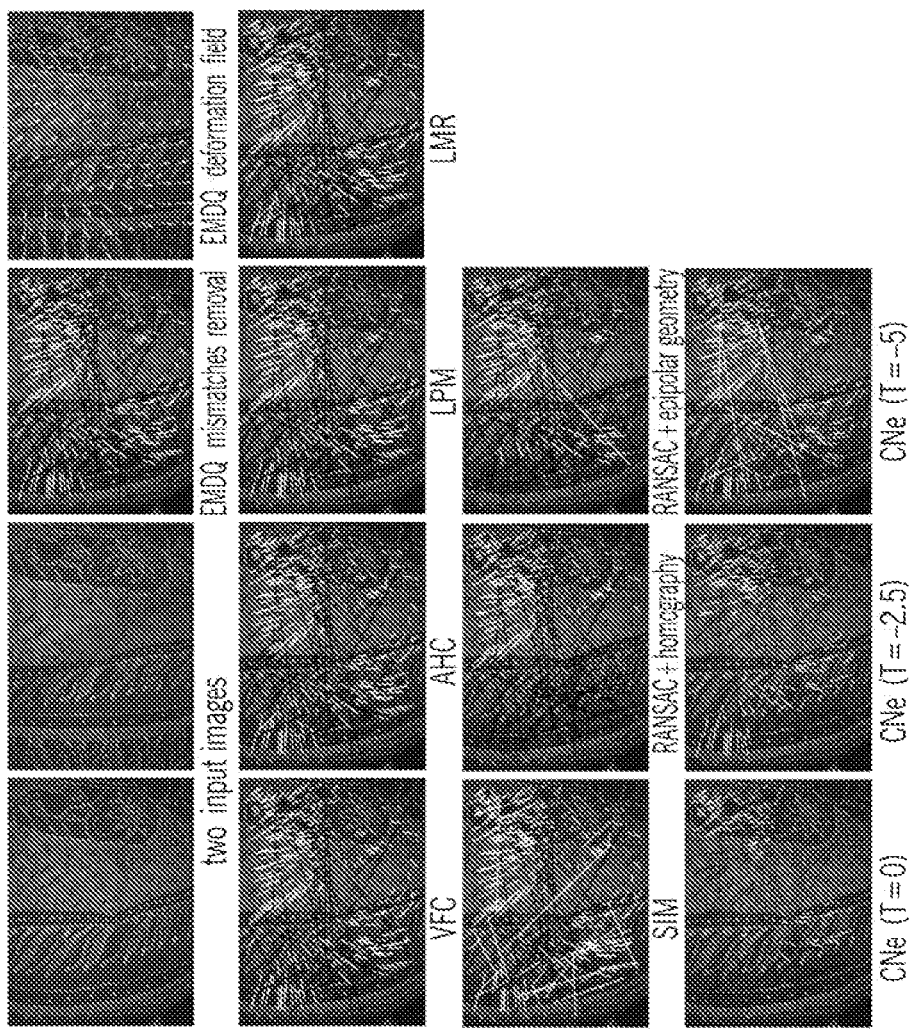
FIG. 23 shows experimental results on the Mandala dataset. Correct and incorrect matches detected by the methods are represented by the black and yellow lines, respectively.

To demonstrate the ability to handle smooth deforming non-rigid environments, we conducted qualitative experiments on the Mandala dataset, which include videos obtained by scanning objects with large and fast deformation. As shown in FIGS. 22 and 23, the results of the EMDQ algorithm are visually accurate. As shown in our recent paper, we can compensate for the deformation of the object and mosaic the images according to the deformation field by using the EMDQ algorithm as a black box. Since the prerequisite of non-rigid image mosaicking is to remove mismatches and obtain the non-rigid transformations between images, this experiment demonstrates that EMDQ can handle non-rigid objects robustly.

In this Example, we describe a novel EMDQ algorithm to address the mismatch removal problem, which serves as the subsequent step of the feature-matching method. The inputs of the EMDQ algorithm are the pixel coordinates of the feature matches, and the outputs include (1) the binary labels that distinguish correct and incorrect feature matches, and (2) the dense deformation field that provides registration for all pixels between the two images. Experimental results show that EMDQ is superior for mismatch removal compared with other state-of-the-art mismatch removal methods.

Although the major goal of the disclosed EMDQ algorithm is to address the mismatch removal problem, the algorithm can also generate the dense deformation field from sparse and noisy matches. Thus, EMDQ can potentially be applied to problems such as image registration and mosaicking. In this disclosure, we have demonstrated the results of a real-time non-rigid image mosaicking method, which was developed based on the deformation field obtained by the EMDQ algorithm. The accuracy of the deformation field is strongly dependent on the accuracy of mismatch removal, since the two outputs are correlated in the EMDQ algorithm, although EMDQ can also handle 3D cases.

EMDQ works under the assumption that the deformation field of the feature matches is smooth and thus is less suited for use with non-smooth deformation. For example, for situations involving multiple objects with different motions in the images, the EMDQ algorithm and other existing mismatch removal methods introduced in this disclosure may not work as robustly.

Example 2-3D Reconstruction of Soft Tissue from Stereo Laproscopy Videos

Due to tissue deformation, traditional rigid simultaneous localization and mapping (SLAM) methods are difficult to solve the problem of thee-dimensional (3D) reconstruction of soft tissue surfaces from laparoscopy videos. Most existing non-rigid SLAM methods require the objects to be directly placed in front of the camera, and cannot handle large camera motion. To date, large-scale non-rigid SLAM is still an open problem. In this paper, we propose a novel stereo video-based large-scale non-rigid SLAM method called EMDQ-SLAM, which can incrementally reconstruct 3D models of soft tissue surfaces in real-time and preserve high-resolution color textures. EMDQ-SLAM uses the expectation maximization and dual quaternion (EMDQ) algorithm combined with SURF features to track the camera motion and estimate tissue deformation between video frames. To overcome the problem of accumulative errors over time, we have integrated a g2o-based graph optimization method that combines the EMDQ mismatch removal and as-rigid-as-possible (ARAP) smoothing methods. Finally, the multi-band blending (MBB) algorithm has been used to obtain high resolution color textures with real-time performance. Experimental results demonstrate that our method outperforms two state-of-the-art non-rigid SLAM methods: MISSLAM and DefSLAM. Quantitative evaluation shows an average error in the range of 0.8-2.2 mm for different cases.

Three-dimensional (3D) reconstruction of tissue surfaces from intraoperative laparoscopy videos has found applications in surgical navigation and planning. One of the most important video-based 3D reconstruction methods is simultaneous localization and mapping (SLAM). Most existing SLAM methods assume that the environment is static, and the data at different time steps are aligned rigidly according to the estimated 6-DoF camera motion. This assumption is invalid for deformable soft tissues, which require much higher degrees of freedom to represent the non-rigid deformation and cannot be accurately recovered by the rigid SLAM methods. Non-rigid SLAM is an emerging topic in recent years and the pioneering work is DynamicFusion, which first addressed the problem of incrementally building the 3D model of deformable objects in real-time. Following DynamicFusion, many non-rigid SLAM works have been proposed in the computer vision field. However, these methods mainly focused on small regions of interest that require the object to be placed directly in front of the camera.

This may not be appropriate for medical applications since the laparoscope may need to scan large areas of the tissue surface. This motivates the need for the development of large-scale non-rigid SLAM methods, which have attracted significant attention in recent years. For example, one group has considered the tissue deformation to be negligible and applied rigid SLAM for dense reconstruction. Another group analyzed and compensated for the periodic motion of soft tissue caused by respiration using the extended Kalman filter. These methods worked for specific situations with assumptions of the underlying tissue deformation, but cannot handle general tissue deformation. To date, only a few non-rigid SLAM works without any assumptions of the tissue deformation have been reported. For example, one group has proposed to use features and tissue boundaries to track tissue deformation. Other researchers proposed to combine ORB-SLAM and a deformation model for tracking the motion of the laparoscope and estimating the deformation of soft tissues, called MISSLAM. Recently, some researchers proposed a monocular non-rigid SLAM method called as DefSLAM for large-scale non-rigid environments, which combines the shape-from-template (SfT) and non-rigid structure-from-motion (NRSfM) methods and has obtained impressive results on laparoscopy videos.

Figure 24:
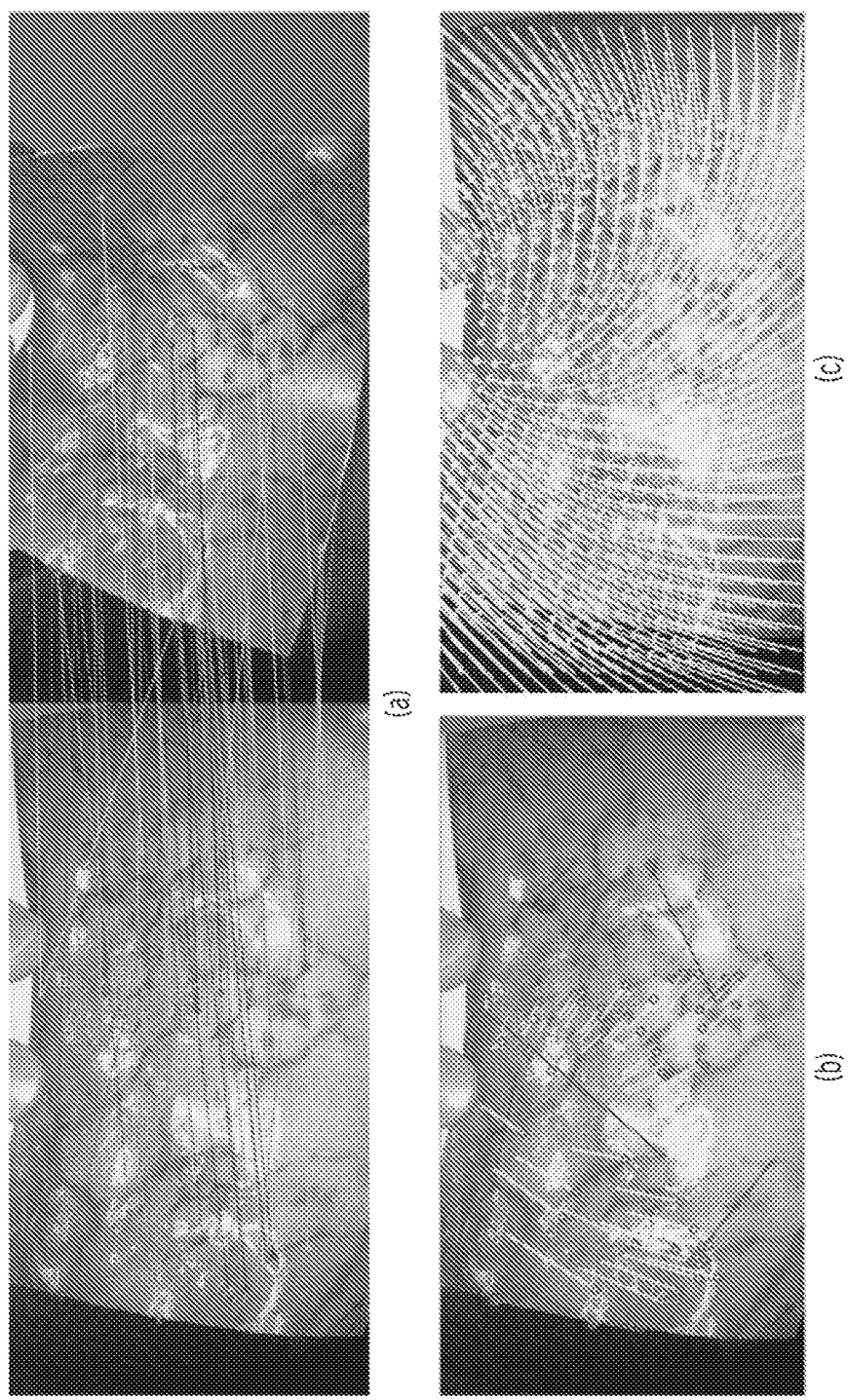
FIG. 24 shows an example of the EMDQ results. (Panel a) SURF matches between two images, where the object undergoes deformation. (Panel b) The EMDQ algorithm is able to distinguish inliers (yellow) and outliers (black) from the input SURF matches, and (Panel c) obtain the dense deformation field for all points. The obtained deformation field can be considered as a non-rigid registration result between two images. This is a 2D example for better visualization, and EMDQ can also handle 3D situations.

Large-scale non-rigid SLAM is challenging because there lacks an efficient and robust method to track the object deformation under significant camera motion. To solve this problem, we introduce our recent work called as the expectation maximization and dual quaternion (EMDQ) algorithm. As shown in FIG. 24, the EMDQ algorithm can distinguish inliers and outliers from the input feature matches in real-time. More importantly, EMDQ obtains the dense deformation field simultaneously, which is essential for deformation tracking.

Figure 25:
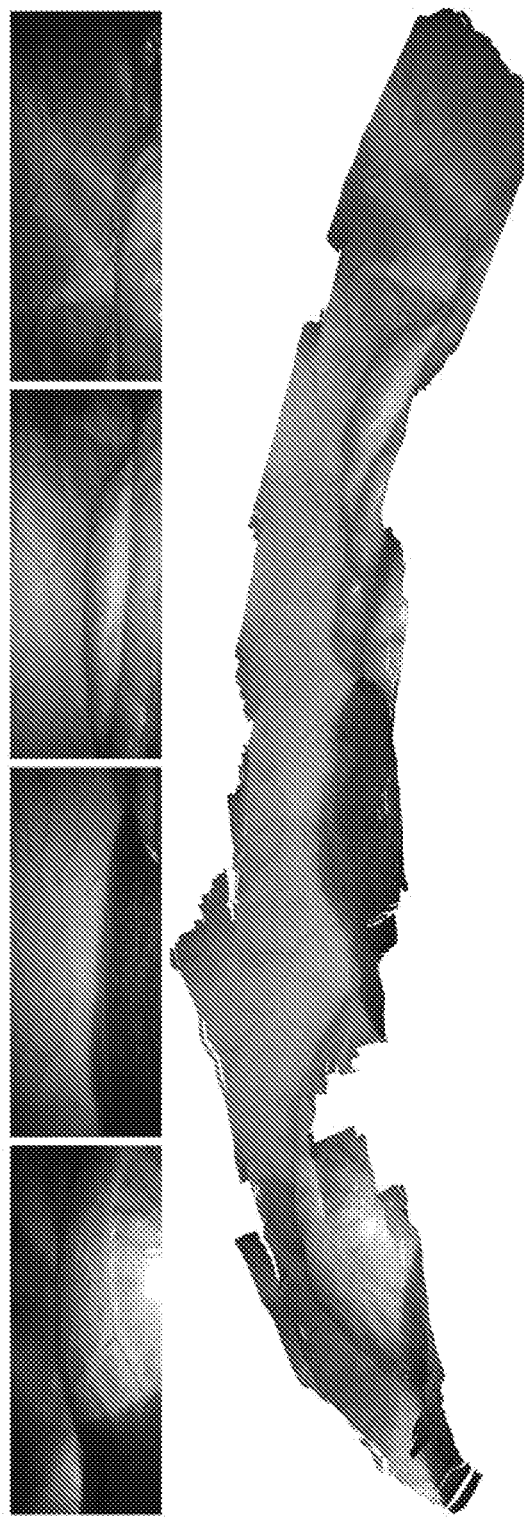
FIG. 25 shows that EMDQ-SLAM can handle large scans and build 3D dense point clouds with high resolution textures. Top: sample images. Bottom: 3D reconstruction results.

Using EMDQ as the key algorithm to track the camera motion and tissue deformation, we propose a novel stereo video-based non-rigid SLAM method called as EMDQ-SLAM, which can track large camera motion and significant tissue deformation in real-time, as shown in FIG. 25. However, EMDQ tracking suffers from a problem that the estimated tissue deformation may have accumulative errors. To solve this problem, we have developed a graph optimization method based on the g2o library, which uses the results of EMDQ as the initial values for further refinement. To preserve the high resolution color textures, we have adapted the multi-band blending (MBB) method for real-time incremental applications, and have implemented GPU-based parallel computation for real-time performance.

Rigid SLAM has been studied for some time and there exists many effective methods, such as ORB-SLAM, LSD-SLAM, DTAM, KinectFusion, and ElasticFusion.

Compared with rigid SLAM, non-rigid SLAM is a new topic in recent years and is still an open problem. Most existing non-rigid SLAM methods are RGB-D or multi-view stream-based dense methods. Some have proposed a stereo vision-based dense template deformation tracking method, which captured the initial template of the object while remaining static. DynamicFusion is the first template-less non-rigid SLAM work, which aligned the input Kinect (Microsoft, Inc.) stream using the GPU-based non-rigid ICP and as-rigid-as-possible smoothing methods. Due to the lack of constraints in the tangential directions, DynamicFusion suffers from the drift problem and to solve this problem, one group proposed to combine the SIFT matches with ICP. To handle more free movements, others proposed to use the killing vector field for the non-rigid alignment, and further proposed to use gradient flow in the Sobolev space for faster computation and higher geometric details. One group proposed to substitute the volumetric representation of the TSDF method by surfels to improve the efficiency. Another group proposed a robust method for reconstructing challenging scenes with multi-view cameras. Except for these general methods, some non-rigid SLAM methods have been developed for specific objects, such as human body, face, hand, and cloth. These non-rigid SLAM methods demonstrated impressive results, but were designed for small-scale situations that require most areas of the canonical shape to stay within the field of view during the scan.

The problem of non-rigid SLAM in large-scale environments, which is essential in the medical field due to the deformation of soft tissues, is still largely unexplored. To solve this problem, some have considered the tissue deformation to be negligible and apply rigid SLAM for dense reconstruction. Others analyzed and compensated for the periodic motion of the soft tissue caused by respiration. These methods worked for specific situations but are difficult to handle more general deformation. Only a few works addressing the large-scale non-rigid SLAM problem have been reported. For example, one group proposed to combine ORB-SLAM and the deformation model for tracking the motion of the laparoscope and deformation of soft tissues, which limited its accuracy since ORB-SLAM is rigid. Recently, some have proposed a monocular non-rigid SLAM method, DefSLAM, for large-scale non-rigid environments, which combined the shape-from-template (SfT) and non-rigid structure-from-motion (NRSfM) and has obtained impressive results. In our experiments we introduced DefSLAM for comparison.

Stereo Matching

Figure 26:
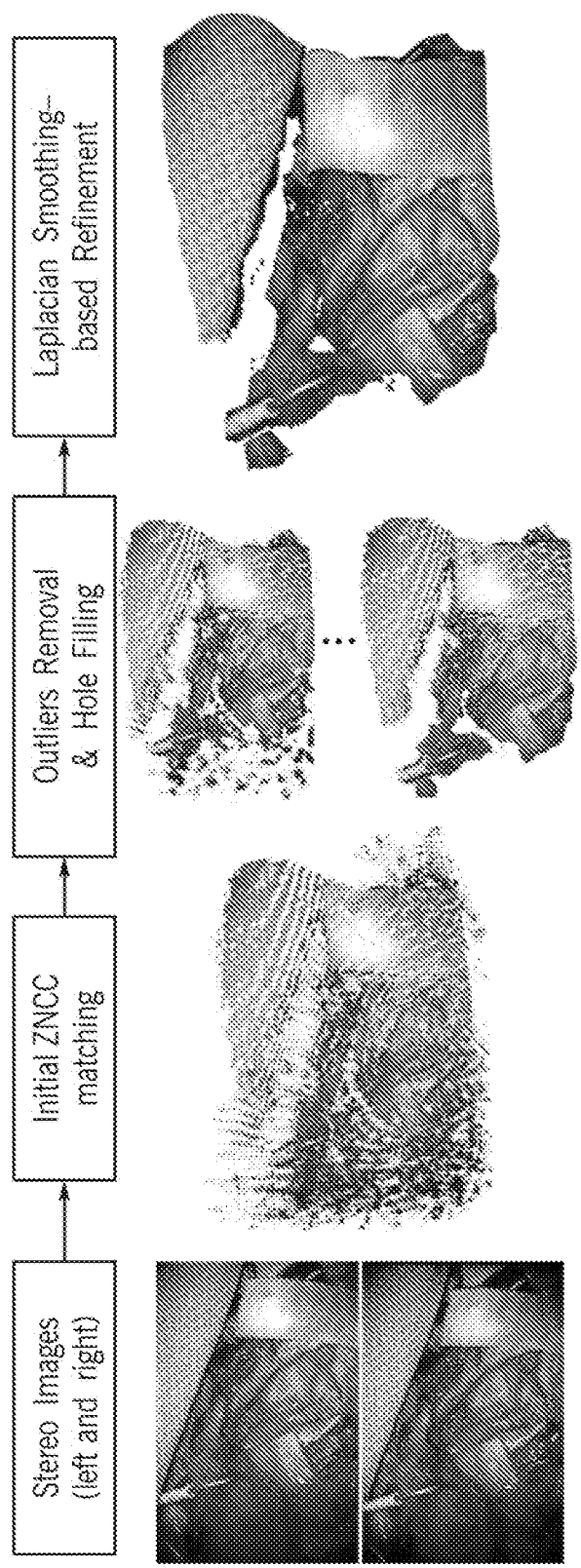
FIG. 26 shows an example of the stereo matching process with a pair of stereo microscopy images captured during a neurosurgery.
Figure 27:
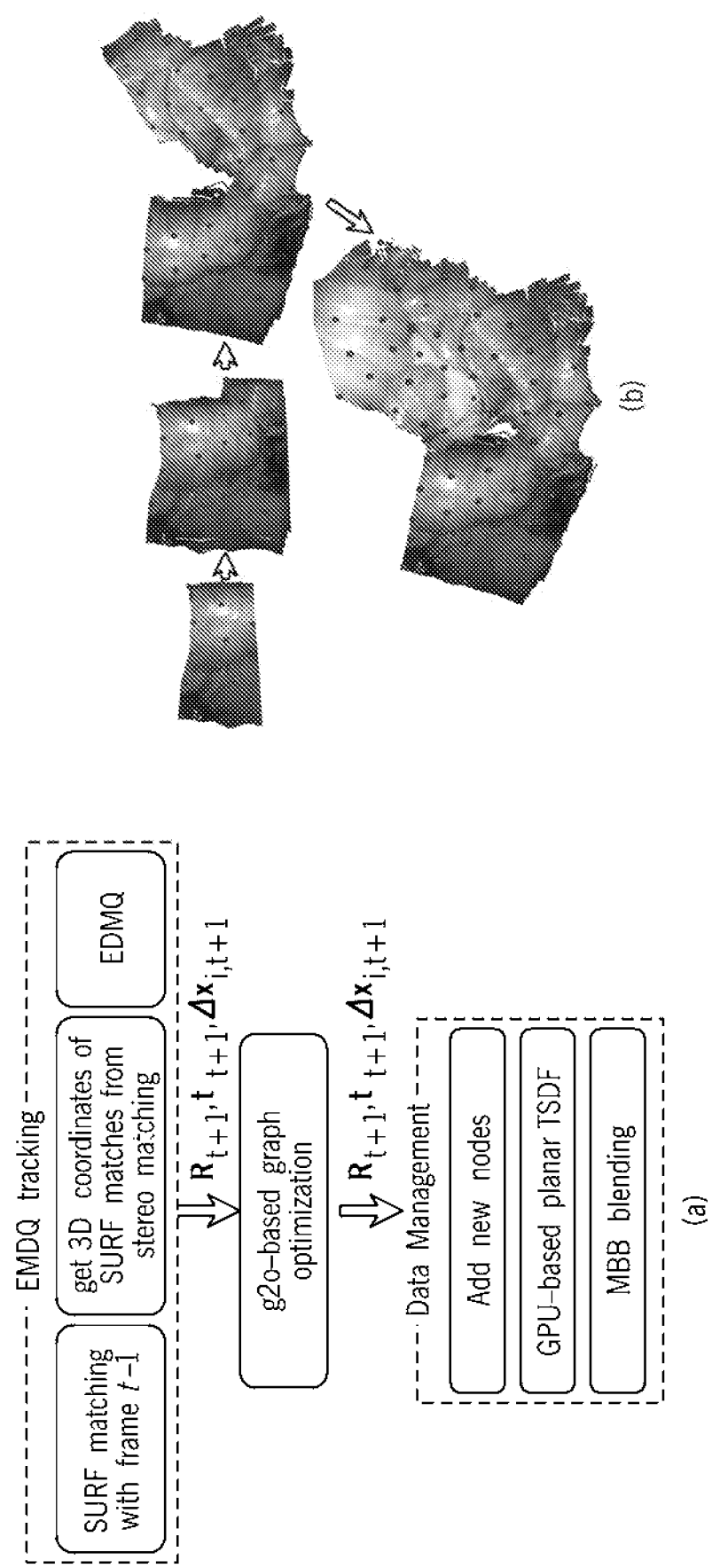
FIG. 27 shows (Panel a) a flowchart of EMDQ-SLAM, and (Panel b) an example of the mosaicking process, where blue dots are the deformation nodes.

We use the stereo matching method to estimate 3D depths of image pixels from the input 2D stereo laparoscopy videos, the results of which are used as the input of EMDQ-SLAM. The process of our GPU-based stereo matching method is shown in FIG. 26, which was designed following our previous work. At each time step, the stereo matching method obtains textured 3D point clouds from the pair of stereo images. Then, EMDQ-SLAM mosaics the stereo matching results by estimating the camera motion and tissue deformation.

EMDQ-SLAM

Without loss of generality, EMDQ-SLAM considers time $t=0$ as the canonical frame, and estimates the camera motion and surface deformation at time steps $t=1,2,\ldots$ with respect to time 0 for non-rigid mosaicking. The 6-DoF camera motion at time t is represented using the rotation matrix $R_t \in SO(3)$ and translational vector $t_t \in \mathbb{R}^3$. We denote the world coordinate of a template point p at time 0 as $x_{p,0}$. The tissue deformation at time t is represented by displacements of each point p, which is denoted as $\Delta x_{p,t}$. And the world coordinate of point p at time t is $$x_{p,t} = x_{p,0} + \Delta x_{p,t} \tag{62}$$

Hence, tissue deformation recovery is equivalent to the estimation of $\Delta x_{p,t}$ for all template points p. Since the template may have millions of points, we have adapted the method from DynamicFusion that uses sparse control points, or deformation nodes, to reduce the computational burden.

For each template point p, its displacement $\Delta x_{p,t}$ is represented by the weighted average of its neighboring deformation nodes i, which is $$\Delta x_{p,t} = \Sigma_i^N ( \tag{63}$$

where $w_i^p = \exp(-\alpha \|x_{i,0} - x_{p,0}\|^2)$, $\Sigma_i^N w_i^p = 1$ is the normalized weight between node i and point p, and node i is omitted if $w_i^p$ is too small. The coordinate of point p at time step t in the camera frame is $$x_{p,t}^c = R_t x_{p,t} + t_t. \tag{64}$$

In summary, the parameters that need to be estimated include the 6-DoF camera motion $R_t$ and $t_t$, and the nodes displacements $\Delta x_{i,t}$, i=1,2, . . ., N. We use a two-step framework to solve this problem, which includes EMDQ tracking and g2o-based graph optimization. According to the estimated camera motion and tissue deformation, we dynamically insert new points to the template, and add new deformation nodes to areas that are distant from the existing deformation nodes.

EMDQ Tracking

We track the camera motion and tissue deformation from every pair of adjacent video frames using the expectation maximization and dual quaternion (EMDQ) algorithm. EMDQ uses the coordinates of sparse feature matches as the input, and has two outputs, including (1) binary labels that distinguish correct and incorrect feature matches, and (2) a dense deformation field that indicates the displacements of points, as shown in FIG. 24.

Although most existing feature-based rigid SLAM methods utilize the ORB feature due to its efficiency, in practice we found that it is not appropriate for our non-rigid SLAM method. This is is because EMDQ obtains the displacements of the nodes by interpolating among the feature matching inliers, hence nodes that are distant from the feature matching inliers cannot be accurately estimated. However, ORB feature points mainly distribute at rich texture areas. We are aware of the existence of the improved ORB methods that are able to detect feature points uniformly on the images and have been widely used in rigid SLAM systems, but in practice we found that its accuracy is lower. This is acceptable for rigid SLAM because the rigid motion model can be estimated with a few matches. However for non-rigid SLAM, it may result in low robustness because some image areas may not have feature inliers for estimating the deformation. Hence, instead of using ORB, we employ SURF as the input of the EMDQ algorithm due to its ability to detect feature points in both rich and poor texture areas in the image. However, SURF is slow for real-time applications, and we propose to reduce the number of SURF octave layers to one, which avoids building the image pyramid and significantly reduces computational burden. This one layer SURF method does not affect the robustness of EMDQ-SLAM because we use adjacent video frames for tracking, which have small changes in image scale.

At time t, the coordinate of node i in the camera frame is $$x_{i,t}^c = R_t(x_{i,0} + \Delta x_{i,t}) + t_t. \tag{65}$$

At time t+1, we first perform SURF matching between video frame t and t+1, and obtain the related 3D coordinates of the SURF matches according to the pixel depths obtained by the stereo matching method. Then, using the 3D SURF matches as the input, the EMDQ algorithm obtains the displaced coordinates of nodes $x_{i,t+1}^c$ from $x_{i,t}^c$, and (63) removes SURF mismatches. The first output is directly used for updating the camera motion and nodes displacements at time t+1 in this EMDQ tracking method, and the second output will be used in the subsequent g2o-based graph optimization.

The estimated displacements of nodes between time t and t+1, $x_{i,t+1}^c - x_{i,t}^c$, include both the rigid and non-rigid components, which are caused by camera motion and tissue deformation respectively. To decompose the rigid and non-rigid components, we follow a previous method to estimate the rigid transformation, $R_{t \to t+1}$ and $t_{t \to t+1}$, between two 3D point clouds $\{x_{i,t}^c\}$ and $\{x_{i,t+1}^c\}$, i=1,2, . . . N. This method minimizes the sum of squared residuals and we consider the residuals as the non-rigid component, which is also the nodes displacements and we denote it as $$\Delta x_{i,t \to t+1}^x = x_{i,t+1} - (R_{t \to t+1} x_{i,t}^c + t_{t \to t+1}). \tag{66}$$

Finally, we update the camera motion in the world frame at time t+1 by $$R_{t+1} = R_{t \to t+1} R_t, \quad t_{t+1} = R_{t \to t+1} t_t + t_{t \to t+1}. \tag{67}$$

The node displacements at time t+1 are updated by $$\Delta x_{i,t+1} = R_t^T \Delta x_{i,t \to t+1}^c + \Delta x_{i,t}, \quad i=1,2, \ldots N. \tag{68}$$

g2o-Based Graph Optimization

The proposed EMDQ tracking method suffers from a problem that accumulative errors may exist in the estimated shape deformation. Specifically, Eq. (68) shows that the error of $\Delta x_{i,t \to t+1}$ will result in the accumulative error of $\Delta x_{i,t+1}$. Hence, in practice we found that EMDQ tracking works well for short video sequences, but may not be robust for long video sequences. The errors of $\Delta x_{i,t+1}$, i=1,2, . . . N are mainly reflected as the differences among the neighboring deformation nodes. Hence, the deformation recovery errors can be reduced by using the as-rigid-as-possible (ARAP) method, which aims to maintain the shape of deformable templates. We have developed a graph optimization method based on the g2o library as the refinement step for EMDQ tracking, which integrates the EMDQ mismatch removal results and the ARAP costs. The vertices and edges of the graph are introduced in the following of this section, which suggest the variables to be estimated and the terms of the cost function respectively.

Vertices: The graph for optimization has a total of N+1 vertices, which are the variables to be estimated, including the camera motion ($R_{t+1}$ and $t_{t+1}$), and displacements of N nodes ($\Delta x_{i,t+1}$, i=1,2, . . . N).

3D SURF matching edges: Edges are the terms of the cost function. We denote the 3D camera coordinates of a SURF feature m at time t as $x_{m,t}^c$, which can be directly obtained by the stereo matching results. Then, its world coordinate at time 0, $x_{m,0}$, can be obtained according to the estimated camera motion and nodes displacements at time t using equations (62)-(64). Ideally, the estimated $x_{m,0}$ obtained from time t and t+1 should be the same, which are denoted as $x_{m,0}^t$ and $x_{m,0}^{t+1}$ respectively. We use the differences between $x_{m,0}^t$ and $x_{m,0}^{t+1}$ as the cost, that is $$f_{SURF}(R_{t+1}, t_{t+1}, \Delta x_{i,t+1}) \Sigma_m w_m \|x_{m,0}^t - x_{m,0}^{t+1}\|^2, \tag{69}$$

where $w_m = 1/(e_m+1)$ is the weight of match m, and $e_m$ is the related error of match m in the EMDQ algorithm to distinguish inliers and outliers. We use this soft weight $w_m$ to handle situations when EMDQ does not distinguish inliers and outliers correctly.

ARAP edges: The basic idea of the standard ARAP method is to minimize non-rigid component after removing the rigid components. Since in our method, the rigid and non-rigid components have already been decomposed according to Eq. (66)-(68), the ARAP term in EMDQ-SLAM is simplified to $$f_{ARAP}(\Delta x_{i,t+1}) = \Sigma_{i1,i2} w_{i1}^{i2} \|\Delta x_{i1,t+1} - \Delta x_{i2,t+1}\|^2, \quad (70)$$

where $w_{i1}^{i2}$ is the weight between node i1 and i2. Compared with the standard ARAP method, the main difference of this simplified ARAP method is that it does not compute the local rotations for each point separately. This simplification can significantly reduce the computational burden, and is acceptable because the deformation of the soft tissue surface is mainly reflected as different translational motion of the points.

GPU-based Dense Mosaicking and MBB Texture Blending

The truncated signed distance function (TSDF) fusion method has been widely used in the 3D reconstruction applications to merge the input raw data and generate the dense 3D mesh model. Standard TSDF methods use the volumetric grids to represent the 3D space. Hence higher resolution of the 3D models suggests to use smaller size of the volumetric grids, which requires a large amount of GPU memory. For the surgical navigation application, the resolution needs to be as high as possible for better visualization. In this section, we introduce our GPU-based planar TSDF merging method, which aims to keep high resolution with much less amount of GPU memory.

At time step t, after the estimation of the camera motion and tissue deformation, the coordinates of the existing template points at time t are obtained, which is denoted as $x_{p,t}$ for template point p. The goal of our planar TSDF merging method is to merge $x_{p,t}$ of the existing template points with the stereo matching results, and insert new points to the template.

Update existing template points: We reproject $x_{p,t}$ of template points p to the imaging plane, and obtain the related image homogeneous coordinate $I=[u, v,1]$ and the depth $\lambda_{proj}$, which suggests $x_{p,t} = \lambda_{proj} I$. [u,v] is the normalized image coordinate of pixel I. Then, if pixel I has a valid depth from the stereo matching algorithm, which is denoted as $\lambda_{stereo}$, we will merge the depths according to $$\lambda_{merge} = (w_p \lambda_{proj} + \lambda_{stereo})/(w_p + 1), \quad (71)$$

$$w_p = \max\{w_p + 1, 30\}, \quad (72)$$

where $w_p$ is the TSDF weight of point p. Then we will update $x_{p,t}$ according to the new depth $\lambda_{merge}$. Finally, $x_{p,0}$ is updated according to the new $x_{p,t}$.

Insert new template points: If a pixel I has a valid 3D coordinate from the stereo matching result, we consider it as a new point if there is no template point reprojected to pixel I and its 4-neighboring pixels. When inserting this new point into the template, we also perform the TSDF merging according to (71) and (72), which aims to make the newly inserted points consistent with the existing points. Since there is no template point that is reprojected to pixel I, $w_p$ and $\lambda_{proj}$ are unknown and are obtained by interpolating that of the neighboring template points.

Real-time Incremental Multi-band Blending: Since small misalignments are unavoidable, template point p and pixel I may have different RGB colors. Linear blending of the RGB colors may lead to blurry textures, as shown in FIG. 28(d). Hence, we employ the multi-band blending (MBB) method. In this disclosure, we introduce our modifications for incre-mental and real-time blending. Our method reserves the previous information with the template points, and performs RGB color blending between the template and current image. The information at each template point p includes three spatial frequencies $B_\sigma^p$ and the weight $W^p$. When blending with the current image, $B_\sigma^p$ equals to the weighted average of that of p and I, i.e., $$B_\sigma^p = (1 - W_\sigma^I) B_\sigma^p + W_\sigma^I B_\sigma^I. \quad (73)$$

The weight of pixel I is obtained by Gaussian blurring $W_\sigma^I = W_{max}^I * g_\sigma$. $W_{max}^I = 1$ if $W^I > W^p$, otherwise $W_{max}^I = 0$. $W^p$ is updated by taking the max value of $W^p$ and $W^I$. $W^I$ is obtained in the same way as has been described previously.

Comparative Study

Figure 28:
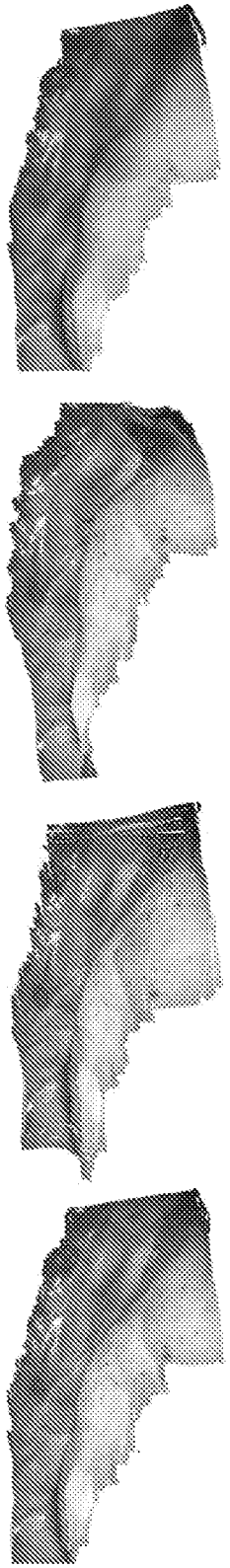
FIG. 28, Panels (a)-(d), show a comparative study on a stereo laparoscopy video obtained during a lung surgery. The lung had significant deformation due to heartbeat. (Panel a) The 3D reconstruction results of the complete EMDQ-SLAM method. (Panel b)-(Panel c) The results of only using EMDQ or g2o-based graph optimization to estimate the camera motion and tissue deformation respectively. For the result in (Panel c), we used estimations at the previous time step as the initial values, and Huber kernels were applied to handle outliers. (Panel d) The RGB color texture is more blurry when using linear blending instead of multi-band blending.

As shown in FIG. 28, we conducted a comparative study to intuitively demonstrate the effects of the methods introduced in this paper. Both EMDQ tracking and g2o-based graph optimization contribute to the accuracy of EMDQ-SLAM. EMDQ tracking cannot handle long sequences robustly due to accumulative errors (FIG. 28(b)). g2o-based graph optimization suffers from the local minima problem and may be affected by SURF mismatches, which requires EMDQ results as the initial values (FIG. 28(c)). MBB blending can obtain better color textures than traditional linear blending (FIG. 28(d)).

Experiments

The source code was implemented in CUDA C++ on a desktop with an Intel Core i9 3.0 GHz CPU and NVIDIA Titan RTX GPU.

We introduced MISSLAM and DefSLAM for comparison, which are recent video-based non-rigid SLAM algorithms. MISSLAM is a stereo video-based method, which is not open source software hence we used the same data reported in their paper for comparison. It may not be fair for comparing our method with DefSLAM since DefSLAM uses monocular video. Further, DefSLAM does not fully address the mosaicking problem and its mapping results are sets of overlapped local templates, rather than complete 3D point clouds or mesh models. The stereo laparoscopy videos used for validation were obtained from the Hamlyn online dataset. We also captured intraoperative stereo laparoscopy videos on soft tissues at our hospital.

Figure 29:
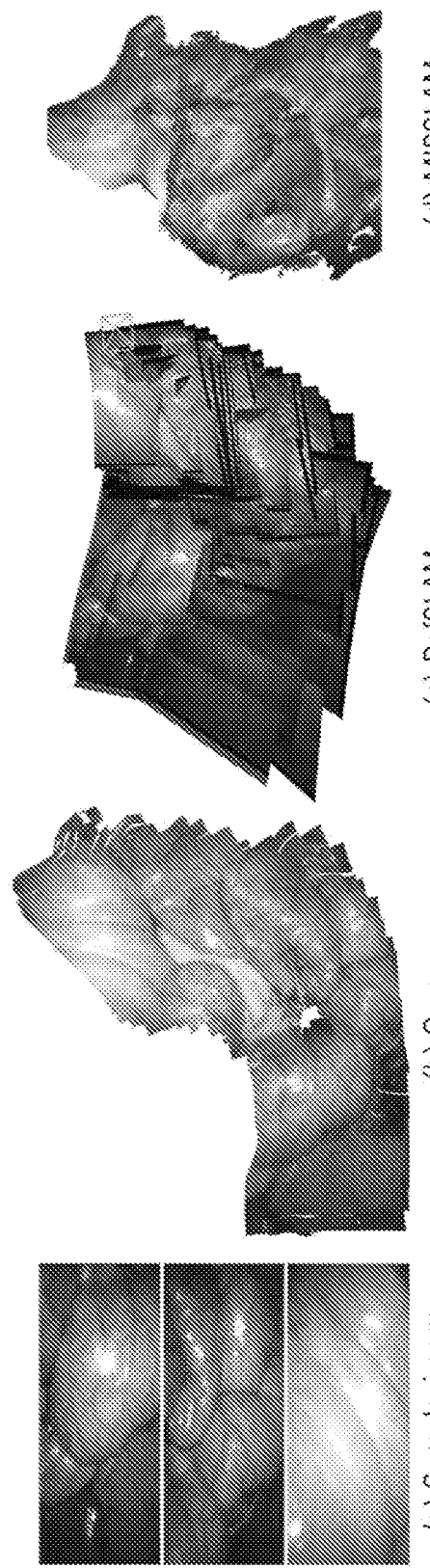
FIG. 29 shows experiments on the in vivo porcine abdomen video from the Hamlyn dataset. (Panel a) Sample images from the video. (Panel b) Ours. (Panel c) DefSLAM result, which includes multiple overlapped local templates. (Panel d) MISSLAM results, which is the screenshot reported in their paper.
Figure 30:
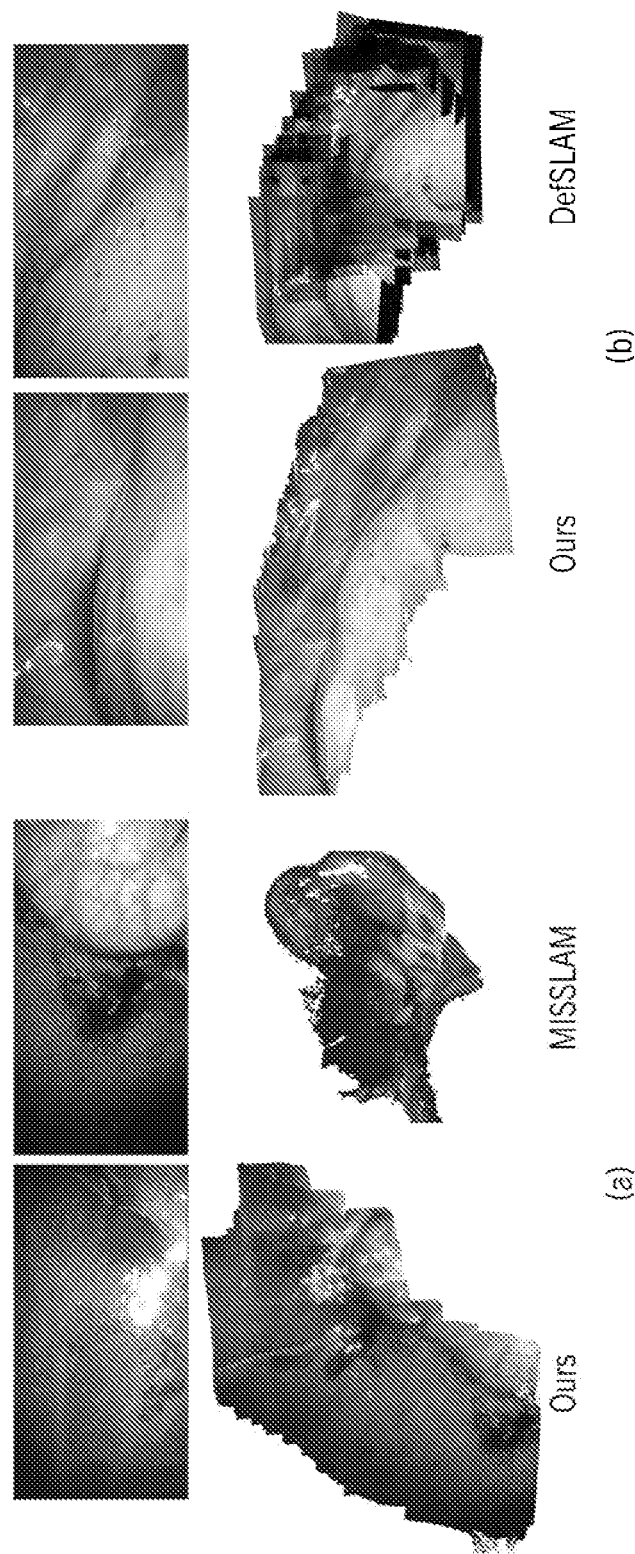
FIG. 30 shows: (Panel a) Experiments on the in vivo porcine liver video from the Hamlyn dataset. DefSLAM failed on this data. (Panel b) Experiments on a stereo laparoscopy video captured during a minimally invasive sublobar lung surgery at our hospital.

As shown in FIG. 29, we first conducted experiments on the Hamlyn dataset, which was obtained by scanning a porcine abdomen. The tissue had small deformation but the laparoscope motion was large. EMDQ-SLAM is able to generate a dense, high resolution 3D mosaic with clear textures corresponding to the area covered by the laparoscope. DefSLAM was able to track the camera motion from the monocular video, and provided multiple local templates. We also include a screenshot of the result from the MISSLAM paper for comparison. FIG. 30(a) shows the results on another Hamlyn dataset, which scanned large areas of the liver surface. Due to low texture, the DefSLAM reported loss of tracking. Although it is difficult to provide quantitative comparisons since no ground truth is available, qualitative comparisons show that our result is visually more accurate and can preserve high resolution texture.

For the experiments shown in FIG. 30(b), the video was captured during a minimally invasive sublobar lung surgery at our hospital. The surgeon was asked to move the stereo laparoscope within the patient's thoracic cavity. Due to heartbeat and respiratory motion caused by the adjacent lung, the deflated lung had significant and fast deformation. This experiment demonstrates that our method can handle highly deformable surfaces.

Figure 31:
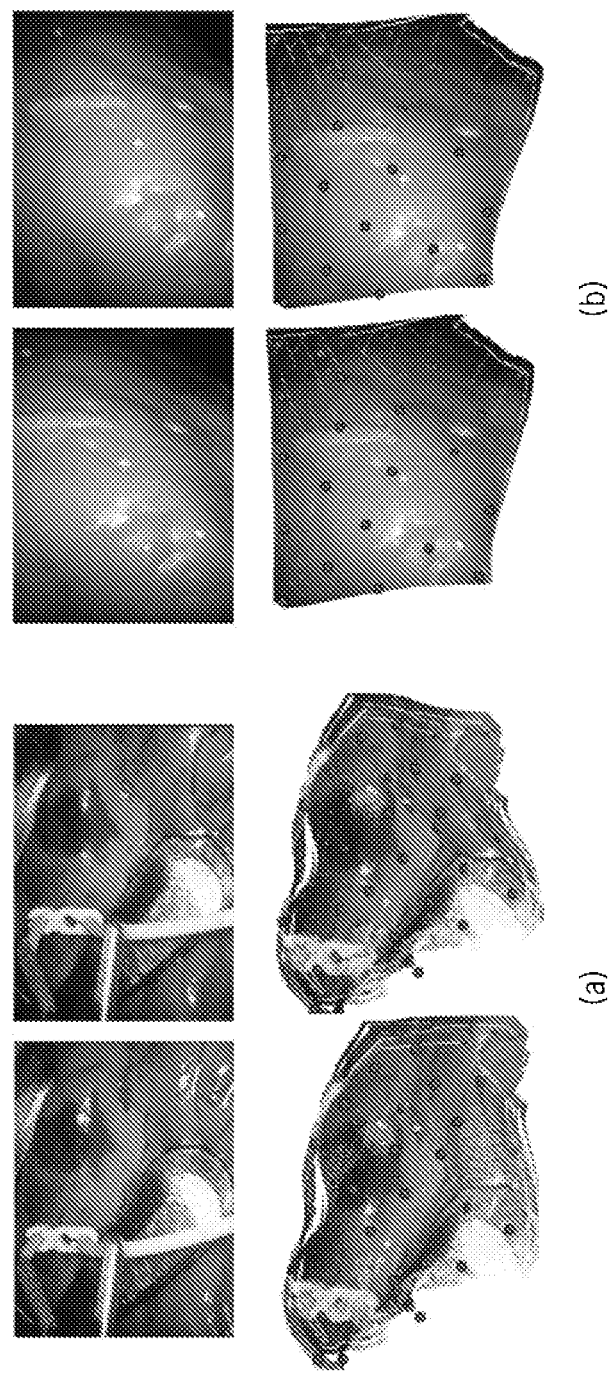
FIG. 31 shows experiments on the Hamlyn dataset. (Panel a) In vivo heart. (Panel b) Heart phantom. The tissues had significant deformation and the camera motion was small.

For the experiments shown in FIG. 31, the tissues had significant deformation due to heartbeat although the camera motion was small. Our method was able to track the deformation robustly and monitor the tissue deformation in real-time. Videos showing the results of the EMDQ-SLAM algorithm are also provided as supplemental material for the paper.

Figure 32:
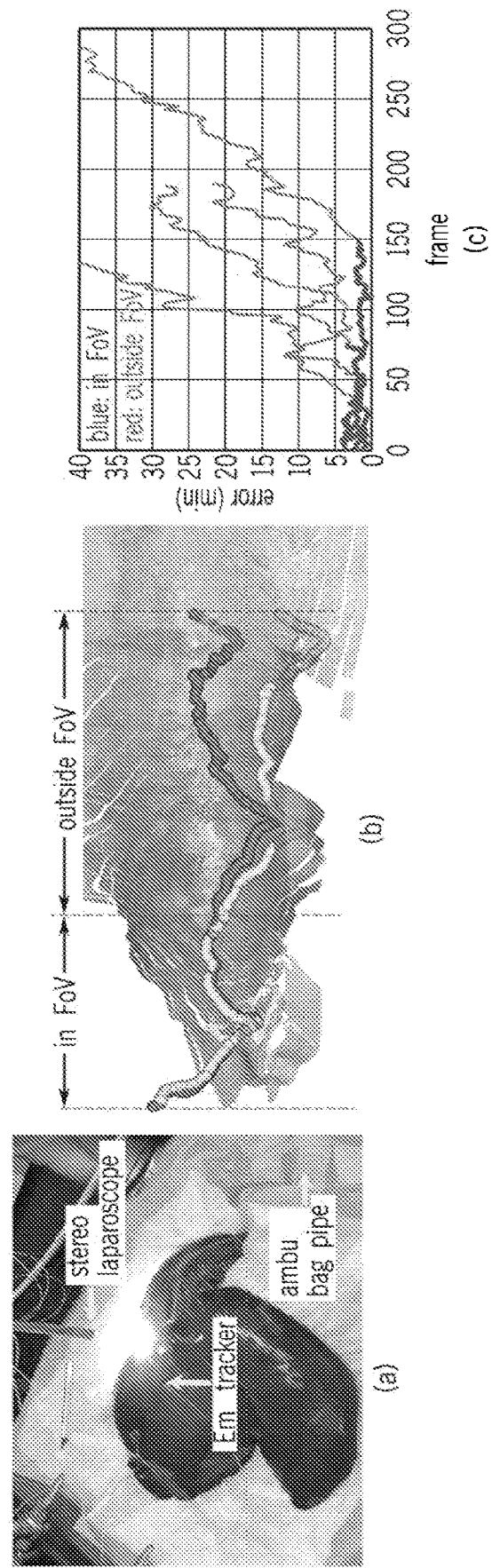
FIG. 32 shows quantitative experiments. (Panel a) Configuration. (Panel b) Red dots are the estimated trajectory of the EM tracker by EMDQ-SLAM in the camera frame, yellows dots are the EM tracking results (ground truth). (Panel c). Errors for four cases. Blue and red suggest the EM tracker was in and outside the field of view (FoV) respectively.

Quantitative experiments: The quantitative experiments were conduced using ex-vivo porcine lungs and livers, which were placed on an Ambu bag connected to an anesthesia machine, which inflated/deflated the Ambu bag periodically to simulate the respiratory motion, as shown in FIG. 32(a). Two electromagnetic (EM) trackers were attached to the laparoscope and on the tissue surface respectively. The laparoscope was gradually moved along the surface to create a 3D mosaic while estimating the tissue deformation, which was also measured using the EM sensor on the tissue surface. The EM coordinate frame was manually registered to the laparoscope coordinate frame, and our results were compared with the EM tracking results, as shown in FIG. 32(b). The errors for four cases are reported in FIG. 32(c), which were small when the EM tracker was in the field of view (FoV), but increased as the laparoscope moved beyond the surgical field, which is expected since the deformation of areas outside FoV cannot be monitored directly. The mean and standard deviation of errors when the EM tracker was in the FoV are 0.87±0.40, 2.1±0.58, 1.7±0.70 and 2.2±0.70 mm respectively for the four cases. The shortcoming that areas outside FoV cannot be accurately estimated is an intrinsic drawback for large-scale non-rigid SLAM methods, since the deformation of invisible areas is obtained by extrapolation of the visible areas. However, this problem does not affect the mosaicking process because mosaicking is only performed at areas in FoV.

Runtime: For the experiments shown in FIG. 29, FIGS. 30(a) and 30(b), and FIGS. 31(a) and 31(b), the average runtime to process one video frame was 92, 101, 97, 38, and 53 ms respectively, which included stereo matching, EMDQ-SLAM and VTK-based rendering. Hence, our method works at an update rate of around 10-26 Hz, depending on the image resolution.

The problem of large-scale non-rigid SLAM for medical applications is still an open problem. In this disclosure, we describe a novel non-rigid SLAM method called EMDQ-SLAM, which uses a two-step framework to track the camera motion and estimate the tissue deformation. Although it is difficult to provide quantitative comparisons with other methods due to the lack of ground truth, qualitative comparisons shows our method can obtain visually more accurate mosaic with clear color textures. Quantitative experiments show that our method has an average error of 0.8-2.2 mm when estimating areas in the field of view.

Example 3—System Description

Figure 33:
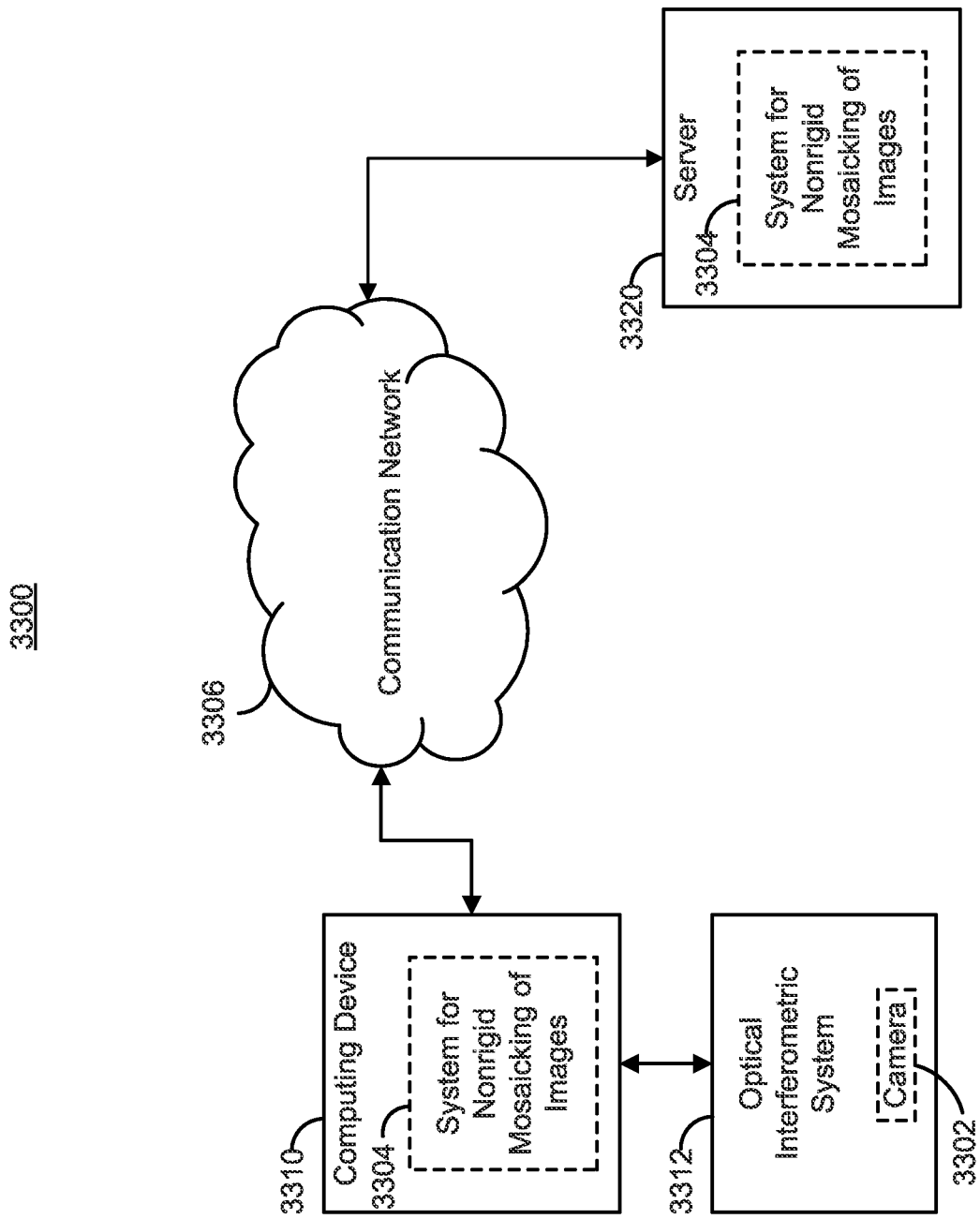
FIG. 33 shows an example of a system for nonrigid mosaicking of images in accordance with some embodiments of the disclosed subject matter.

Turning to FIG. 33, an example 3300 of a system (e.g. a data collection and processing system) for nonrigid mosaicking of images is shown in accordance with some embodiments of the disclosed subject matter. As shown in FIG. 33, a computing device 3310 can receive image data from a camera system 3312. In some embodiments, computing device 3310 can execute at least a portion of a system for nonrigid mosaicking of images 3304 to generate an image based on the image data received from camera system 3312.

Additionally or alternatively, in some embodiments, computing device 3310 can communicate information about the image data received from camera system 3312 to a server 3320 over a communication network 3306, which can execute at least a portion of system for nonrigid mosaicking of images 3304 to generate an image based on the image data. In some such embodiments, server 3320 can return information to computing device 3310 (and/or any other suitable computing device) indicative of an output of system for nonrigid mosaicking of images 3304, such as the image information and/or metrics obtained using the image information. This information may be transmitted and/or presented to a user (e.g. a researcher, an operator, a clinician, etc.) and/or may be stored (e.g. as part of a research database or a medical record associated with a subject).

In some embodiments, computing device 3310 and/or server 3320 can be any suitable computing device or combination of devices, such as a desktop computer, a laptop computer, a smartphone, a tablet computer, a wearable computer, a server computer, a virtual machine being executed by a physical computing device, etc. As described herein, system for nonrigid mosaicking of images 3304 can present information about the raw image information, processing data, and/or mosaic images obtained using the image information to a user (e.g., researcher and/or physician).

In some embodiments, camera system 3312 may include a camera 3302, which can be any camera suitable for uses such as laparoscopy. In other embodiments, camera 3302 can be local to computing device 3310. For example, camera 3302 may be incorporated with computing device 3310 (e.g., computing device 3310 can be configured as part of a device for capturing and/or storing images). As another example, camera 3302 may be connected to computing device 3310 by a cable, a direct wireless link, etc. Additionally or alternatively, in some embodiments, camera 3302 can be located locally and/or remotely from computing device 3310, and can communicate information to computing device 3310 (and/or server 3320) via a communication network (e.g., communication network 3306).

In some embodiments, communication network 3306 can be any suitable communication network or combination of communication networks. For example, communication network 3306 can include a VVi-Fi network (which can include one or more wireless routers, one or more switches, etc.), a peer-to-peer network (e.g., a Bluetooth network), a cellular network (e.g., a 4G network, a 5G network, etc., complying with any suitable standard, such as CDMA, GSM, LTE, LTE Advanced, VViMAX, etc.), a wired network, etc. In some embodiments, communication network 3306 can be a local area network, a wide area network, a public network (e.g., the Internet), a private or semi-private network (e.g., a corporate or university intranet), any other suitable type of network, or any suitable combination of networks. Communications links shown in FIG. 33 can each be any suitable communications link or combination of communications links, such as wired links, fiber optic links, VVi-Fi links, Bluetooth links, cellular links, etc.

Figure 34:
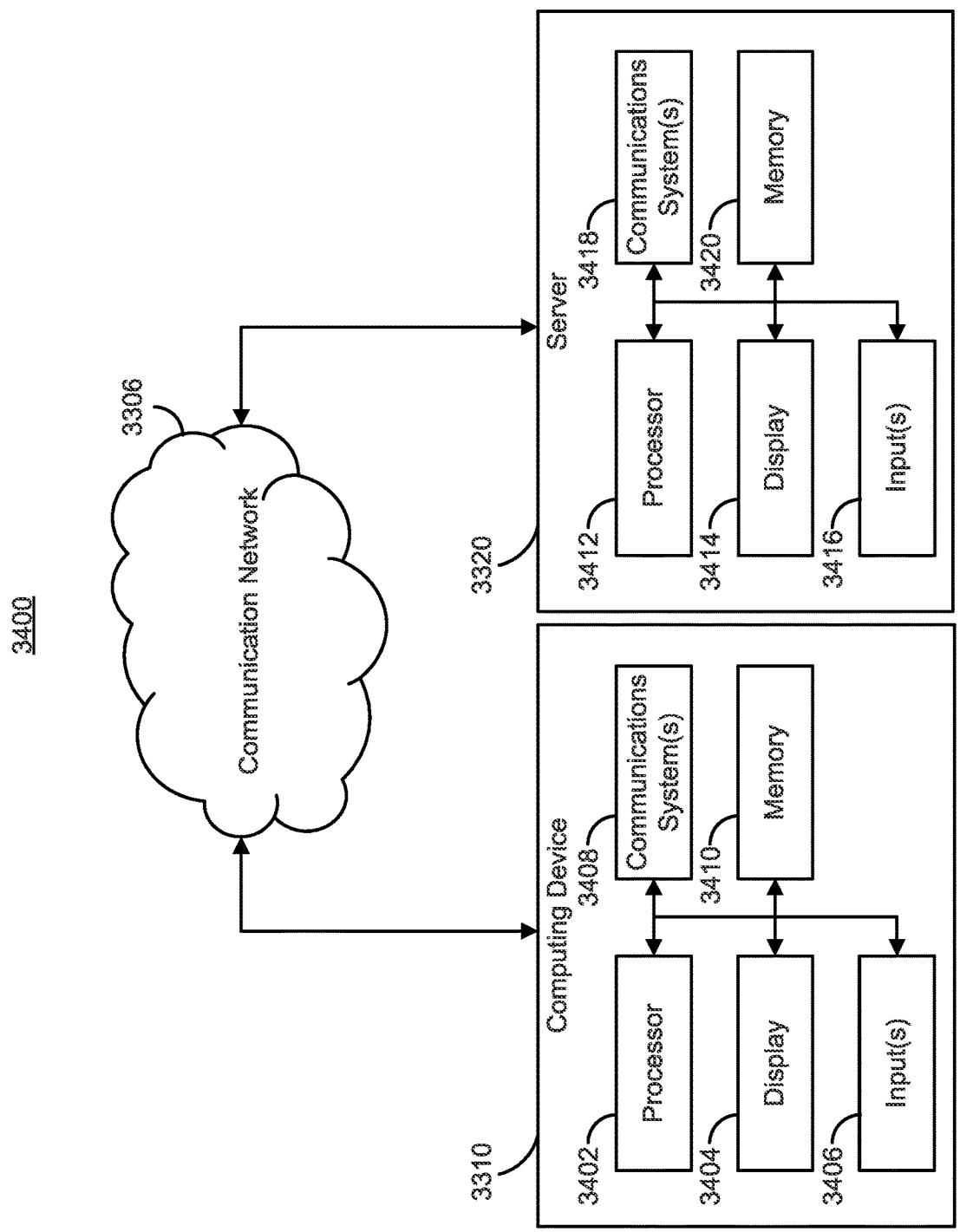
FIG. 34 shows an example of hardware that can be used to implement computing device and server in accordance with some embodiments of the disclosed subject matter.

FIG. 34 shows an example 3400 of hardware that can be used to implement computing device 3310 and server 3320 in accordance with some embodiments of the disclosed subject matter. As shown in FIG. 34, in some embodiments, computing device 3310 can include a processor 3402, a display 3404, one or more inputs 3406, one or more communication systems 3408, and/or memory 3410. In some embodiments, processor 3402 can be any suitable hardware processor or combination of processors, such as a central processing unit, a graphics processing unit, etc. In some embodiments, display 3404 can include any suitable display devices, such as a computer monitor, a touchscreen, a television, etc. In some embodiments, inputs 3406 can include any suitable input devices and/or sensors that can be used to receive user input, such as a keyboard, a mouse, a touchscreen, a microphone, etc.

In some embodiments, communications systems 3408 can include any suitable hardware, firmware, and/or software for communicating information over communication network 3306 and/or any other suitable communication networks. For example, communications systems 3408 can include one or more transceivers, one or more communication chips and/or chip sets, etc. In a more particular example, communications systems 3408 can include hardware, firmware and/or software that can be used to establish a VVi-Fi connection, a Bluetooth connection, a cellular connection, an Ethernet connection, etc.

In some embodiments, memory 3410 can include any suitable storage device or devices that can be used to store instructions, values, etc., that can be used, for example, by processor 3402 to present content using display 3404, to communicate with server 3320 via communications system(s) 3408, etc. Memory 3410 can include any suitable volatile memory, non-volatile memory, storage, or any suitable combination thereof. For example, memory 3410 can include RAM, ROM, EEPROM, one or more flash drives, one or more hard disks, one or more solid state drives, one or more optical drives, etc. In some embodiments, memory 3410 can have encoded thereon a computer program for controlling operation of computing device 3310. In such embodiments, processor 3402 can execute at least a portion of the computer program to present content (e.g., images, user interfaces, graphics, tables, etc.), receive content from server 3320, transmit information to server 3320, etc.

In some embodiments, server 3320 can include a processor 3412, a display 3414, one or more inputs 3416, one or more communications systems 3418, and/or memory 3420. In some embodiments, processor 3412 can be any suitable hardware processor or combination of processors, such as a central processing unit, a graphics processing unit, etc. In some embodiments, display 3414 can include any suitable display devices, such as a computer monitor, a touchscreen, a television, etc. In some embodiments, inputs 3416 can include any suitable input devices and/or sensors that can be used to receive user input, such as a keyboard, a mouse, a touchscreen, a microphone, etc.

In some embodiments, communications systems 3418 can include any suitable hardware, firmware, and/or software for communicating information over communication network 3306 and/or any other suitable communication networks. For example, communications systems 3418 can include one or more transceivers, one or more communication chips and/or chip sets, etc. In a more particular example, communications systems 3418 can include hardware, firmware and/or software that can be used to establish a VVi-Fi connection, a Bluetooth connection, a cellular connection, an Ethernet connection, etc.

In some embodiments, memory 3420 can include any suitable storage device or devices that can be used to store instructions, values, etc., that can be used, for example, by processor 3412 to present content using display 3414, to communicate with one or more computing devices 3310, etc. Memory 3420 can include any suitable volatile memory, non-volatile memory, storage, or any suitable combination thereof. For example, memory 3420 can include RAM, ROM, EEPROM, one or more flash drives, one or more hard disks, one or more solid state drives, one or more optical drives, etc. In some embodiments, memory 3420 can have encoded thereon a server program for controlling operation of server 3320. In such embodiments, processor 3412 can execute at least a portion of the server program to transmit information and/or content (e.g., results of a tissue identification and/or classification, a user interface, etc.) to one or more computing devices 3310, receive information and/or content from one or more computing devices 3310, receive instructions from one or more devices (e.g., a personal computer, a laptop computer, a tablet computer, a smartphone, etc.), etc.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

In some embodiments, the optical signals are detected by photodiodes. It should be recognized that any opto-electronic conversion device including but not limited to photo detectors, photodiodes, line-scan and two-dimensional cameras, and photodiode arrays can be used to perform this detection function.

It should be noted that, as used herein, the term mechanism can encompass hardware, software, firmware, or any suitable combination thereof.

Example 4—Process for Nonrigid Mosaicking of Images

Figure 35:
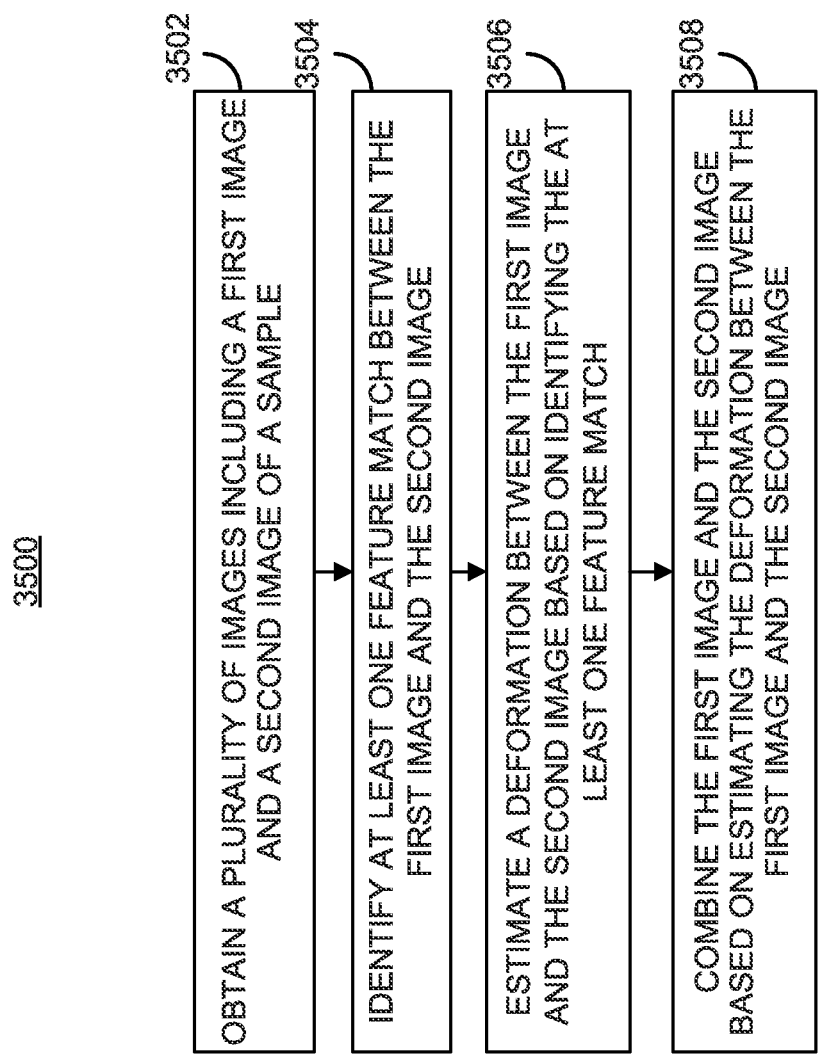
FIG. 35 shows an example of a process for nonrigid mosaicking of images in accordance with some embodiments of the disclosed subject matter.

FIG. 35 shows an example 3500 of a process for nonrigid mosaicking of images in accordance with some embodiments of the disclosed subject matter. As shown in FIG. 35, at 3502, process 3500 can obtain a plurality of images including a first image and a second image of a sample. This and other steps of the process may be carried out by a processor. The first image and the second image may contain information from partially overlapping portions (e.g. portions that are overlapping partially or completely) of the sample. At 3504, process 3500 can identify at least one feature match between the first image and the second image. At 3506, process 3500 can estimate a deformation between the first image and the second image based on identifying the at least one feature match. Finally, at 3508, process 3500 can combine the first image and the second image based on estimating the deformation between the first image and the second image.

It should be understood that the above described steps of the process of FIG. 35 can be executed or performed in any order or sequence not limited to the order and sequence shown and described in the figures. Also, some of the above steps of the processes of FIG. 35 can be executed or performed substantially simultaneously where appropriate or in parallel to reduce latency and processing times.

Thus, while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

What is claimed is:

1. A method for nonrigid mosaicking of images, comprising:
obtaining, using a processor, a plurality of images including a first image and a second image of a sample,
the first image and the second image containing information from partially overlapping portions of the sample;
identifying, using the processor, at least one feature match between the first image and the second image;
estimating, using the processor, a deformation of the sample between the first image and the second image based on identifying the at least one feature match, the estimating comprising:
generating a deformation field comprising an array of deformation nodes,
adjusting, using an expectation maximization and dual quaternion (EMDQ) procedure, the array of deformation nodes based on a first position of the at least one feature match in the first image and a second position of the at least one feature match in the second image, and
warping a position of each of a plurality of pixels of the second image based on the adjusted array of deformation nodes; and
combining, using the processor, the first image and the second image based on estimating the deformation between the first image and the second image.

2. The method of claim 1, wherein mosaicking the first image and the second image further comprises:
joining the warped second image to the first image to produce a mosaic image.

3. The method of claim 1, wherein each of the array of deformation nodes includes an associated warp function, and
wherein warping a position of each of a plurality of pixels of the second image based on the adjusted array of deformation nodes further comprises:
warping the position of each of the plurality of pixels of the second image based on a distance of each of the plurality of pixels from an adjacent deformation node of the array of deformation nodes.

4. The method of claim 1, wherein the plurality of images comprises a sequence of images, and
wherein the method further comprises:
obtaining a third image of the plurality of images;
estimating a tracking deformation field for the third image compared to a previous image of the plurality of images;
identifying a key frame from the plurality of images;
estimating a loop deformation field for the third image compared to a first key frame;
determining a tracking uncertainty based on a difference between the tracking deformation field and the loop deformation field; and
generating a third deformation field for the third image based on determining the tracking uncertainty.

5. The method of claim 4, wherein generating a third deformation field for the third image further comprises:
obtaining a tracking warp function for the tracking deformation field and a loop warp function for the loop deformation field; and
merging the tracking warp function with the loop warp function based on the tracking uncertainty to generate a third warp function for the third deformation field.

6. The method of claim 1, wherein adjusting the array of deformation nodes further comprises:
smoothing the array of deformation nodes by adjusting a first node of the array of nodes based on an amount of adjustment of a second node of the array of nodes, wherein the second node is adjacent to the first node.

7. The method of claim 1, wherein identifying at least one feature match between the first image and the second image further comprises:
determining a plurality of potential feature matches between the first image and the second image;
identifying a subset of the plurality of potential feature matches between the first image and the second image that are based on rigid transformations; and
iteratively re-weighting each potential feature match of the subset of the plurality of potential feature matches to generate a plurality of feature matches.

8. The method of claim 7, wherein identifying at least one feature match between the first image and the second image further comprises:
identifying at least one feature mismatch from the plurality of feature matches.

9. The method of claim 8, wherein identifying at least one feature mismatch from the plurality of feature matches further comprises:
generating a smooth deformation field comprising an array of deformation nodes;
calculating, using an expectation maximization and dual quaternion (EMDQ) procedure, a displacement of the array of deformation nodes for each of the plurality of feature matches;
identifying a particular feature match of the plurality of feature matches as being a mismatch based on the particular feature match being inconsistent with the deformation field; and
removing the particular feature match from the plurality of feature matches.

10. The method of claim 1, wherein obtaining a plurality of images of a sample further comprises:
obtaining a plurality of pairs of stereo images of a sample using a camera,
wherein each of the pairs of stereo images is directed at a different angle towards a same portion of the sample; and
determining, for each of the plurality of pairs of stereo images, a three-dimensional set of points on the sample.

11. The method of claim 10, wherein identifying at least one feature match between the first image and the second image further comprises:
identifying at least one feature match between the first image and the second image comprising a first set of three-dimensional coordinates on the first image and a second set of three-dimensional coordinates on the second image,
wherein the first set of three-dimensional coordinates and the second set of three-dimensional coordinates correspond to a same feature in the sample.

12. The method of claim 11, wherein estimating a deformation between the first image and the second image further comprises:

estimating a deformation of the sample and a movement of the camera between the first image and the second image based on identifying the at least one feature match.

13. The method of claim 12, wherein estimating a deformation between the first image and the second image further comprises:
    generating a deformation field comprising an array of deformation nodes;
    adjusting, using an expectation maximization and dual quaternion (EMDQ) procedure, the array of deformation nodes based on the first set of three-dimensional coordinates and the second set of three-dimensional coordinates; and
    updating an estimate of the movement of the camera based on the adjusted array of deformation nodes.

14. The method of claim 13, wherein identifying at least one feature match between the first image and the second image further comprises:
    determining a plurality of potential feature matches between the first image and the second image; and
    removing, using the EMDQ procedure, at least one feature mismatch from the plurality of potential feature matches.

15. The method of claim 14, wherein estimating a deformation between the first image and the second image further comprises:
    estimating a deformation between the first image and the second image by correcting tracking errors,
        wherein correcting tracking errors is based on performing graph optimization based on the at least one feature mismatch.

16. The method of claim 15, wherein performing graph optimization further comprises:
    performing graph optimization based on costs generated using an as-rigid-as-possible (ARAP) procedure.

17. The method of claim 10, wherein each of the plurality of images including the first image and the second image comprises a multi-color image, and
    wherein combining the first image and the second image further comprises:
        combining the first image and the second image to generate a mosaic image; and
        performing multi-band blending on the mosaic image.

18. The method of claim 1, wherein obtaining a plurality of images further comprises obtaining the plurality of images from a laparoscope.

* * * * *